United States Patent
Choi et al.

(10) Patent No.: US 10,230,966 B2
(45) Date of Patent: Mar. 12, 2019

(54) METHOD AND APPARATUS FOR ENCODING MULTILAYER VIDEO, AND METHOD AND APPARATUS FOR DECODING MULTILAYER VIDEO

(71) Applicant: SAMSUNG ELECTRONICS CO., LTD., Suwon-si (KR)

(72) Inventors: Byeong-doo Choi, Suwon-si (KR); Min-woo Park, Yongin-si (KR); Jin-young Lee, Hwaseong-si (KR); Yong-jin Cho, Seoul (KR); Chan-yul Kim, Bucheon-si (KR); Ho-cheon Wey, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 311 days.

(21) Appl. No.: 15/096,443

(22) Filed: Apr. 12, 2016

(65) Prior Publication Data
US 2016/0227232 A1 Aug. 4, 2016

Related U.S. Application Data

(63) Continuation of application No. PCT/KR2014/009588, filed on Oct. 13, 2014.

(Continued)

(51) Int. Cl.
| | | |
|---|---|---|
| *H04N 19/105* | (2014.01) | |
| *H04N 19/33* | (2014.01) | |
| *H04N 19/70* | (2014.01) | |
| *H04N 19/46* | (2014.01) | |
| *H04N 19/30* | (2014.01) | |
| *H04N 19/44* | (2014.01) | |

(Continued)

(52) U.S. Cl.
CPC ........... *H04N 19/33* (2014.11); *H04N 19/105* (2014.11); *H04N 19/159* (2014.11);
(Continued)

(58) Field of Classification Search
CPC .............................. H04N 19/21; H04N 19/105
See application file for complete search history.

(56) References Cited

U.S. PATENT DOCUMENTS

| 8,879,621 B2 | 11/2014 | Suzuki et al. |
| 2006/0153295 A1 | 7/2006 | Chen et al. |
| (Continued) | | |

FOREIGN PATENT DOCUMENTS

| JP | 2012147273 A | 8/2012 |
| KR | 1020130045784 A | 5/2013 |
| KR | 1020130107861 A | 10/2013 |

OTHER PUBLICATIONS

JCTVC-N0118v2, "MV-HEVC/SHVC HLS: On Inter layer Prediction Signaling," Aug. 2013. (Year: 2013).*

(Continued)

*Primary Examiner* — Jayanti K Patel
*Assistant Examiner* — Shadan E Haghani
(74) *Attorney, Agent, or Firm* — Sughrue Mion, PLLC

(57) ABSTRACT

Multilayer video encoding/decoding methods and apparatuses are provided. A multilayer video decoding method includes: obtaining inter-layer prediction allowance information from a bitstream; obtaining single layer use information from the bitstream when the inter-layer prediction allowance information indicates that inter-layer prediction is usable; determining at most only one layer among at least one layer, to which a current picture refers, as a reference layer when the single layer use information indicates that at most one picture is used for inter-layer prediction; and performing inter-layer prediction on the current picture by using a picture belonging to the reference layer.

9 Claims, 36 Drawing Sheets

Related U.S. Application Data

(60) Provisional application No. 61/890,211, filed on Oct. 12, 2013.

(51) Int. Cl.
   *H04N 19/52* (2014.01)
   *H04N 19/593* (2014.01)
   *H04N 19/597* (2014.01)
   *H04N 19/159* (2014.01)
   *H04N 19/172* (2014.01)

(52) U.S. Cl.
   CPC .......... *H04N 19/172* (2014.11); *H04N 19/30* (2014.11); *H04N 19/44* (2014.11); *H04N 19/46* (2014.11); *H04N 19/52* (2014.11); *H04N 19/593* (2014.11); *H04N 19/597* (2014.11); *H04N 19/70* (2014.11)

(56) References Cited

U.S. PATENT DOCUMENTS

| | | | |
|---|---|---|---|
| 2008/0137742 | A1 | 6/2008 | Chen et al. |
| 2014/0218473 | A1* | 8/2014 | Hannuksela ......... H04N 19/597 348/43 |
| 2014/0294063 | A1* | 10/2014 | Chen .................... H04N 19/105 375/240.02 |
| 2014/0301459 | A1* | 10/2014 | Boyce ................. H04N 19/105 375/240.12 |
| 2015/0078446 | A1 | 3/2015 | Jun et al. |
| 2016/0037173 | A1 | 2/2016 | Sim et al. |
| 2016/0191926 | A1* | 6/2016 | Deshpande .......... H04N 19/597 375/240.12 |

OTHER PUBLICATIONS

Communication (PCT/ISA/210) dated Jan. 15, 2015, issued by the International Searching Authority in counterpart International Application No. PCT/KR2014/009588.

Communication (PCT/ISA/237) dated Jan. 15, 2015, issued by the International Searching Authority in counterpart International Application No. PCT/KR2014/009588.

Communication (PCT/ISA/220) dated Jan. 15, 2015, issued by the International Searching Authority in counterpart International Application No. PCT/KR2014/009588.

* cited by examiner

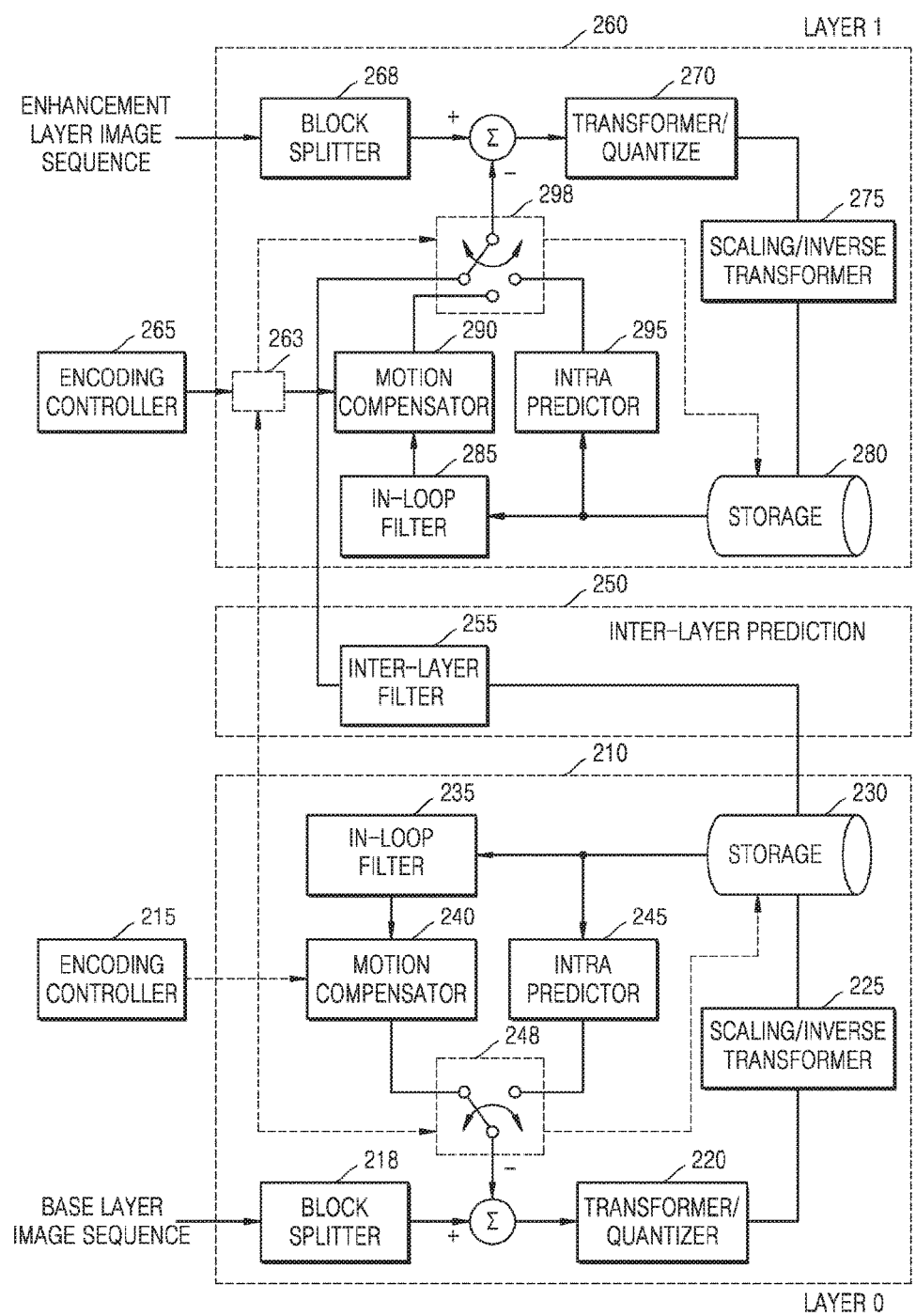

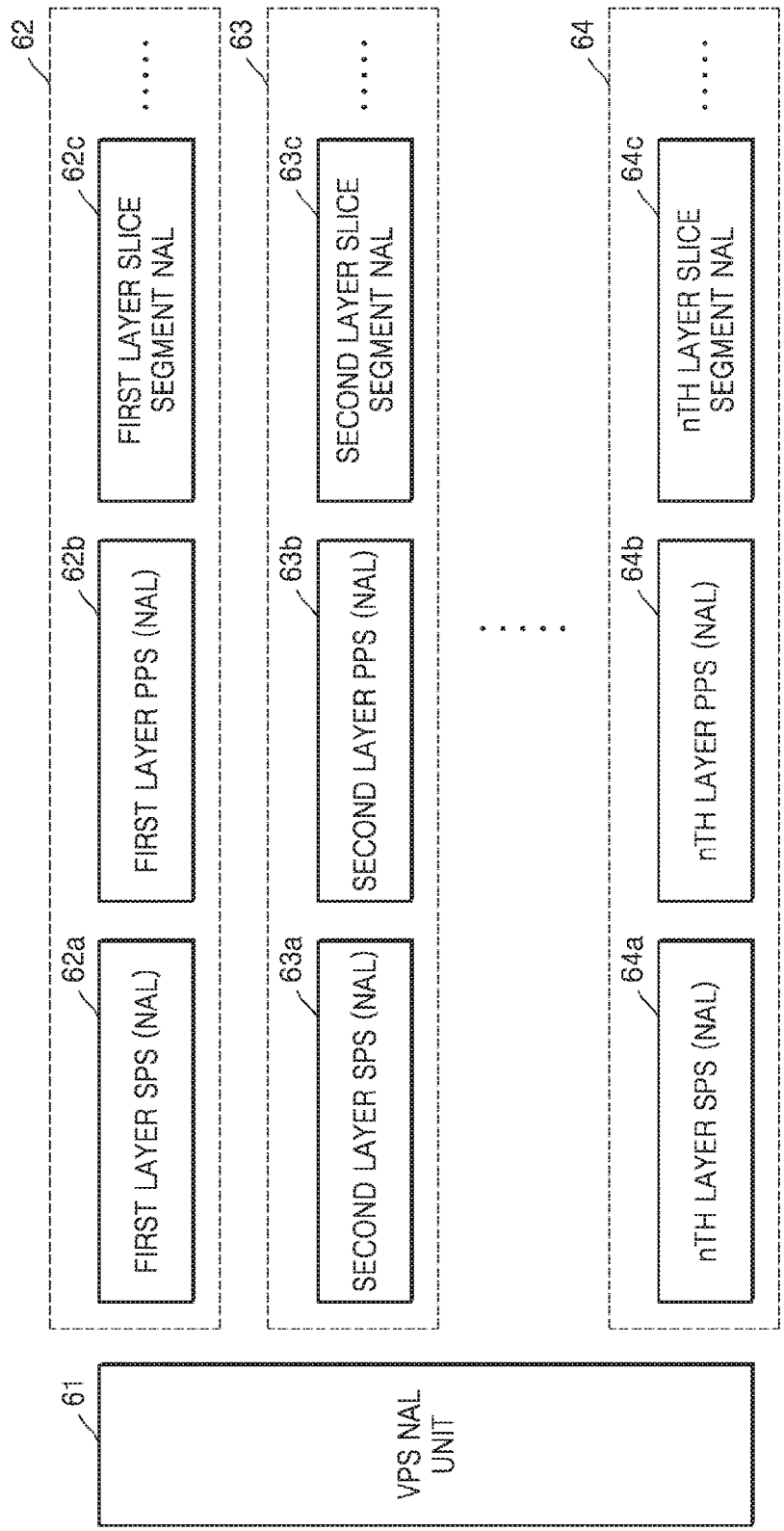

FIG. 3C

| | Descriptor |
|---|---|
| slice_segment_header( ) { | |
| ... | |
| if( nuh_layer_id > 0 ) { | |
|   inter_layer_pred_enabled_flag | u(1) |
|   num_dependent_layers | u(v) |
|   for( i = 0, NumInterlayerRef = 0; i < num_dependent_layer; i++ ) { | |
|     inter_layer_dep_layer_idc [ i ] | u(v) |
|     if( inter_layer_pred_enabled_flag && !all_ref_layers_active_flag ) { | |
|       used_by_curr_layer_flag[ i ] | u(1) |
|     if( used_by_curr_layer_flag[ i ] ) | |
|       RefPicLayerId[ NumInterlayerRef ] = DepLayerId [ nuh_layer_id ][ inter_layer_pred_layer_idc[ i ] ] | |
|     NumInterlayerPredRef ++ | |
| } | |
| ... | |

351 — inter_layer_pred_enabled_flag
352 — num_dependent_layers
353 — used_by_curr_layer_flag

FIG. 4B

| vps_extension( ) { | Descriptor |
|---|---|
| ... | |
| for( i = 1; i <= vps_max_layers_minus1; i++ ) { | |
|   all_ref_layers_active_flag[ i ] | u(1) |
|   if( all_ref_layers_active_flag[ i ] ) | |
|     max_one_active_ref_layer_flag[ i ] | u(1) |
| } | |
| ... | |
| } | |

411 — all_ref_layers_active_flag[ i ]
412 — if( all_ref_layers_active_flag[ i ] )
413 — max_one_active_ref_layer_flag[ i ]

FIG. 4C

| | Descriptor |
|---|---|
| slice_segment_header( ) { | |
| ... | |
| if( nuh_layer_id > 0 && all_ref_layers_active_flag[ LayerIdxInVps[ nuh_layer_id ] ]<br>&& NumdirectRefLayers[ nuh_layer_id ] > 0 ) { | |
|   inter_layer_pred_enabled_flag | u(1) |
|   if( inter_layer_pred_enabled_flag && NumDirectRefLayers[ LayerIdxInVps[ nuh_layer_id ] ] > 1 ) { | |
|     if( !max_one_active_ref_layer_flag[ LayerIdxInVps[ nuh_layer_id ] ] ) | |
|       num_inter_layer_ref_pics_minus1 | u(v) |
|     if( NumActiveRefLayerPics != NumDirectRefLayers[ nuh_layer_id ] ) | |
|       for( i = 0; i < NumActiveRefLayerPics; i++ ) | |
|         inter_layer_pred_layer_idc[ i ] | u(v) |
|   } | |
| } | |
| ... | |
| } | |

FIG. 5B

| | Descriptor |
|---|---|
| slice_segment_header( ) { | |
| ... | |
| if( nuh_layer_id > 0 && all_ref_layers_active_flag && NumDirectRefLayers[ nuh_layer_id ] > 0 ) { | |
|    inter_layer_pred_enabled_flag | u(1) |
|    if( inter_layer_pred_enabled_flag && NumDirectRefLayers[ nuh_layer_id ] > 1 ) { | |
|      if( !max_one_active_ref_layer_flag ) | |
|        num_inter_layer_ref_pics_minus1 | u(v) |
|      if( NumActiveRefLayerPics != NumDirectRefLayers[ nuh_layer_id ] ) | |
|        for( i = 0; i < NumActiveRefLayerPics; i++ ) | |
|          inter_layer_pred_layer_idc[ i ] | u(v) |
|    } | |
| } | |
| ... | |
| } | |

511 — inter_layer_pred_enabled_flag
512 — num_inter_layer_ref_pics_minus1
513 — (NumActiveRefLayerPics condition)
514 — for loop
515 — inter_layer_pred_layer_idc[ i ]

FIG. 6B

| slice_segment_header( ) { | Descriptor |
|---|---|
| ... | |
| if( nuh_layer_id > 0 && all_ref_layers_active_flag && NumDirectRefLayers[ nuh_layer_id ] > 0 ) { | |
|   inter_layer_pred_enabled_flag | u(1) |
|   if( inter_layer_pred_enabled_flag && NumDirectRefLayers[ nuh_layer_id ] > 1 ) { | |
|     if( !max_one_active_ref_layer_flag ) | |
|       num_inter_layer_ref_pics_minus1 | u(v) |
|     high_ref_layers_active_flag | u(1) |
|     if( NumActiveRefLayerPics != NumDirectRefLayers[ nuh_layer_id ] && !high_ref_layers_active_flag ) { | |
|       for( i = 0; i < NumActiveRefLayerPics; i++ ) | |
|         inter_layer_pred_layer_idc[ i ] | u(v) |
|     } | |
|   } | |
| ... | |
| } | |

FIG. 7C

| vps_extension( ) { | Descriptor |
|---|---|
| ... | |
| max_one_active_ref_layer_flag | u(1) |
| all_ref_layers_active_flag | u(1) |
| if( !all_ref_layers_active_flag ) | |
|   for( i = 1; i <= vps_max_layers_minus1; i++ ) { | |
|     if( NumDirectRefLayers[ layer_id_in_nuh [ i ] ] > 0 ) | |
|       num_ilp_ref_pic_sets_minus1 [ i ] | ue(v) |
|       for( j = 0; j <= num_ilp_ref_pic_sets_minus1 [ i ]; j++ ) | |
|         ilp_ref_pic_set( i, j ) | |
|   } | |
| ... | |
| } | |

711 — max_one_active_ref_layer_flag
712 — all_ref_layers_active_flag
713 — if( !all_ref_layers_active_flag )
714 — num_ilp_ref_pic_sets_minus1 [ i ]
715 — for( j = 0; j <= num_ilp_ref_pic_sets_minus1 [ i ]; j++ )
716 — ilp_ref_pic_set( i, j )

FIG. 7D

| ilp_ref_pic_set( layerIdx, ilpRpsIdx ) { | Descriptor |
|---|---|
| for( i = layerIdx − 1 ; ( i >= 0 ) && !( max_one_active_ref_layer_flag && presentInIlRps_flag [ i + 1 ] ) ; i-- ) | |
| if( direct_dependency_flag [ layerIdx ] [ i ] ) | |
| presentInIlRps_flag [ i ] | u(1) |
| } | |

FIG. 7E

| | Descriptor |
|---|---|
| slice_segment_header( ) { | |
| ... | |
| if( nuh_layer_id > 0 && NumDirectRefLayers[ nuh_layer_id ] > 0 && !all_ref_layers_active_flag ) { | |
|   inter_layer_pred_enabled_flag | u(1) |
|   if( inter_layer_pred_enabled_flag ) { | |
|     ilp_ref_pic_set_vps_flag | u(1) |
|     if( ilp_ref_pic_set_vps_flag && ( NumIlpRefPicSets[ nuh_layer_id ] > 1 ) ) | |
|       ilp_ref_pic_set_idx | u(v) |
|     else if( ilp_ref_pic_set_vps_flag ) | |
|       ilp_ref_pic_set( LayerIdxInVps[ nuh_layer_id ], NumIlpRefPicSets[ nuh_layer_id ] ) | |
| } | |
| if( NumSamplePredRefLayers[ nuh_layer_id ] > 0 && NumActiveRefLayerPics > 0 ) | |
|   inter_layer_sample_pred_only_flag | u(1) |
| ... | |

721 — ilp_ref_pic_set_vps_flag
722 — ilp_ref_pic_set_idx
723 — ilp_ref_pic_set

CODING UNITS (1710)

METHOD AND APPARATUS FOR ENCODING MULTILAYER VIDEO, AND METHOD AND APPARATUS FOR DECODING MULTILAYER VIDEO

TECHNICAL FIELD

The present invention relates to encoding/decoding methods and apparatuses for multilayer videos such as multiview videos and scalable videos, and more particularly, to high-level syntax structures for signaling of multilayer videos.

BACKGROUND ART

In general, image data may be encoded by a codec based on a predetermined data compression standard, for example, the Moving Picture Expert Group (MPEG) standard and then stored in a storage medium in the form of a bitstream or transmitted through a communication channel.

Scalable video coding (SVC) is an example of a video compression method for properly adjusting and transmitting the amount of data corresponding to various communication networks and terminals. The scalable video coding provides a video encoding method that may provide an adaptive service for various transmission networks and various receiving terminals by one video stream.

Also, recently, with the widespread use of three-dimensional (3D) multimedia devices and 3D multimedia content, a multiview video coding technology for 3D video coding has been widely used.

The conventional scalable video coding or multiview video coding encodes a video according to a limited encoding method based on a macroblock of a predetermined size.

DETAILED DESCRIPTION OF THE INVENTION

Technical Problem

The present invention provides encoding/decoding methods and apparatuses that may provide an improved encoding/decoding rate.

Technical Solution

According to an embodiment of the present invention, an image decoding method includes: obtaining inter-layer prediction allowance information from a bitstream; obtaining single layer use information from the bitstream when the inter-layer prediction allowance information indicates that inter-layer prediction is usable; determining at most only one layer among at least one layer, to which a current picture refers, as a reference layer when the single layer use information indicates that at most one picture is used for inter-layer prediction; and performing inter-layer prediction on the current picture by using a picture belonging to the reference layer.

The determining of the at most only one layer as the reference layer may include determining a layer having a maximum layer identifier value among the at least one layer, to which the current picture directly refers, as the reference layer according to direct reference information obtained from the bitstream.

Advantageous Effects of the Invention

Accordingly, the encoding/decoding performance of an encoding/decoding method and apparatus may be further improved.

DESCRIPTION OF THE DRAWINGS

FIG. 2C illustrates an inter-layer prediction structure according to an embodiment.

FIG. 2F illustrates network abstraction layer (NAL) units including encoded data of a multilayer video according to an embodiment of the present invention.

FIG. 3C illustrates a pseudo code for determining a reference picture layer identifier for a current picture by using a syntax element obtained from a bitstream for a slice segment.

FIG. 4B is a diagram illustrating a pseudo code for obtaining single layer use information and reference layer activation information from a bitstream corresponding to video parameter set (VPS)_extension.

FIG. 4C is a diagram illustrating a pseudo code for obtaining single layer use information and reference layer activation information from a bitstream corresponding to a slice segment header.

FIG. 5B is a diagram illustrating a pseudo code for obtaining a syntax element for performance of inter-layer prediction from a bitstream by obtaining a single layer use flag by a decoding apparatus according to an embodiment of the present invention.

FIG. 6B illustrates a pseudo code for performing a decoding method according to an embodiment of the present invention.

FIGS. 7A to 7E are diagrams illustrating a reference picture set obtaining method according to an embodiment of the present invention.

BEST MODE

Figure 1A:
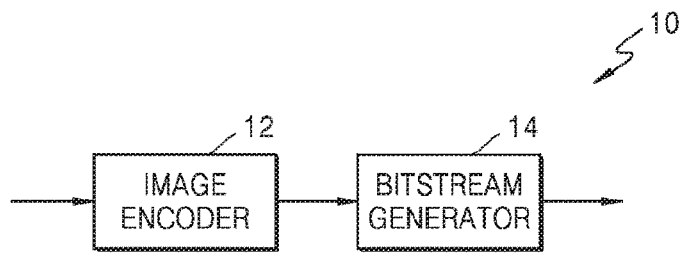
FIG. 1A is a block diagram illustrating a configuration of a multilayer video encoding apparatus according to an embodiment of the present invention.

According to an embodiment of the present invention, an image decoding method includes: obtaining inter-layer prediction allowance information from a bitstream; obtaining single layer use information from the bitstream when the inter-layer prediction allowance information indicates that inter-layer prediction is usable; determining at most only one layer among at least one layer, to which a current picture refers, as a reference layer when the single layer use information indicates that at most one picture is used for inter-layer prediction; and performing inter-layer prediction on the current picture by using a picture belonging to the reference layer.

The determining of the at most only one layer as the reference layer may include determining a layer having a maximum layer identifier value among the at least one layer, to which the current picture directly refers, as the reference layer according to direct reference information obtained from the bitstream.

The performing of the inter-layer prediction on the current picture by using the picture belonging to the reference layer may include determining a picture having a decoding order identical to a decoding order of the current picture, among at least one picture included in the reference layer, as a reference picture.

The image decoding method may further include, when the single layer use information does not indicate that at most one picture is used for inter-layer prediction: obtaining information about the number of pictures that are to be referred to for inter-layer prediction from the bitstream; obtaining an identifier of a reference layer used for inter-layer prediction from the bitstream according to the number represented by the information about the number of pictures that are to be referred to for inter-layer prediction; and performing inter-layer prediction of the current picture by using the identifier of the reference layer.

The image decoding method may further include, when the single layer use information does not indicate that at most one picture is used for inter-layer prediction of the current picture: obtaining direct reference information representing inter-layer direct reference information from the bitstream; generating inter-layer indirect reference information by using the direct reference information; determining layer identifier information of a picture referred to for decoding a current picture by using the direct reference information and the indirect reference information; and decoding the current picture by performing inter-layer prediction by using the layer identifier of the referred picture.

The generating of the inter-layer indirect reference information by using the direct reference information may include generating inter-layer indirect reference information by using indirect reference information determined between a first layer and a third layer by using the direct reference information according to whether a second layer having a higher layer index than the first layer directly refers to the third layer having a lower layer index than the first layer.

The determining of the layer identifier information of the picture referred to for the decoding of the current picture by using the direct reference information and the indirect reference information may include: generating a dependent layer identifier list of a layer by using the direct reference information and the indirect reference information; and determining a layer identifier of a picture referred to in a current picture by using the dependent layer identifier list when dependent layer identifier list reference information obtained from the bitstream represents a reference of a dependent layer identifier list.

The obtaining of the single layer use information may include: obtaining reference layer activation information about a current layer from the bitstream; and obtaining the single layer use information when the reference layer activation information about the current layer indicates that reference pictures of all direct reference layers of the current layer are provided by a same access unit and are included in a same inter-layer reference picture set.

The single layer use information may be obtained from the bitstream independently on a layer-by-layer basis.

The image decoding method may further include: obtaining reference layer activation information from the bitstream when the single layer use information does not indicate that at most one picture is used for inter-layer prediction; obtaining selection information of an inter-layer reference picture set from the bitstream when the reference layer activation information does not indicate that reference pictures of all direct reference layers are provided by a same access unit and are included in a same inter-layer reference picture set; when the selection information indicates that inter-layer reference picture set information is selected from a set of pre-generated inter-layer reference picture set information, obtaining an index for selecting inter-layer reference picture set information from the bitstream and determining an inter-layer reference picture by using the inter-layer reference picture set information indicated by the index in the set of the inter-layer reference picture set information; and performing inter-layer prediction of the current picture by using the inter-layer reference picture.

The image decoding method may further include: obtaining reference layer activation information from the bitstream when the single layer use information does not indicate that at most one picture is used for inter-layer prediction; obtaining selection information of an inter-layer reference picture set from the bitstream when the reference layer activation information does not indicate that reference pictures of all direct reference layers are provided by a same access unit and are included in a same inter-layer reference picture set; when the selection information indicates that inter-layer reference picture set information is not selected from a set of pre-generated inter-layer reference picture set information, obtaining inter-layer reference picture set information from the bitstream and determining an inter-layer reference picture by using the obtained inter-layer reference picture set information; and performing inter-layer prediction on the current picture by using the inter-layer reference picture.

Also, according to an embodiment of the present invention, an image decoding apparatus includes: a bitstream obtainer obtaining a bitstream of image data; and an image decoder obtaining inter-layer prediction allowance information from the bitstream; obtaining single layer use information from the bitstream when the inter-layer prediction allowance information indicates that inter-layer prediction is usable; determining at most only one layer among at least one layer, to which a current picture refers, as a reference layer when the single layer use information indicates that at most one picture is used for inter-layer prediction; and performing inter-layer prediction on the current picture by using a picture belonging to the reference layer.

Also, according to an embodiment of the present invention, an image encoding method includes: generating image encoding data by performing inter-layer prediction referring to at most one picture; generating inter-layer prediction allowance information indicating that the image encoding data is encoded by using inter-layer prediction; generating single layer use information indicating that the image encoding data of each layer is encoded by using inter-layer prediction referring to at most one picture; and generating a bitstream by using the image encoding data, the inter-layer prediction allowance information, and the single layer use information.

Also, according to an embodiment of the present invention, an image encoding apparatus includes: an image encoder generating image encoding data by performing inter-layer prediction referring to at most one picture; generating inter-layer prediction allowance information indicating that the image encoding data is encoded by using inter-layer prediction; and generating single layer use information indicating that the encoding data of each layer is encoded by using inter-layer prediction referring to at most one picture; and a bitstream generator generating a bitstream by using the image encoding data, the inter-layer prediction allowance information, and the single layer use information.

Also, according to an embodiment of the present invention, a computer-readable recording medium stores a program that performs the above image decoding method when executed by a computer.

Also, according to an embodiment of the present invention, a computer-readable recording medium stores a program that performs the above image encoding method when executed by a computer.

MODE OF THE INVENTION

Hereinafter, multilayer video encoding apparatuses, multilayer video decoding apparatuses, multilayer video encoding methods, and multilayer video decoding methods according to various embodiments will be described with reference to FIGS. 1A to 7. Also, video encoding apparatuses, video decoding apparatuses, video encoding methods, and video decoding methods based on coding units of a tree structure according to various embodiments will be described with reference to FIGS. 8 to 20. Also, various embodiments, to which the multilayer video encoding apparatuses, the multilayer video decoding apparatuses, the multilayer video encoding methods, and the multilayer video decoding methods according to the embodiments of FIGS. 1A to 20 may be applied, will be described with reference to FIGS. 21 to 27. Hereinafter, as used herein, the term "image" may refer to a still image of a video or a moving image thereof, that is, the video itself.

First, multilayer video encoding apparatuses, multilayer video encoding methods, multilayer video decoding apparatuses, and multilayer video decoding methods according to various embodiments will be described with reference to FIGS. 1A to 7.

FIG. 1A is a block diagram illustrating a configuration of a multilayer video encoding apparatus according to an embodiment of the present invention.

Referring to FIG. 1A, a multilayer video encoding apparatus 10 according to an embodiment of the present invention includes an image encoder 12 and a bitstream generator 14.

According to various embodiments, the multilayer video encoding apparatus 10 may classify and encode a plurality of video streams on a layer-by-layer basis according to a multiview video coding method or a scalable video coding method. The multilayer video encoding apparatus 10 may encode base layer images and enhancement layer images as different layers.

For example, a multiview video may be encoded according to a scalable video coding method. Left-view images may be encoded as base layer images, and right-view images may be encoded as enhancement layer images. Alternatively, center-view images, left-view images, and right-view images may be respectively encoded, wherein the center-view images may be encoded as base layer images, the left-view images may be encoded as first enhancement layer images, and the right-view images may be encoded as second enhancement layer images. The encoding result of the base layer images may be output as a base layer stream, and the encoding results of the first enhancement layer images and the second enhancement layer images may be output as a first enhancement layer stream and a second enhancement layer stream respectively.

Also, when there are three or more enhancement layers, the base layer images, the first enhancement layer images, the second enhancement layer images, . . . , the Kth enhancement layer images may be encoded. Accordingly, the encoding result of the base layer images may be output as the base layer stream, and the encoding results of the first, second, . . . , Kth enhancement layer images may be output as the first, second, . . . , Kth enhancement layer streams respectively.

According to various embodiments, the multilayer video encoding apparatus 10 may perform inter prediction for predicting the current image with reference to the images of the same layer. A motion vector representing motion information between the current image and the reference image and a residual component between the current image and the reference image may be generated through the inter prediction.

Also, according to various embodiments, the multilayer video encoding apparatus 10 may perform inter-layer prediction for predicting the enhancement layer images with reference to the base layer images. The multilayer video encoding apparatus 10 may also perform inter-layer prediction for predicting the second enhancement layer images with reference to the first enhancement layer images. A position difference component between the current image and the reference image of another layer and a residual component between the current image and the reference image of another layer may be generated through the inter-layer prediction.

According to an embodiment, when the multilayer video encoding apparatus 10 allows two or more enhancement layers, it may also perform inter-layer prediction between the images of one base layer and the images of two or more enhancement layers according to a multilayer prediction structure.

An inter-layer prediction structure thereof will be described later in detail with reference to FIG. 2C.

According to various embodiments, the multilayer video encoding apparatus 10 encodes each block of each image of a video in each layer. A type of the block may be a square shape or a rectangular shape or may be a geometric form. However, it is not limited to a data unit of a certain size. Among the coding units according to a tree structure, the block according to an embodiment may be a largest coding unit, a coding unit, a prediction unit, a transformation unit, or the like. For example, the multilayer video encoding apparatus 10 may split and encode images according to the HEVC standard method into blocks of a quad-tree structure in each layer. A video encoding/decoding method based on the coding units according to a tree structure will be described later with reference to FIGS. 8 to 20. The inter prediction and the inter-layer prediction may also be performed based on the data unit of the transformation unit, the prediction unit, or the coding unit.

According to various embodiments, the image encoder 12 may encode an image sequence with respect to each of at least one layer. The image encoder 12 may generate symbol data by performing source coding operations including intra prediction or inter prediction with respect to each layer. For example, the image encoder 12 generates symbol data by performing transformation and quantization on the image block including the result data obtained by performing inter prediction or intra prediction on image samples, and performs entropy encoding on the symbol data. The bitstream generator 14 may generate a bitstream including the entropy-encoded symbol data.

The image encoder 12 may encode an image sequence in each layer, and the bitstream generator 14 may generate each bitstream. As described above, the image encoder 12 may also encode the current layer image sequence with reference to the symbol data of another layer through inter-layer prediction. Thus, according to various embodiments, the image encoder 12 may also encode the image sequence of each layer with reference to the image sequence of another layer or the image sequence of the same layer according to the prediction mode. For example, in the intra mode, the current sample may be predicted in the current image by using the peripheral samples; and in the inter mode, the current image may be predicted by using another image of the same layer. In the inter-layer prediction mode, the current image may be predicted by using the reference image of a Picture Order Count (POC) identical to the current image among other layer images.

The image encoder 12 may encode a multiview video and encode an image sequence of different views in each layer. In an inter-layer prediction structure for a multiview video, since a current-view image is encoded with reference to a different-view image, it may be considered as an inter-view prediction structure.

The image encoder 12 receives an input of image data including a multilayer video and encodes the same to generate a multilayer encoding image. The image encoder 12 corresponds to a video coding layer for performing the input video encoding process itself. As illustrated in FIGS. 8 to 20, the image encoder 12 may encode each picture included in the multilayer video based on the coding unit of a tree structure.

The bitstream generator 14 corresponds to a network abstraction layer (NAL) for outputting the additional information and the multilayer encoding image generated by the image encoder 12, in addition to the transmission data unit according to a predetermined format. The transmission data unit may be an NAL unit. The bitstream generator 14 outputs the NAL unit including the additional information and the multilayer encoding image. The bitstream generator 14 may output a bitstream generated by using the NAL unit.

According to an embodiment of the present invention, the multilayer video encoding apparatus 10 encodes the image data as the multilayer encoding image.

The image encoder 12 generates image encoding data by performing inter-layer prediction referring to at most one picture. The image encoder 12 generates single layer use information indicating that the encoding data of each layer is encoded by using inter-layer prediction referring to at most one picture. The bitstream generator 14 may generate a bitstream including the single layer use information.

The image encoder 12 may perform inter-layer prediction by using the picture having the greatest layer identifier among the pictures included in an inter-layer reference set.

The image encoder 12 may generate direct reference information indicating that the layer having the maximum layer identifier value among at least one layer to which the current encoding picture refers is determined as the reference layer. The bitstream generator 14 may generate a bitstream including the direct reference information.

The image encoder 12 performs encoding by using the picture having an encoding order identical to the encoding order of the current picture, among at least one picture included in the reference layer, as the reference picture.

When at most one picture is used for inter-layer prediction, the image encoder 12 generates single layer use information indicating that at most one picture is used for inter-layer prediction. The bitstream generator 14 may generate a bitstream including the single layer use information.

When at most one picture is not used for inter-layer prediction, the image encoder 12 generates single layer use information indicating that at most one picture is not used for inter-layer prediction. Also, the image encoder 12 may generate information about the number of pictures that are referred to for inter-layer prediction in order to encode the current picture, and information about the number of pictures that are to be referred to for inter-layer prediction. The image encoder 12 determines an identifier of the reference layer used for inter-layer prediction of the current picture. The bitstream generator 14 may generate a bitstream including the identifier of the reference layer used for inter-layer prediction of the current picture and the information about the number of pictures that are to be referred to for inter-layer prediction.

The image encoder 12 may generate direct reference information representing inter-layer direct reference information. The bitstream generator 14 may generate a bitstream including the direct reference information.

The image encoder 12 may generate reference layer activation information indicating that the reference pictures of all direct reference layers of the current layer are included in the same access unit and are included in the same inter-layer reference picture set. The image encoder 12 may generate the reference layer activation information independently on a layer-by-layer basis. The bitstream generator 14 may generate a bitstream including the reference layer activation information independently on a layer-by-layer basis. The image encoder 12 may also generate the single layer use information independently on a layer-by-layer basis. The bitstream generator 14 may generate a bitstream including the single layer use information independently on a layer-by-layer basis.

When at most one picture is not used for inter-layer prediction, the image encoder 12 may generate reference layer activation information indicating that the reference pictures of all direct reference layers are provided by the same access unit and are included in the same inter-layer reference picture set.

The image encoder 12 may generate selection information of the inter-layer reference picture set when the reference pictures of all direct reference layers are not provided by the same access unit or are not included in the same inter-layer reference picture set. As the selection information, the image encoder 12 may generate information about whether inter-layer reference picture set information is selected from a set of pre-generated inter-layer reference picture set information. When inter-layer reference picture set information is selected from a set of pre-generated inter-layer reference picture set information, the image encoder 12 may generate an index indicating the reference picture set. When inter-layer reference picture set information is not selected from a set of pre-generated inter-layer reference picture set information, the image encoder 12 may generate separate reference picture set information. The bitstream generator 14 may generate a bitstream including the selection information, the index indicating the reference picture set, and the reference picture set information.

The bitstream generator 14 generates a bitstream by using the image encoding data and the single layer use information.

Figure 1B:
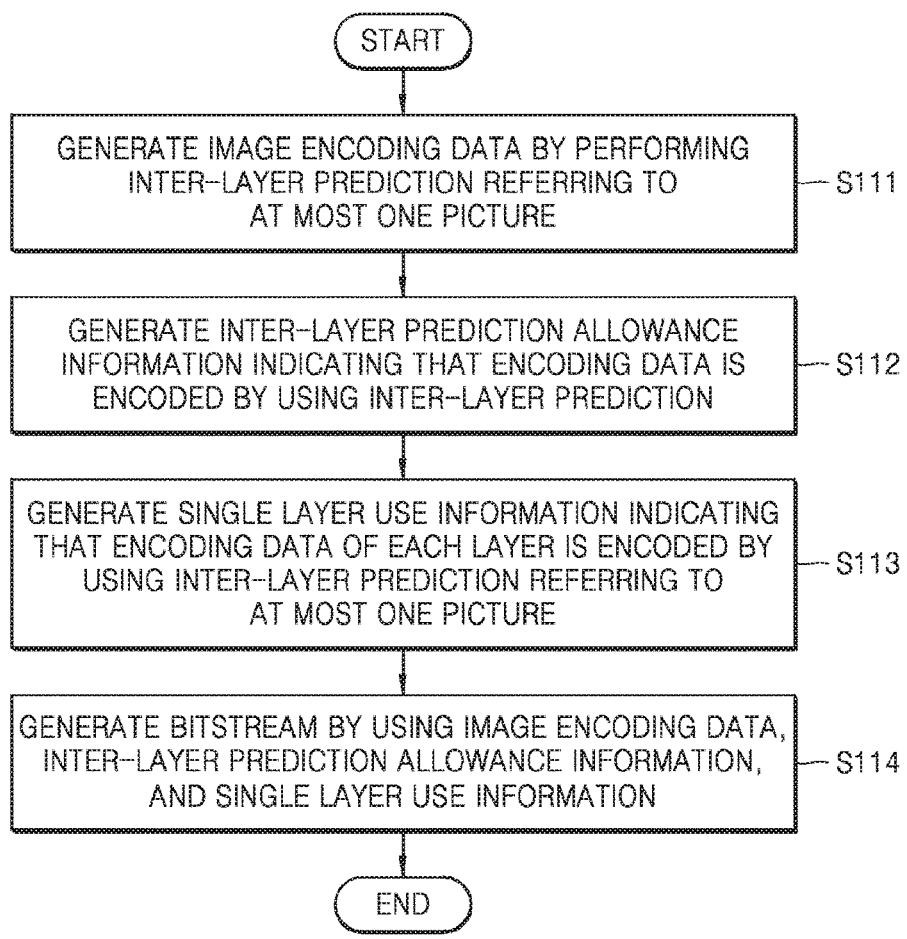
FIG. 1B is a flow diagram illustrating a multilayer video encoding method according to an embodiment of the present invention.

FIG. 1B is a flow diagram illustrating a multilayer video encoding method according to an embodiment of the present invention.

Referring to FIG. 1B, first, the multilayer video encoding apparatus 10 generates image encoding data by performing inter-layer prediction referring to at most one picture (S111). For example, the multilayer video encoding apparatus 10 may perform inter-layer prediction by using the picture having the greatest layer identifier among the pictures included in the inter-layer reference set. The multilayer video encoding apparatus 10 may perform encoding by using the picture having an encoding order identical to the encoding order of the current picture, among at least one picture included in the reference layer, as the reference picture.

Next, the multilayer video encoding apparatus 10 generates inter-layer prediction allowance information indicating that the encoding data is encoded by using inter-layer prediction (S112).

Next, the multilayer video encoding apparatus 10 generates single layer use information indicating that the encoding data of each layer is encoded by using inter-layer prediction referring to at most one picture (S113).

Next, the multilayer video encoding apparatus 10 generates a bitstream by using the image encoding data, the inter-layer prediction allowance information, and the single layer use information (S114).

When at most one picture is not used for inter-layer prediction, the multilayer video encoding apparatus 10 generates single layer use information indicating that at most one picture is not used for inter-layer prediction. Also, the multilayer video encoding apparatus 10 may generate information about the number of pictures that are referred to for inter-layer prediction in order to encode the current picture, and information about the number of pictures that are to be referred to for inter-layer prediction. The multilayer video encoding apparatus 10 determines an identifier of the reference layer used for inter-layer prediction of the current picture. The multilayer video encoding apparatus 10 may generate a bitstream including the identifier of the reference layer used for inter-layer prediction of the current picture and the information about the number of pictures that are to be referred to for inter-layer prediction.

The multilayer video encoding apparatus 10 may generate direct reference information representing inter-layer direct reference information. The multilayer video encoding apparatus 10 may generate a bitstream including the direct reference information.

The multilayer video encoding apparatus 10 may generate reference layer activation information indicating that the reference pictures of all direct reference layers of the current layer are included in the same access unit and are included in the same inter-layer reference picture set. The multilayer video encoding apparatus 10 may generate the reference layer activation information independently on a layer-by-layer basis. The multilayer video encoding apparatus 10 may generate a bitstream including the reference layer activation information independently on a layer-by-layer basis. The multilayer video encoding apparatus 10 may also generate the single layer use information independently on a layer-by-layer basis. The multilayer video encoding apparatus 10 may generate a bitstream including the single layer use information independently on a layer-by-layer basis.

When at most one picture is not used for inter-layer prediction, the multilayer video encoding apparatus 10 may generate reference layer activation information indicating that the reference pictures of all direct reference layers are provided by the same access unit and are included in the same inter-layer reference picture set.

The multilayer video encoding apparatus 10 may generate selection information of the inter-layer reference picture set when the reference pictures of all direct reference layers are not provided by the same access unit or are not included in the same inter-layer reference picture set. As the selection information, the multilayer video encoding apparatus 10 may generate information about whether inter-layer reference picture set information is selected from a set of pre-generated inter-layer reference picture set information. When inter-layer reference picture set information is selected from a set of pre-generated inter-layer reference picture set information, the multilayer video encoding apparatus 10 may generate an index indicating the reference picture set. When inter-layer reference picture set information is not selected from a set of pre-generated inter-layer reference picture set information, the multilayer video encoding apparatus 10 may generate separate reference picture set information. The multilayer video encoding apparatus 10 may generate a bitstream including the selection information, the index indicating the reference picture set, and the reference picture set information.

Figure 2A:
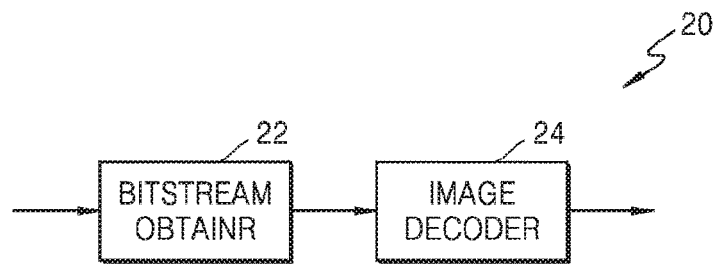
FIG. 2A is a block diagram illustrating a configuration of a multilayer video decoding apparatus according to an embodiment of the present invention.

FIG. 2A is a block diagram illustrating a configuration of a multilayer video decoding apparatus according to an embodiment of the present invention.

Referring to FIG. 2A, a multilayer video decoding apparatus 20 may include a bitstream obtainer 22 and an image decoder 24.

The multilayer video decoding apparatus 20 may receive a base layer stream and an enhancement layer stream. According to the scalable video coding method, the multilayer video decoding apparatus 20 may receive the base layer stream including the encoding data of the base layer images and receive the enhancement layer stream including the encoding data of the enhancement layer images.

The multilayer video decoding apparatus 20 may also decode a plurality of layer streams according to the scalable video coding method. The multilayer video decoding apparatus 20 may decode the base layer stream to reconstruct the base layer images and decode the enhancement layer stream to reconstruct the enhancement layer images.

For example, a multiview video may be encoded according to a scalable video coding method. For example, the left-view images may be reconstructed by decoding the base layer stream, and the right-view images may be reconstructed by decoding the enhancement layer stream. As another example, the center-view images may be reconstructed by decoding the base layer stream. The left-view images may be reconstructed by further decoding the first enhancement layer stream in addition to the base layer stream. The right-view images may be reconstructed by further decoding the second enhancement layer stream in addition to the base layer stream.

Also, when there are three or more enhancement layers, the first enhancement layer images for the first enhancement layer may be reconstructed from the first enhancement layer stream, and the second enhancement layer images may be further reconstructed by further decoding the second enhancement layer stream. The Kth enhancement layer images may be further reconstructed by further decoding the Kth enhancement layer stream in addition to the first enhancement layer stream.

The multilayer video decoding apparatus 20 may obtain the encoded data of the base layer images and the enhancement layer images from the base layer stream and the enhancement layer stream and may further obtain the motion vector generated by inter prediction and the variation information generated by inter-layer prediction.

For example, the multilayer video decoding apparatus 20 may decode inter-predicted data in each layer and decode inter-layer-predicted data between a plurality of layers. The reconstruction may also be performed through the motion compensation and the inter-layer decoding based on the encoding unit or the prediction unit according to an embodiment.

With respect to each layer stream, images may be reconstructed by performing motion compensation for the current image with reference to the reconstruction images predicted through the inter prediction of the same layer. The motion compensation may refer to an operation of reconstructing the reconstruction image of the current image by synthesizing the residual component of the current image and the reference image determined by using the motion vector of the current image.

Also, according to an embodiment, the multilayer video decoding apparatus 20 may also perform inter-layer decoding with reference to the base layer images in order to reconstruct the predicted enhancement layer image through the inter-layer prediction. The inter-layer decoding may refer to an operation of reconstructing the reconstruction image of the current image by synthesizing the residual component of the current image and the reference image of another layer determined by using the variation information of the current image.

According to an embodiment, the multilayer video decoding apparatus 20 may also perform inter-layer decoding for reconstructing the second enhancement layer images predicted with reference to the first enhancement layer images.

The multilayer video decoding apparatus 20 performs decoding on each block of each image of a video. Among the coding units according to a tree structure, the block according to an embodiment may be a largest coding unit, a coding unit, a prediction unit, a transformation unit, or the like. For example, the multilayer video decoding apparatus 20 may reconstruct the image sequences by decoding each layer stream based on the blocks of a quad-tree structure determined according to the HEVC standard method.

The image decoder 24 may obtain the symbol data reconstructed through entropy decoding with respect to each layer. The image decoder 24 may reconstruct the quantized transformation coefficients of the residual component by performing inverse quantization and inverse transformation by using the symbol data. According to another embodiment, the image decoder 24 may also receive a bitstream of the quantized transformation coefficients. The residual component of the images may be reconstructed by performing inverse quantization and inverse transformation on the quantized transformation coefficient.

According to various embodiments, the image decoder 24 may reconstruct the image sequence on a layer-by-layer basis by decoding the bitstream received on a layer-by-layer basis.

The image decoder 24 may generate the reconstruction images of the image sequence in each layer through the motion compensation between the same layer images and through the inter-layer prediction between the different layer images.

Thus, according to various embodiments, the image decoder 24 may also decode the image sequence of each layer with reference to the image sequence of another layer or the image sequence of the same layer according to the prediction mode. For example, in the intra prediction mode, the current block may be reconstructed by using the peripheral samples in the same image; and in the inter prediction mode, the current block may be reconstructed by using another image of the same layer. In the inter-layer prediction mode, the current block may be reconstructed by using the reference image of a POC identical to the current image among the images of another layer.

According to an embodiment of the present invention, the bitstream obtainer 22 obtains a multilayer video stream of the encoded image. The bitstream obtainer 22 may include a receiver to function as a receiver.

According to an embodiment of the present invention, the image decoder 24 may obtain the inter-layer prediction allowance information from the bitstream. When the inter-layer prediction allowance information indicates that the inter-layer prediction is usable, the image decoder 24 may obtain the single layer use information from the bitstream. When the single layer use information indicates that at most one picture is used for inter-layer prediction, the image decoder 24 may determine at most only one layer among at least one layer, to which the current picture refers, as the reference layer. The image decoder 24 may perform inter-layer prediction of the current picture by using the picture belonging to the reference layer.

According to the direct reference information obtained from the bitstream, the image decoder 24 may determine the layer having the maximum layer identifier value among at least one layer to which the current picture refers, as the reference layer.

The image decoder 24 may determine the picture having a decoding order identical to the decoding order of the current picture, among at least one picture included in the reference layer, as the reference picture.

When the single layer use information does not indicates that at most one picture is used for inter-layer prediction, the image decoder 24 may obtain information about the number of pictures that are to be referred to for inter-layer prediction, from the bitstream. In addition, the image decoder 24 may obtain an identifier of the reference layer used for inter-layer prediction from the bitstream according to the number represented by the information about the number of pictures that are to be referred to for inter-layer prediction. The image decoder 24 may perform inter-layer prediction of the current picture by using the identifier of the reference layer.

When the single layer use information does not indicates that at most one picture is used for inter-layer prediction of the current picture, the image decoder 24 may obtain direct reference information representing inter-layer direct reference information from the bitstream. In addition, the image decoder 24 may generate inter-layer indirect reference information by using the direct reference information. The image decoder 24 may determine the layer identifier information of the picture referred to for decoding of the current picture by using the direct reference information and the indirect reference information. The image decoder 24 may decode the current picture by performing inter-layer prediction by using the layer identifier of the reference picture.

The image decoder 24 may generate the inter-layer indirect reference information by using the indirect reference information determined between the first layer and the third layer by using the direct reference information according to whether the second layer having a higher layer index than the first layer directly refers to the third layer having a lower layer index than the first layer.

The image decoder 24 may generate a dependent layer identifier list of a layer by using the direct reference information and the indirect reference information. The image decoder 24 may determine a layer identifier of the picture referred to in the current picture by using the dependent layer identifier list when the dependent layer identifier list reference information obtained from the bitstream represents a reference of the dependent layer identifier list.

The image decoder 24 may obtain the reference layer activation information about the current layer from the bitstream. The image decoder 24 may obtain the single layer use information when the reference layer activation information about the current layer indicates that the reference pictures of all direct reference layers of the current layer are provided by the same access unit and are included in the same inter-layer reference picture set.

The image decoder 24 may obtain the single layer use information from the bitstream independently on a layer-by-layer basis.

When the single layer use information does not indicates that at most one picture is used for inter-layer prediction, the image decoder 24 may obtain the reference layer activation information from the bitstream. The image decoder 24 may obtain the selection information of the inter-layer reference picture set from the bitstream when the reference layer activation information does not indicate that the reference pictures of all direct reference layers are provided by the same access unit and are included in the same inter-layer reference picture set. When the obtained selection information indicates that the inter-layer reference picture set information is selected from a set of pre-generated inter-layer reference picture set information, the image decoder 24 may obtain an index for selecting inter-layer reference picture set information from the bitstream and determine an inter-layer reference picture by using the inter-layer reference picture set information indicated by the index in the set of the inter-layer reference picture set information. The image decoder 24 may perform inter-layer prediction of the current picture by using the inter-layer reference layer.

When the single layer use information does not indicates that at most one picture is used for inter-layer prediction, the image decoder 24 may obtain the reference layer activation information from the bitstream. The image decoder 24 may obtain the selection information of the inter-layer reference picture set from the bitstream when the reference layer activation information does not indicate that the reference pictures of all direct reference layers are provided by the same access unit and are included in the same inter-layer reference picture set. When the selection information indicates that the inter-layer reference picture set information is not selected from a set of pre-generated inter-layer reference picture set information, the image decoder 24 may obtain the inter-layer reference picture set information from the bitstream and determine an inter-layer reference picture by using the obtained inter-layer reference picture set information. The image decoder 24 may perform inter-layer prediction of the current picture by using the inter-layer reference layer.

Figure 2B:
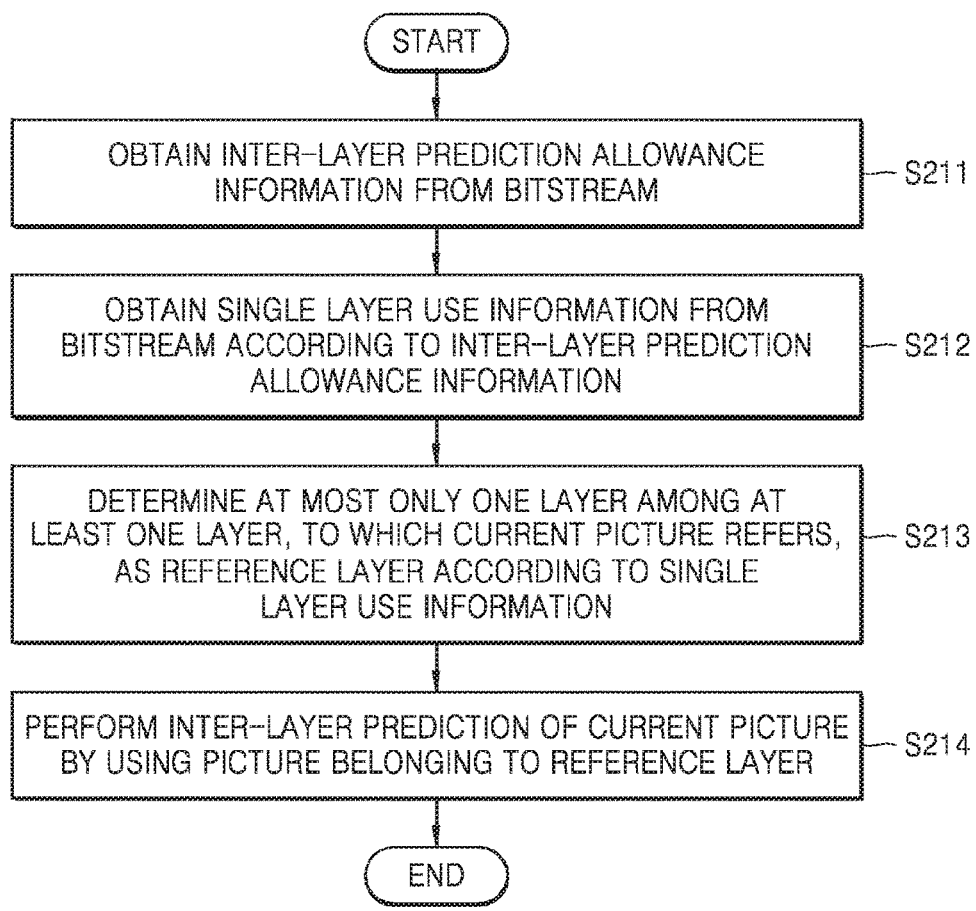
FIG. 2B is a flow diagram illustrating a multilayer video decoding method according to an embodiment of the present invention.

FIG. 2B is a flow diagram illustrating a multilayer video decoding method according to an embodiment of the present invention.

First, the multilayer video decoding apparatus 20 obtains the inter-layer prediction allowance information from the bitstream (S211).

Next, the multilayer video decoding apparatus 20 obtains the single layer use information from the bitstream according to the inter-layer prediction allowance information (S212). For example, when the inter-layer prediction allowance information indicates that the inter-layer prediction is usable, the multilayer video decoding apparatus 20 may obtain the single layer use information from the bitstream.

Next, the multilayer video decoding apparatus 20 determines at most only one layer among at least one layer, to which the current picture refers, as the reference layer according to the single layer use information (S213). For example, when the single layer use information indicates that at most one picture is used for inter-layer prediction, the multilayer video decoding apparatus 20 may determine at most only one layer among at least one layer, to which the current picture refers, as the reference layer.

According to the direct reference information obtained from the bitstream, the multilayer video decoding apparatus 20 may determine the layer having the maximum layer identifier value among at least one layer to which the current picture refers, as the reference layer.

Next, the multilayer video decoding apparatus 20 performs inter-layer prediction of the current picture by using the picture belonging to the reference layer (S214).

The multilayer video decoding apparatus 20 may determine the picture having a decoding order identical to the decoding order of the current picture, among at least one picture included in the reference layer, as the reference picture.

When the single layer use information does not indicates that at most one picture is used for inter-layer prediction, the multilayer video decoding apparatus 20 may obtain information about the number of pictures that are to be referred to for inter-layer prediction, from the bitstream.

FIG. 2C illustrates an inter-layer prediction structure according to an embodiment.

An inter-layer encoding system 200 includes a base layer encoding terminal 210, an enhancement layer encoding terminal 260, and an inter-layer prediction terminal 250 between the base layer encoding terminal 210 and the enhancement layer encoding terminal 260. The base layer encoding terminal 210 and the enhancement layer encoding terminal 260 may exhibit particular configurations of the base layer encoder 1410 and the enhancement layer encoder 1420, respectively.

The base layer encoding terminal 210 receives an input of a base layer image sequence and encodes each image. The enhancement layer encoding terminal 260 receives an input of an enhancement layer image sequence and encodes each image. Operations that overlap in operations of the base layer encoding terminal 210 and operations of the enhancement layer encoding terminal 220 are simultaneously described below.

A block splitter 218 or 268 splits an input image (a low-resolution image or a high-resolution image) to a largest coding unit, a coding unit, a prediction unit, a transformation unit, etc. In order to encode the coding unit that is output from the block splitter 218 or 268, intra prediction or inter prediction may be performed with respect to each prediction unit of the coding unit. A prediction switch 248 or 298 may perform the inter prediction by referring to a reconstructed previous image output from a motion compensator 240 or 290 or may perform the intra prediction by using a neighboring prediction unit of a current prediction unit in a current input image output from an intra predictor 245 or 295, based on whether a prediction mode of the prediction unit is an intra prediction mode or an inter prediction mode. Residual information may be generated with respect to each prediction unit via the inter prediction.

A residue component between the prediction unit and a peripheral image is input to a transformer/quantizer 220 or 270, according to each prediction unit of the coding unit. The transformer/quantizer 220 or 270 may perform transformation and quantization with respect to each transformation unit, based on the transformation unit of the coding unit, and may output a quantized transformation coefficient.

A scaling/inverse transformer 225 or 275 may perform scaling and inverse transformation on the quantized transformation coefficient, according to each transformation unit of the coding unit, and may generate residual information of a spatial domain. When it is controlled to an inter mode due to the prediction switch 248 or 298, the residual information may be synthesized with the reconstructed previous image or the neighboring prediction unit, so that a reconstructed image including the current prediction unit may be generated and a reconstructed current image may be stored in a storage 230 or 280. The reconstructed current image may be transferred to the intra predictor 245 or 295/the motion compensator 240 or 290, according to a prediction mode of a prediction unit to be next encoded.

In particular, in the inter mode, an in-loop filter 235 or 285 may perform at least one of deblocking filtering and Sample Adaptive Offset (SAO) filtering on the reconstructed image stored in the storage 230 or 280, according to each coding unit. At least one of the deblocking filtering and the SAO filtering may be performed on the coding unit and at least one of a prediction unit and a transformation unit included in the coding unit.

The deblocking filtering is filtering for smoothing a blocking phenomenon of a data unit, and the SAO filtering is filtering for compensating for a pixel value that has been corrupted while data is encoded and decoded. Data that is filtered by the in-loop filter 235 or 285 may be transferred to the motion compensator 240 or 290, according to each prediction unit. In order to encode a next coding unit output from the block splitter 218 or 268, residual information between the reconstructed current image and the next coding unit may be generated, wherein the reconstructed current image is output from the motion compensator 240 or 290 and the next coding unit is output from the block splitter 218 or 268.

In this manner, the aforementioned encoding procedure may be repeated with respect to each coding unit of the input image.

Also, for inter-layer prediction, the enhancement layer encoding terminal 260 may refer to the reconstructed image stored in the storage 230 of the base layer encoding terminal 210. An encoding controller 215 of the base layer encoding terminal 210 may control the storage 230 of the base layer encoding terminal 210, and may transfer the reconstructed image of the base layer encoding terminal 210 to the enhancement layer encoding terminal 260. The inter-layer prediction terminal 250 may perform at least one of the deblocking filtering, the SAO filtering, and the ALF filtering on the reconstructed base layer image output, by an in-loop filter 255, from the storage 230 of the base layer encoding terminal 210. When the base layer and the enhancement layer have different resolutions, the inter-layer prediction terminal 250 may upsample the reconstructed base layer image and may transfer an upsampled reconstructed base layer image to the enhancement layer encoding terminal 260. When the inter-layer prediction is performed according to a control by the switch 298 of the enhancement layer encoding terminal 260, inter-layer prediction may be performed on the enhancement layer image by referring to the reconstructed base layer image that is transferred via the inter-layer prediction terminal 250.

In order to encode an image, various encoding modes for a coding unit, a prediction unit, and a transformation unit may be set. For example, as an encoding mode for the coding unit, a depth, split information (e.g., a split flag), or the like may be set. As an encoding mode for the prediction unit, a prediction mode, a partition type, intra direction information, reference list information, or the like may be set. As an encoding mode for the prediction unit, a transformation depth, split information or the like may be set.

The base layer encoding terminal 210 may perform encoding by using each of various depths for the coding unit, each of various modes for the prediction unit, each of various partition types, each of various intra directions, each of various reference lists, and each of various transformation depths for the transformation unit, and according to results of the performances, the base layer encoding terminal 210 may determine an encoding depth, a prediction mode, a partition type, intra direction/reference list, a transformation depth, etc. that have the highest encoding efficiency. However, an encoding mode determined by the base layer encoding terminal 210 is not limited to the aforementioned encoding modes.

The encoding controller 215 of the base layer encoding terminal 210 may control various encoding modes to be appropriately applied to operations of each configuring element. Also, for inter-layer encoding in the enhancement layer encoding terminal 260, the encoding controller 215 may control the enhancement layer encoding terminal 260 to determine an encoding mode or residual information by referring to the encoding results from the base layer encoding terminal 210.

For example, the enhancement layer encoding terminal 260 may use an encoding mode of the base layer encoding terminal 210 as an encoding mode for the enhancement layer image, or may determine the encoding mode for the enhancement layer image by referring to an encoding mode of the base layer encoding terminal 210. The encoding controller 215 of the base layer encoding terminal 210 may use a current encoding mode from the encoding mode of the base layer encoding terminal 210 so as to determine a current encoding mode of the enhancement layer encoding terminal 260 by controlling a control signal of the encoding controller 265 of the enhancement layer encoding terminal 260.

Similar to the inter-layer encoding system 200 based on a multilayer prediction technique shown in FIG. 2C, an inter-layer decoding system based on the inter-layer prediction technique may be embodied. That is, the inter-layer decoding system for a multilayer video may receive a base layer bitstream and an enhancement layer bitstream. A base layer decoding terminal of the inter-layer decoding system may decode the base layer bitstream and may reconstruct base layer images. An enhancement layer decoding terminal of the inter-layer decoding system for a multilayer video may decode the enhancement layer bitstream by using a reconstructed base layer image and parsed encoding information and may reconstruct enhancement layer images.

Figure 2D:
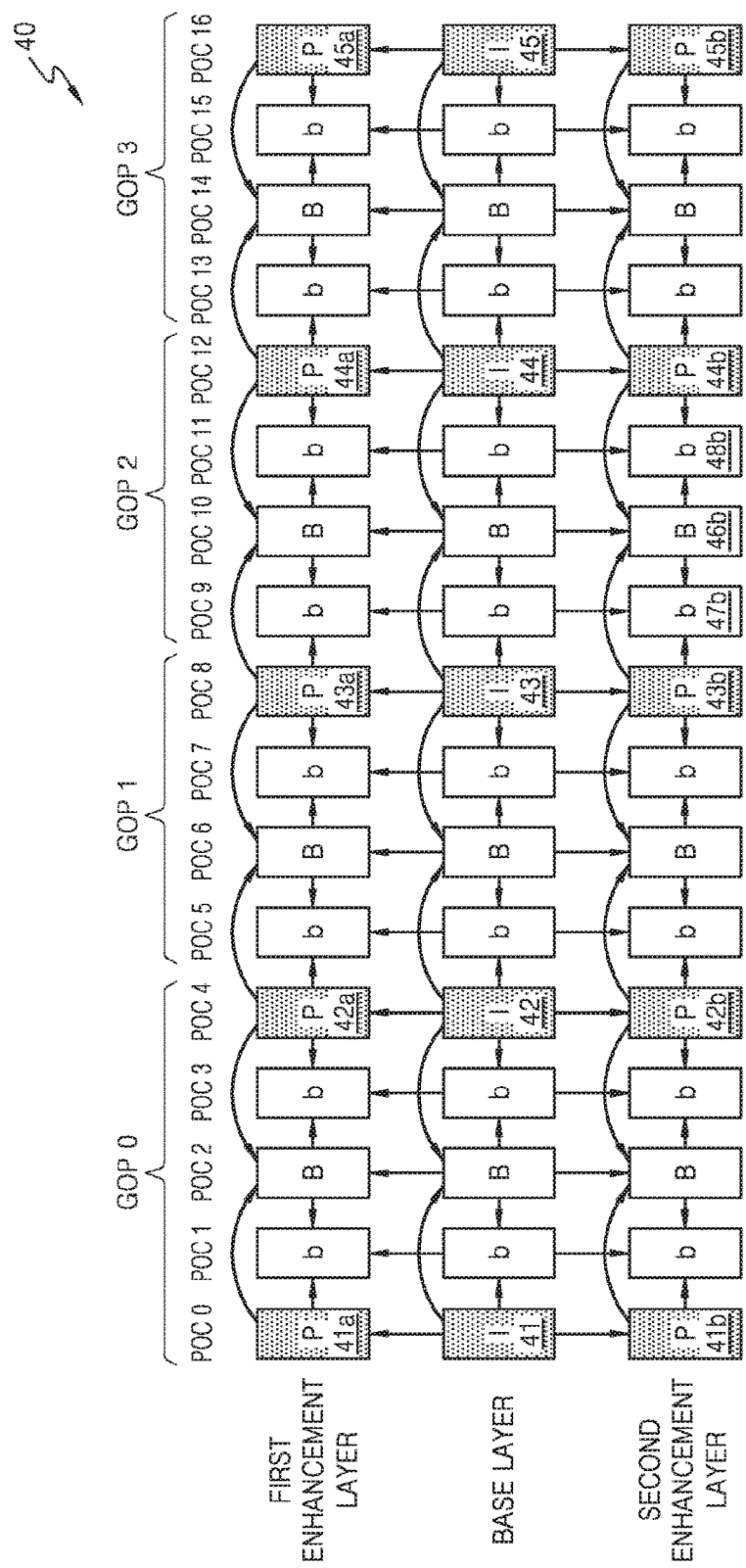
FIG. 2D illustrates a multilayer prediction structure 40 of multilayer images.

FIG. 2D illustrates a multilayer prediction structure 40 of multilayer images.

In the multilayer prediction structure 40 illustrated in FIG. 2D, images are arranged according to a reproduction order POC. According to the reconstruction order and the reproduction order of the multilayer prediction structure 40, the images of the same layer are arranged in the horizontal direction.

Also, the images having the same POC value are arranged in the vertical direction. The POC value of the image may represent the reproduction order of the images constituting a video. "POC X" indicated in the multilayer prediction structure 40 may represent the relative reproduction order of the images located in a relevant column, wherein the reproduction order may be earlier as the number of X decreases, and the reproduction order may be later as the number of X increases.

Thus, according to the reproduction order of the multilayer prediction structure 40, the images of each layer are arranged in the horizontal direction according to the POC value (reproduction order). Also, all of the first and second enhancement layer images located in the same column as the base layer image have the same POC value (reproduction order).

In each layer, four consecutive images constitute a Group of Pictures (GOP). Each GOP includes one anchor picture and images between consecutive anchor pictures.

The anchor picture corresponds to a random access point. When a reproduction position is selected among the arranged images according to the POC value, that is, the reproduction order of an image in the process of reproducing a video, the anchor picture having the most adjacent POC order is reproduced at the reproduction position. The base layer images include base layer anchor pictures 41, 42, 43, 44, and 45; the first enhancement layer images include first enhancement layer anchor pictures 41a, 42b, 43a, 44a, and 45a; and the second enhancement layer images include second enhancement layer anchor pictures 41b, 42b, 43b, 44b, and 45b.

The multilayer images may be reproduced and predicted (reconstructed) in the GOP order. First, according to the reconstruction order and the reproduction order of the multilayer prediction structure 40 of FIG. 2D, in each layer, the images included in GOP 0 may be reconstructed and reproduced and then the images included in GOP 1 may be reconstructed and reproduced. That is, the images included in each GOP may be reconstructed and reproduced in the order of GOP 0, GOP 1, GOP 2, and GOP 3.

According to the reconstruction order and the reproduction order of the multilayer prediction structure 40, inter-layer prediction and inter prediction are performed on the images. In the multilayer prediction structure 40, an image at which an arrow starts corresponds to a reference image, and an image at which an arrow ends corresponds to an image predicted by using the reference image.

In particular, according to the reconstruction order of the multilayer prediction structure 40, the images are arranged in the horizontal direction according to the prediction (reconstruction) order of each image. That is, the images located on the relatively left side are earlier predicted (reconstructed), and the images located on the relatively right side are later predicted (reconstructed). Since the next images are predicted (reconstructed) with reference to the early-reconstructed images, it may be seen that all of the arrows representing the prediction direction between the same layer images in the reconstruction order of the multilayer prediction structure 40 face from the relatively-left images toward the relatively-right images.

The prediction result of the base layer images may be encoded and then output in the form of a base layer stream. Also, the prediction-encoding result of the first enhancement layer images may be output in the form of a first enhancement layer stream, and the prediction-encoding result of the second enhancement layer images may be output in the form of a second enhancement layer stream.

Only inter prediction may be performed on the base layer images. That is, I-type anchor pictures 41, 42, 43, 44, and 45 may not refer to other images, but the B-type and b-type other images may be predicted with reference to other base layer images. The B-type images may be predicted with reference to the following I-type anchor picture and the preceding I-type anchor picture having a preceding POC value. The b-type images may be predicted with reference to the following B-type image and the preceding I-type anchor picture having a preceding POC value, or with reference to the following I-type anchor picture and the preceding B-type image having a preceding POC value.

Inter-layer prediction referring to the base layer images and inter prediction referring to the same-view images may be performed on the first enhancement layer images and the second enhancement layer images.

Like the base layer images, inter-image prediction may also be performed on the first enhancement layer images and inter prediction may also be performed on the second enhancement layer images. Among the first enhancement layer images and the second enhancement layer images, the anchor pictures 41a, 42b, 43a, 44a, 45a, 41b, 42b, 43b, 44b, and 45b may not refer to the same layer images, but the other images that are not anchor pictures may be predicted with reference to the same layer images.

However, among the first enhancement layer images and the second enhancement layer images, the anchor pictures 41a, 42b, 43a, 44a, 45a, 41b, 42b, 43b, 44b, and 45b may also correspond to a P-type image referring to the base layer anchor pictures 41, 42, 43, 44, and 45 having the same POC value.

Also, since both the inter prediction and the inter-layer prediction referring to the base layer images having the same POC may also be performed on the other images that are not the anchor pictures 41a, 42b, 43a, 44a, 45a, 41b, 42b, 43b, 44b, and 45b among the first enhancement layer images and the second enhancement layer images, it may correspond to a B-type image or a b-type image.

The reconstruction process for reproducing the images may also be similar to the prediction process. However, only after the reconstruction of the reference image of each image, each image may be reconstructed by using the reconstructed reference image.

First, each of the base layer images may be reconstructed through motion compensation. When the I-type base layer anchor pictures 41, 42, 43, 44, and 45 are reconstructed, the B-type base layer images may be reconstructed through the motion compensation referring to the base layer anchor pictures 41, 42, 43, 44, and 45. Also, the b-type base layer images may be reconstructed through the motion compensation referring to the I-type or B-type base layer reconstruction images.

Each of the first enhancement layer images and the second enhancement layer images may be encoded through the inter-layer prediction referring to the base layer images and the inter prediction referring to the same-layer images.

That is, for the reconstruction process of the first enhancement layer image, the first enhancement layer images may be reconstructed through the inter-layer variation compensation referring to the base layer images reconstructed after the reconstruction of the base-view reference image. Also, after the reference image of the first enhancement layer is reconstructed, the first enhancement layer images may be reconstructed through the motion compensation referring to the reconstructed reference image of the first enhancement layer.

Also, after the base-view reference image is reconstructed, the second enhancement layer images may be reconstructed through the inter-layer variation compensation referring to the reconstructed base-view reference image. After the reference image of the second enhancement layer is reconstructed, the second enhancement layer images may be reconstructed through the motion compensation referring to the reconstructed reference image of the second enhancement layer.

Figure 2E:
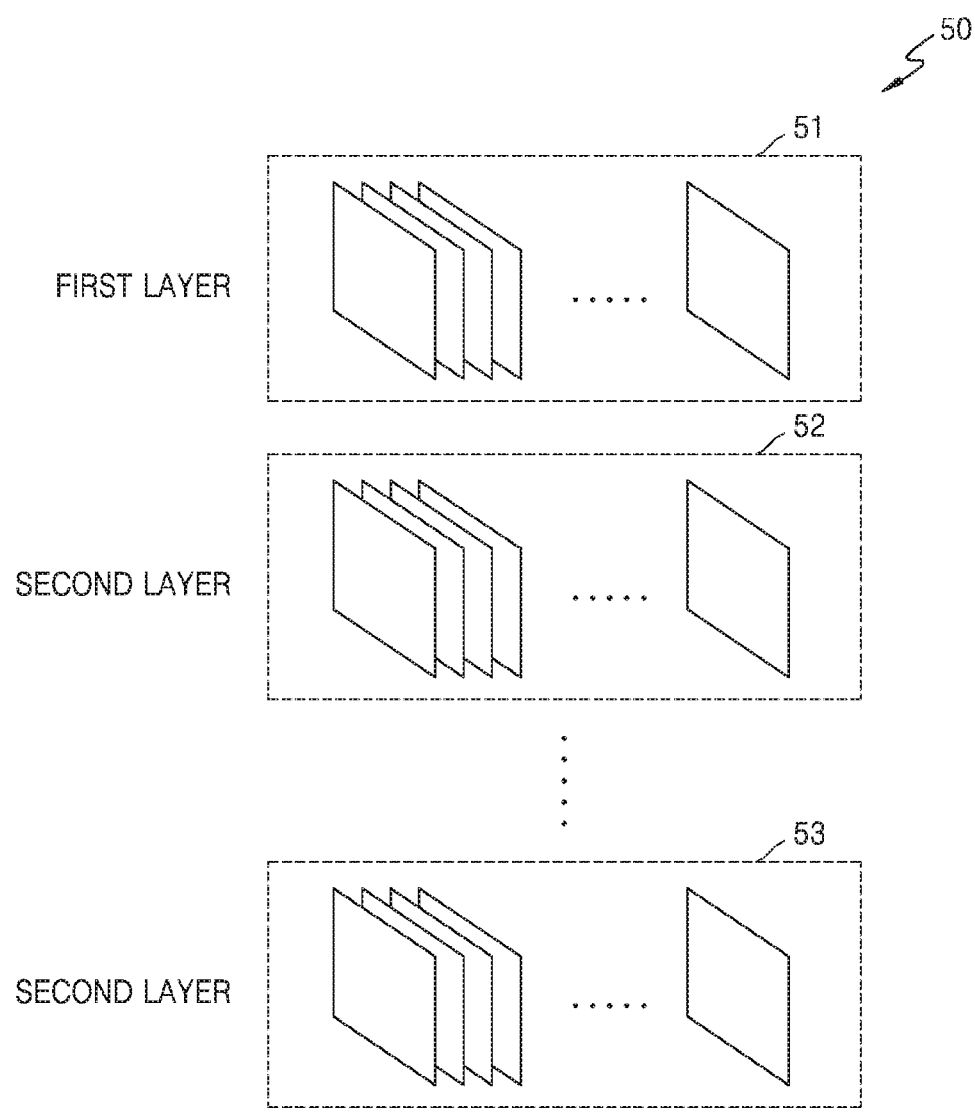
FIG. 2E is a diagram illustrating a multilayer video according to an embodiment of the present invention.

FIG. 2E is a diagram illustrating a multilayer video according to an embodiment of the present invention.

In order to provide an optimal service in various network environments and various terminals, the multilayer video encoding apparatus 10 may output a scalable bitstream by encoding multilayer image sequences having various spatial resolutions, various qualities, various frame rates, and different views. That is, the multilayer video encoding apparatus 10 may generate and output a scalable video bitstream by encoding an input image according to various scalability types. The scalability includes a temporal scalability, a spatial scalability, an image-quality scalability, a multiview scalability, or any combination thereof. The scalabilities may be classified according to the respective types. Also, the scalabilities may be classified as dimension identifiers in the respective types.

For example, the scalability has a scalability type such as a temporal scalability, a spatial scalability, an image-quality scalability, or a multiview scalability. Also, the scalability may be classified as a scalability dimension identifier according to each type. For example, different scalabilities may have different dimension identifiers. For example, as the scalability type has the higher-dimension scalability, the higher scalability dimension may be allocated thereto.

When valid substreams may be divided from a bitstream, the bitstream may be referred to as being scalable. The spatially-scalable bitstream includes substreams of various resolutions. The scalability dimension is used to discriminate between different scalabilities in the same scalability type. The scalability dimension may be represented as a scalability dimension identifier.

For example, the spatially-scalable bitstream may be divided into substreams having different resolutions, such as QVGA, VGA, and WVGA, For example, the respective layers having different resolutions may be discriminated by using dimension identifiers. For example, the QVGA substream may have a spatial scalability dimension identifier value of 0, the VGA substream may have a spatial scalability dimension identifier value of 1, and the WVGA substream may have a spatial scalability dimension identifier value of 2.

The temporally-scalable bitstream includes substreams having various frame rates. For example, the temporally-scalable bitstream may be divided into a substream having a frame rate of 7.5 Hz, a substream having a frame rate of 15 Hz, a substream having a frame rate of 30 Hz, and a substream having a frame rate of 60 Hz. The image-quality scalable bitstream may be divided into substreams having different image qualities according to a Coarse Grained Scalability (CGS) mode, a Medium Grained Scalability (MGS) mode, and a Fine Grained Scalability (FGS) mode. The temporal scalability may also be divided into different dimensions according to different frame rates, and the image-quality scalability may also be divided into different dimensions according to different modes.

The multiview scalable bitstream includes substreams of different views in a bitstream. As an example, in the case of a stereoscopic image, the bitstream includes a left image and a right image. Also, the scalable bitstream may include a multiview image and substreams about the encoded data of a depth map. The view scalability may also be divided into different dimensions according to the respective views.

Different scalable extension types may be combined with each other. That is, the scalable video bitstream may include substreams obtained by encoding multilayer image sequences including images that are different from each other in at least one of a temporal scalability, a spatial scalability, an image-quality scalability, and a multiview scalability.

FIG. 2E illustrates image sequences 51, 52, and 53 having different scalable extension types. The image sequence 51 of the first layer, the image sequence 52 of the second layer, and the image sequence 53 of the nth layer (n: an integer) may be image sequences that are different from each other in at least one of a resolution, an image quality, and a view. Also, one of the image sequence 51 of the first layer, the image sequence 52 of the second layer, and the image sequence 53 of the nth layer (n: an integer) may be a base layer image sequence, and the other layer image sequences may be enhancement layer image sequences.

As an example, the image sequence 51 of the first layer may be the images of the first view, the image sequence 52 of the second layer may be the images of the second view, and the image sequence 53 of the nth layer may be the images of the nth view. As another example, the image sequence 51 of the first layer may be the left-view images of the base layer, the image sequence 52 of the second layer may be the right-view images of the base layer, and the image sequence 53 of the nth layer may be the right-view images of the enhancement layer. However, the inventive concept is not limited thereto, and the image sequences 51, 52, and 53 having different scalable extension types may be respectively image sequences having different image attributes.

FIG. 2F illustrates NAL units including encoded data of a multilayer video according to an embodiment of the present invention.

As described above, the bitstream generator 14 outputs NAL units including encoded multilayer video data and additional information.

A video parameter set (VPS) includes information applied to multilayer image sequences 62, 63, and 64 included in a multilayer video. The NAL unit including VPS-related information will be referred to as a VPS NAL unit 61.

The VPS NAL unit 41 includes, for example, a common syntax element shared by the multilayer image sequences 62, 63, and 64, information about an operation point for preventing unnecessary information transmission, and essential information about an operation point necessary in a session negotiation stage, such as a profile or a level. In particular, according to an embodiment, the VPS NAL unit 61 includes scalability information related to a scalability identifier for implementation of the scalability in the multilayer video. The scalability information is information for determining the scalability applied to the multilayer image sequences 62, 63, and 64 included in the multilayer video.

The scalability information includes information about the scalability dimension and the scalability type applied to the multilayer image sequences 62, 63, and 64 included in the multilayer video. In an encoding/decoding method according to a first embodiment of the present invention, the scalability information may be obtained from the value of a layer identifier included in an NAL unit header. The layer identifier is an identifier for distinguishing a plurality of layers included in the VPS. The VPS may signal the layer identifier for each layer through the VPS extension. The layer identifier for each layer of the VPS may be signaled by being included in the VPS NAL unit. For example, the layer identifier of the NAL units belonging to a particular layer of the VPS may be included in the VPS NAL unit. For example, the layer identifier of the NAL unit belonging to the VPS may be signaled through the VPS extension. Thus, in the encoding/decoding method according to an embodiment of the present invention, by using the VPS, the scalability information about the layer of the NAL units belonging to the VPS may be obtained by using the layer identifier value of the NAL units.

According to an embodiment of the present invention, the decoding apparatus decodes an image by performing inter prediction and inter-layer prediction. A reference picture should be specified in order to perform the inter prediction and the inter-layer prediction. The encoding apparatus generates a reference picture list by using the reference pictures for the current picture.

The encoding apparatus may signal an index where the reference picture is located in the reference picture list, and the decoding apparatus may determine the reference picture used for encoding through the received index. The decoding apparatus may obtain the index where the reference picture is located in the reference picture list, from the bitstream.

The decoding apparatus uses a reference picture set (RPS) in order to set a decoded picture buffer (DPB) and a reference picture list. The decoding apparatus may obtain the reference picture set generated by the encoding apparatus, from the bitstream. The reference picture set includes information for classifying the reference pictures in the decoded picture buffer into a reference picture for the current picture, a reference picture for the future picture, and a picture for output without reference.

One or more reference picture lists may be used according to the slice types, and at most two reference picture lists may be used. When two or more reference picture lists are used, the reference picture set may include information for specifying any one of the reference picture lists.

The reference picture list may include the reference picture used for inter-picture prediction and the reference picture used for inter-layer prediction. The RPS may include POC information about the reference pictures for inter-picture prediction and may include layer identification information about the reference pictures for inter-layer prediction.

The reference picture set may be divided into an inter-picture reference picture set for inter-picture prediction and an inter-layer reference picture set for inter-layer prediction. The inter-picture reference picture set includes POC information about the reference pictures. The inter-picture reference picture set includes POC information about the reference pictures belonging to the same layer as the current picture. The inter-layer reference picture set may include layer identification information about the reference pictures. The inter-layer reference picture set may include layer identification information about the reference pictures having the same POC as the current picture.

When the reference picture set is divided into the inter-picture reference picture set and the inter-layer reference picture set, the decoding apparatus may preferentially include the reference pictures belonging to the inter-picture reference picture set into the reference picture set; and when there is a space in the reference picture list for storing additional reference pictures, the decoding apparatus may insert the reference pictures belonging to the inter-layer reference picture set into the reference picture set.

The decoding apparatus obtains a reference picture layer ID from the bitstream by using an inter-layer prediction layer index that will be described later. Also, the decoding apparatus generates a reference picture list by using the reference picture layer ID. For example, the decoding apparatus may generate the inter-layer reference picture set by using the reference picture layer ID and generate the reference picture list by using the generated inter-layer reference picture set.

As described above, the reference picture set may include the inter-picture reference picture set and the inter-layer reference picture set. The inter-picture reference picture set may indicate the reference pictures necessary for inter-picture prediction of the current picture and the picture that will be decoded afterward. The inter-layer reference picture set may indicate the reference pictures necessary for inter-layer prediction of the current layer.

Direct reference layer information representing the inter-layer dependency on the encoded video sequence may be signaled through a video parameter set (VPS). The inter-layer reference picture set may be signaled through a slice header. The inter-layer reference picture set indicates the reference picture used actually for inter-layer prediction, among the layer that directly depends on in units of pictures.

The inter-layer reference picture set may indicate only the dependent layer necessary for decoding the picture of the current layer. Alternatively, the inter-layer RPS may further indicate whether the inter-layer reference picture necessary for decoding of the upper layer exists in the decoded picture buffer (DPB). Accordingly, the inter-layer reference picture set may be modified and used to indicate the reference pictures necessary for inter-layer prediction in the process of decoding the current layer and the upper layer.

Hereinafter, a method of performing a decoding method according to an embodiment of the present invention by the decoding apparatus according to an embodiment of the present invention will be described in detail with reference to FIGS. 3A to 7E. According to an embodiment of the present invention, the decoding apparatus may together perform at least one decoding method illustrated in FIGS. 3A to 7E. Also, the encoding apparatus may perform encoding corresponding to the decoding method described below.

Figure 3A:
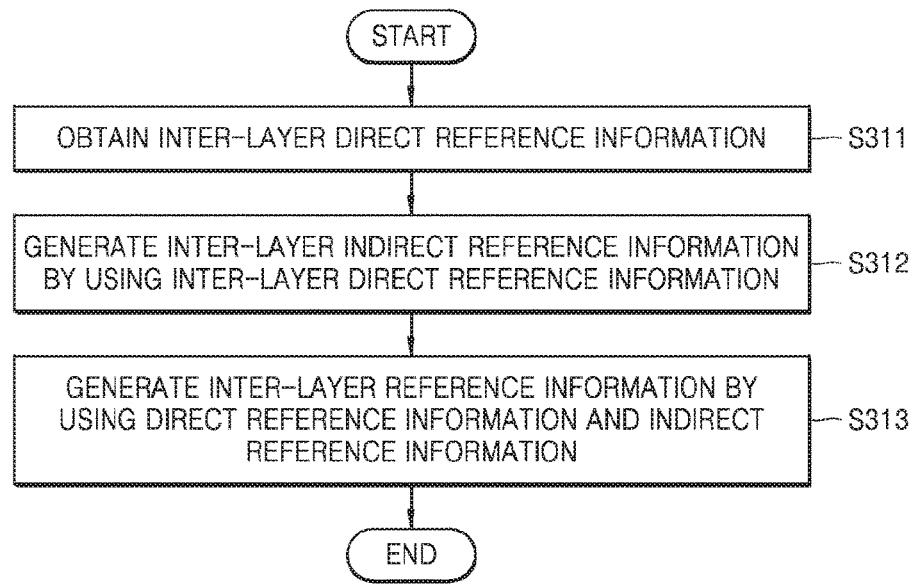
FIG. 3A is a flowchart illustrating an inter-layer reference information generating method according to an embodiment of the present invention.

FIG. 3A is a flowchart illustrating an inter-layer reference information generating method according to an embodiment of the present invention.

Referring to FIG. 3A, first, a decoding apparatus according to an embodiment of the present invention obtains inter-layer direct reference information (S311). The decoding apparatus may obtain inter-layer direct reference information Direct_dependency_flag from a bitstream. The direct reference information Direct_dependency_flag may be obtained from the bitstream corresponding to a VPS.

The direct reference information Direct_dependency_flag represents inter-layer direct reference information. For example, when Direct_dependency_flag[i][j] has a value of 0, it indicates that a layer having an index j is not a direct reference layer of a layer having an index i. When Direct_dependency_flag[i][j] has a value of 1, it indicates that a layer having an index j is a direct reference layer of a layer having an index i. When Direct_dependency_flag[i][j] is not provided for i and j, the value of Direct_dependency_flag[i][j] is inferred to be 0. The indexes i and j may have an integer value of 0 to vps_max_layers_minus1.

Next, the decoding apparatus generates inter-layer indirect reference information by using the inter-layer direct reference information (S312). The decoding apparatus may determine the indirect reference information by using the direct reference information. For example, when the upper layer k of the current layer i refers to the lower layer j of the current layer i, the decoding apparatus may determine that the layer i indirectly refers to the layer j. Accordingly, the decoding apparatus may determine the indirect reference information representing the inter-layer indirect reference information. Here, i, k, and j have a relationship of 0=<j<i<k<maximum layer number and have integer values.

Figure 3B:
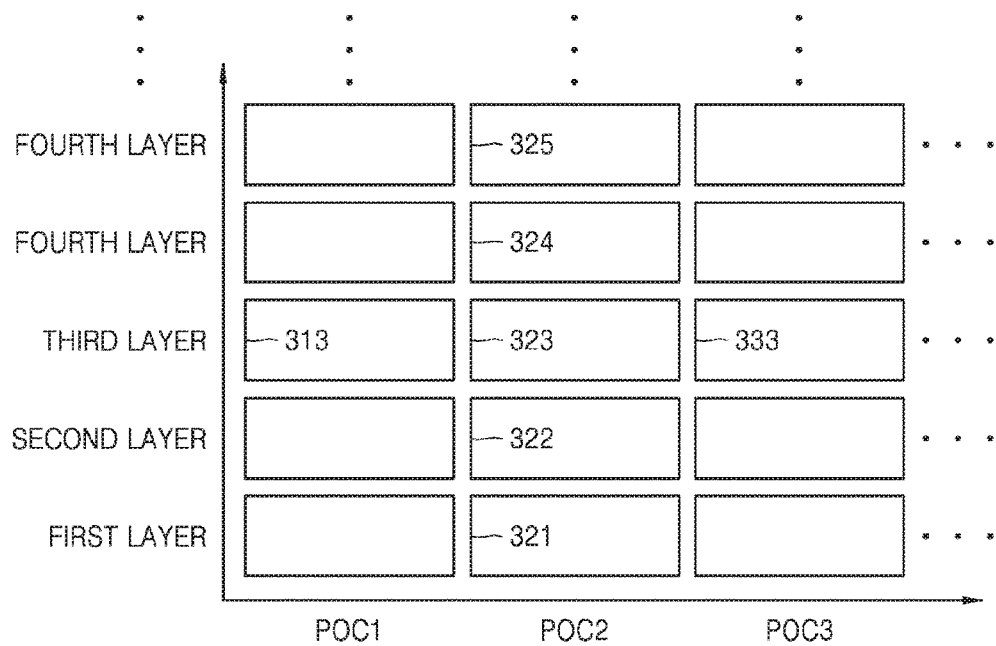
FIG. 3B is a conceptual diagram illustrating the relationship between a plurality of layers.

FIG. 3B is a conceptual diagram illustrating a plurality of layers. Although FIG. 3B illustrates first to fifth layers, an image may be encoded by using the more layers than the illustrated layers. Each layer includes at least one picture. Each picture is identified as a POC. The POC refers to an index according to the decoding order. For example, the third layer may include a first picture 313 of POC 1, a second picture 323 of POC 2, and a third picture 333 of POC 3. Although FIG. 3B illustrates only three pictures in each layer, the number of pictures included in the layer is not limited thereto.

The pictures belonging to each layer may be decoded with reference to the picture of another layer. Inter-layer prediction is performed in order to perform encoding and decoding through the inter-layer picture reference. The decoding apparatus may perform inter-layer prediction between the pictures having the same POC. For example, when a picture of POC 2 of the fifth layer is encoded and decoded by inter-layer prediction, the encoding apparatus and the decoding apparatus may perform inter-layer prediction on a picture 325 of POC 2 of the fifth layer with reference to the pictures 321, 322, 323, and 324 of POC 2 of another layer.

In the same layer, the respective pictures may be referred to each other by inter-picture prediction. For example, the first picture 313, the second picture 323, and the third picture 333 of the third layer may be referred to each other by inter-picture prediction. The inter-picture prediction may also be referred to as inter prediction.

An example of determining the indirect reference information by the decoding apparatus will be described below with reference to FIG. 3B.

When it is determined that the third layer directly refers to the first layer according to the inter-layer direct reference information, regardless of whether the second layer directly refers to the first layer, it may be determined that the second layer indirectly refers to the first layer. Likewise, when the third layer directly refers to the first layer and the fourth layer directly refers to the first layer, the decoding apparatus may determine that the third layer indirectly refers to the first layer.

Next, the decoding apparatus generates inter-layer reference information by using the direct reference information and the indirect reference information (S313).

According to an embodiment of the present invention, the decoding apparatus may determine the reference information of a layer by using a direct reference flag and an indirect reference flag. For example, when the layer i directly refers to the layer j, the layer identifier of the layer j is inserted into a reference layer identifier list RefLayerId of the layer i. Also, the layer identifier of the layer j is inserted into a dependent layer identifier list DepLayerId of the layer i.

Also, the index indicating the layer j in the reference layer identifier list of the layer i is inserted into a direct reference layer index list DirectRefLayerIdx of the layer i.

Also, the index indicating the layer j in the dependent layer identifier list of the layer i is inserted into a dependent layer index list DepLayerIdx of the layer i.

When the layer i does not directly refer to the layer j but indirectly refers to the layer j, the layer identifier of the layer j is inserted into the dependent layer identifier list of the layer i. Also, the index indicating the layer j in the dependent layer identifier list of the layer i is inserted into the dependent layer index list DepLayerIdx of the layer i.

In addition, NumDirectRefLayers[i], RefLayerId[i][j], SamplePredEnabledFlag[i][j], MotionPredEnabledFlag[i][j], DirectRefLayerIdx[i][j], IndirectDependencyFlag[i][j], NumDepLayers[i], DepLayerId[i][j], and DepLayerIdx[i][j] may be derived as follows.

TABLE 1

```
for( i = 0; i <= vps_max_layers_minus1; i++ ) {
    iNuhLId = layer_id_in_nuh[ i ]
    NumDirectRefLayers[ iNuhLId ] = 0
    NumDepLayers[ iNuhLId ] = 0
    for( j = 0; j < i; j++ ){
        IndirectDependencyFlag[ i ][ j ] = 0
        for( k = i+1; k <= vps_max_layers_minus1; k++ )
            if( direct_dependency_flag[ k ][ j ] )
                IndirectDependencyFlag[ i ][ j ] = 1
        if( direct_dependency_flag[ i ][ j ] ){
            RefLayerId[ iNuhLId ][ NumDirectRefLayers[ iNuhLId ]++ ] = layer_id_in_nuh[ j ]
            DepLayerId[iNuhLId][ NumDepLayers[ iNuhLId ]++ ] = layer_id_in_nuh[ j ]
            SamplePredEnabledFlag[ iNuhLId ][ j ] =
 ( ( direct_dependency_type[ i ][ j ] + 1 ) & 1 )
            MotionPredEnabledFlag[ iNuhLId ][ j ] =
 ( ( ( direct_dependency_type[ i ][ j ] + 1 ) & 2 ) >> 1 )
            DirectRefLayerIdx[ iNuhLid ][ layer_id_in_nuh[ j ] ] = NumDirectRefLayers[ iNuhLId ] - 1
            DepLayerIdx[ iNuhLid ][ layer_id_in_nuh[ j ] ] = NumDepLayers[ iNuhLId ] - 1
        }
        else if(IndirectDependencyFlag[ i ][ j ]) {
            DepLayerId[iNuhLId][ NumDepLayers[ iNuhLId ]++ ] = layer_id_in_nuh[ j ]
            DepLayerIdx[ iNuhLid ][ layer_id_in_nuh[ j ] ] = NumDepLayers[ iNuhLId ] - 1
        }
    }
}
```

The reference picture layer identifier list may be determined by using the dependent layer identifier list determined as above. A pseudo code therefor is illustrated in FIG. 3C.

FIG. 3C illustrates a pseudo code for determining a reference picture layer identifier for a current picture by using a syntax element obtained from a bitstream for a slice segment.

In FIG. 3C, inter-layer prediction allowance information (inter_layer_pred_enabled_flag) 351 is information indicating whether inter-layer prediction may be used for decoding. When the inter_layer_pred_enabled_flag has a value of 1, it indicates that inter-layer prediction may be used for decoding the current picture. When the inter_layer_pred_enabled_flag has a value of 0, it indicates that inter-layer prediction is not used for decoding the current picture.

Dependent layer number information (num_dependent_layers) 352 represents the number of pictures usable for decoding the current picture and the picture included in the current access unit having a nuh_layer_id greater than the current nuh_layer_id for inter-layer prediction. The length of a Num_dependent_layers syntax element may be Ceil(Log2(NumDepLayers[nuh_layer_id])) bits. The value of the num_dependent_layers syntax element may have an integer value of 0 to NumDepLayers[nuh_layer_id]−1.

Dependent layer identifier list reference information (used_by_curr_layer_flag) 353 represents a variable RefPicLayerId representing the nuh_layer_id of the ith picture that may be used by the current picture for inter-layer prediction. When not provided, the value of the used_by_curr_layer_flag is inferred to be 0.

For example, a variable RefPicLayerId[i] for i having a value of 0 to NumActiverefLayerPics−1 is derived to have a particular value of the dependent layer identifier list as follows. When the value of the used_by_curr_layer_flag is 0, the value of the RefPicLayerId[i] may be preset or may not be preset.

TABLE 2

```
for( i = 0; i < num_dependent_layer; i++)
    if(used_by_curr_layer_flag[ i ]) {
        RefPicLayerId[ i ] = DepLayerId
 [ nuh_layer_id ][ inter_layer_pred_layer_idc[ i ] ]
```

For bitstream adaptability, it is required that the value of max_tid_il_ref_pics_plus1[LayerIdxInVps[RefPicLayerId[i]]] is greater than the value of TemporalId with respect to each i having a value of 0 to NumActiveRefLayerPics−1, or that the value of max_tid_il_ref_pics_plus1[LayerIdxInVps[RefPicLayerId[i]]] and the value of TemporalId are all 0 and the picture in the current access unit having the RefPicLayerId[i] value as the nuh_layer_id is an RAP picture.

The variable NumActiveRefLayerPics may be derived as follows.

TABLE 3

```
if( nuh_layer_id = = 0 | | NumDirectRefLayers[ nuh_layer_id ] = = 0 )
    NumActiveRefLayerPics = 0
else if( all_ref_layers_active_flag )
    NumActiveRefLayerPics = NumDirectRefLayers[ nuh_layer_id ]
else if( !inter_layer_pred_enabled_flag )
    NumActiveRefLayerPics = 0
else if( max_one_active_ref_layer_flag | |
NumDirectRefLayers[ nuh_layer_id ] = = 1 )
    NumActiveRefLayerPics = 1
else
    NumActiveRefLayerPics = NumInterlayerPredRef
```

An inter-layer prediction layer index (inter_layer_pred_layer_idc) may represent a variable RefPicLayerIdInDPB representing the nuh_layer_id of the ith picture that may be used by the current picture for inter-layer prediction.

The inter-layer prediction layer index may also represent a variable RefPicLayerIdInDPB representing the nuh_layer_id of the ith picture that may be used by the current picture and the picture having the nuh_layer_id greater than the nuh_layer_id of the current picture for inter-layer prediction. For example, the inter_layer_pred_layer_idc[i] may also represent a variable RefPicLayerIdInDPB[i] representing the nuh_layer_id of the ith picture that may be used by the current picture and the picture having the nuh_layer_id greater than the nuh_layer_id of the current picture for inter-layer prediction. The nuh_layer_id is a layer identifier stored in the NAL unit header.

The length of the syntax element inter_layer_pred_layer_idc[i] is Ceil(Log2(nuh_layer_id)) bits. The value of the inter_layer_pred_layer_idc[i] has a value of 0 to nuh_layer_id−1. When not provided, the inter_layer_pred_layer_idc[i] may be inferred to be equal to i.

For example, when the value of the layer identifier of the current layer currently-decoded is 0 or the number of layers to which the current layer directly refers is 0, the number of pictures of the activation reference layer is 0. When the value of the all_ref_layers_active_flag is 1, the NumActiveRefLayerPics is determined to be equal to the number of direct reference layers to which the current layer refers. When inter-layer prediction is not performed, the number of activation reference layers is 0. When the value of the inter_layer_pred_enabled_flag is 1, the decoding apparatus may determine that inter-layer prediction is not performed.

When the value of max_one_active_ref_layer_flag is not 0 or the value of the NumDirectRefLayers[nuh_layer_id] is 1, the decoding apparatus may determine that the NumActiveRefLayerPics is 1. Otherwise, the decoding apparatus may determine the value of the NumActiveRefLayerPics as NumInterlayerPredRef. All slices of the encoded picture have a value equal to the NumActiveRefLayerPics.

Since the inter-layer reference picture set is used to indicate the reference pictures necessary for inter-layer prediction in the decoding process of the current layer and the upper layer, the recoverability from an error increases in comparison with the decoding process. For example, when the picture of the lower layer belonging to the layer identifier list (TargetDecLayerIdList) of the lower layers used for inter-layer prediction of the current layer or the upper layer is lost, even when the lost picture is not used as the inter-layer reference picture for decoding of the current picture, the inter-layer RPS may be parsed to detect such a loss.

In addition, since the inter-layer reference picture set is used to indicate the reference pictures necessary for inter-layer prediction in the decoding process of the current layer and the upper layer, the decoding apparatus may perform reference picture marking. For example, the decoded picture in the current access unit belonging to the inter-layer RPS is marked as "being used for long-term reference". The decoded picture in the current access unit not belonging to the inter-layer RPS is marked as "being used for short-term reference". The decoded picture not belonging to the inter-layer RPS and the inter-picture RPS is marked as "not being used for reference".

The decoded picture existing in the DPB and having the same POC value as the current picture marked as "being used for long-term reference" may be up-sampled, and all motion vectors thereof may be up-scaled. The decoded pictures included in the DPB having the same POC value as the current picture marked as "being used for short-term reference" may not be up-sampled.

In addition, since the inter-layer reference picture set is used to indicate the reference pictures necessary for inter-layer prediction in the decoding process of the current layer and the upper layer, the decoding apparatus may early remove the picture that is not used for reference. For example, when a decoded picture having the same TemporalId as HighestTid is not included in the inter-layer RPS, the decoded picture is marked as "not being used for reference".

The decoding apparatus may early remove the unused reference pictures according to the direct reference information (direct_dependency_flag) signaled in the video parameter set. When the number of activation direct reference layers inferred from the inter-layer RPS is different from the number of direct dependent layers inferred from the VPS, the decoding apparatus may early remove the more decoded pictures, which are not to be used for inter-layer prediction, from the DPB.

Figure 4A:
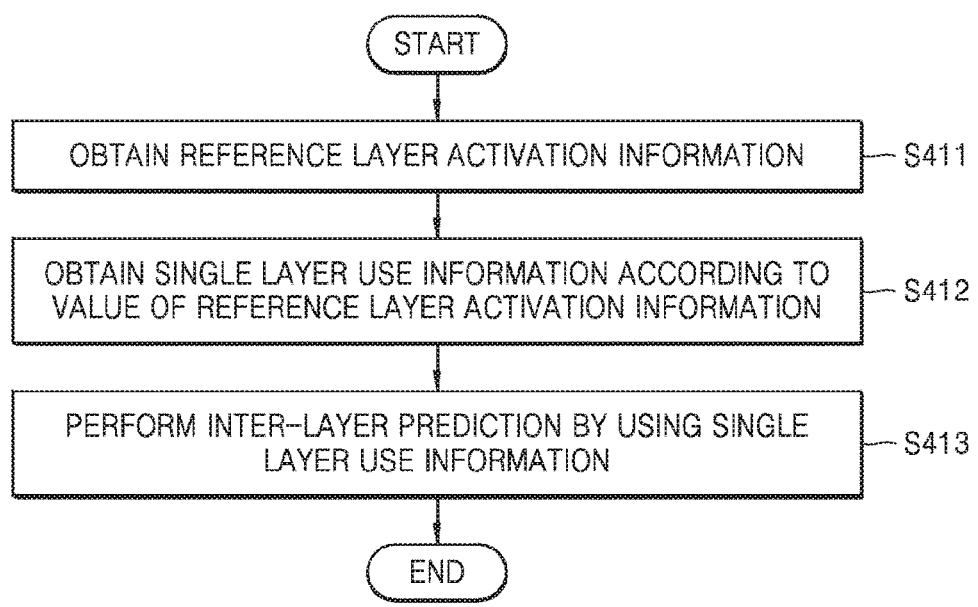
FIG. 4A is a flowchart illustrating a decoding method using single layer use information and reference layer activation information according to an embodiment of the present invention.

FIG. 4A is a flowchart illustrating a decoding method according to an embodiment of the present invention. According to an embodiment of the present invention, the decoding apparatus may decode an image by performing inter prediction and inter-layer prediction by using the reference layer activation information and the single layer use information.

First, according to an embodiment of the present invention, the decoding apparatus may obtain the reference layer activation information (all_ref_layers_active_flag) indicating that the encoded pictures of all direct dependent layers of the layer are included in the inter-layer reference picture set of the picture of each layer, from the bitstream (S411).

For example, by having a value of 1, the all_ref_layers_active_flag may indicate that the encoded pictures of all direct dependent layers of each layer are included in the inter-layer reference picture set of the picture of each layer. By having a value of 0, the all_ref_layers_active_flag may indicate that the above limitation may be or may not be applied.

According to an embodiment of the present invention, the decoding apparatus may obtain the reference layer activation information with respect to each layer. For example, the all_ref_layers_active_flag may be obtained on a layer-by-layer basis. By having a value of 1, the all_ref_layers_active_flag[i] may indicate that the encoded pictures of all direct dependent layers of the ith layer are included in the inter-layer reference picture set of the picture of the ith layer. By having a value of 0, the all_ref_layers_active_flag[i] may indicate that the above limitation may be or may not be applied.

According to an embodiment of the present invention, by using the all_ref_layers_active_flag[i], the decoding apparatus may independently limit the inclusion of the inter-layer reference pictures into the inter-layer reference picture set with respect to each layer. Thus, the decoding method according to an embodiment of the present invention may perform more bit-efficient signaling of the inter-layer reference picture set.

Next, when the reference layer activation information indicates that the encoded pictures of all direct dependent layers of the layer are included in the inter-layer reference picture set of the picture of each layer, the decoding apparatus according to an embodiment of the present invention may obtain the single layer use information (max_one_active_ref_layer_flag) indicating that at most one picture is used for inter-layer prediction (S412).

Next, the decoding apparatus according to an embodiment of the present invention performs inter-layer prediction by using the single layer use information (max_one_active_ref_layer_flag) (S413). By having a value of 1, the max_one_active_ref_layer_flag may indicate that at most one picture is used for inter-layer prediction about each picture in a coded video sequence (CVS). Accordingly, when the max_one_active_ref_layer_flag is 1, the decoding apparatus according to an embodiment of the present invention may determine that at most one picture is used for inter-layer prediction about each picture in the CVS. When the max_one_active_ref_layer_flag is 0, the decoding apparatus according to an embodiment of the present invention may determine that two or more pictures may be used for inter-layer prediction about each picture in the CVS.

The single layer use information may be obtained on a layer-by-layer basis. For example, when the max_one_active_ref_layer_flag[i] is 1, the decoding apparatus according to an embodiment of the present invention may determine that at most one picture is used for inter-layer prediction about each picture of the ith layer in the CVS. When the max_one_active_ref_layer_flag is 0, the decoding apparatus according to an embodiment of the present invention may determine that two or more pictures may be used for inter-layer prediction about each picture in the CVS.

According to an embodiment of the present invention, by using the max_one_active_ref_layer_flag[i], the decoding apparatus may independently limit the inclusion of the inter-layer reference pictures into the inter-layer reference picture set with respect to each layer. Thus, the decoding apparatus according to an embodiment of the present invention may perform more bit-efficient signaling of the inter-layer reference picture set. In addition, when the all_ref_layers_active_flag[i] is 1, the max_one_active_ref_layer_flag[i] may be inferred to have a value of 0 without signaling. For example, when the all_ref_layers_active_flag[i] is 1, the decoding apparatus according to an embodiment of the present invention may infer that the max_one_active_ref_layer_flag[i] is not separately signaled and has a value of 0.

The decoding apparatus according to an embodiment of the present invention may obtain the determined reference layer activation information and the single layer use information from the bitstream as illustrated in FIGS. 4B and 4C.

FIG. 4B is a diagram illustrating a pseudo code for obtaining single layer use information and reference layer activation information from a bitstream corresponding to VPS_extension. Referring to FIG. 4B, the decoding apparatus according to an embodiment of the present invention may obtain the reference layer activation information for each layer from the bitstream corresponding to the VPS_extension according to the index i (411). The decoding apparatus according to an embodiment of the present invention may further obtain the single layer use information for each layer from the bitstream according to the value of the reference layer activation information (413).

For example, when the reference layer activation information indicates that the encoded pictures of all direct dependent layers of the ith layer are included in the inter-layer reference picture set of the picture of the ith layer, the decoding apparatus further obtains the single layer use information for the ith layer from the bitstream (412). When the reference layer activation information does not indicate that the encoded pictures of all direct dependent layers of the ith layer are included in the inter-layer reference picture set of the picture of the ith layer, the decoding apparatus does not further obtain the single layer use information for the ith layer from the bitstream (412).

When the all_ref_layers_active_flag[i] is 1, the decoding apparatus according to an embodiment of the present invention determines that, with respect to each picture of the ith layer, the reference layer pictures of all direct reference layers of the ith layer are provided in the same access unit as the decoded picture and are included in the inter-layer reference picture set of the picture. When the all_ref_layers_active_flag[i] is 0, the decoding apparatus according to an embodiment of the present invention determines that the above limitation may be or may not be applied.

When the max_one_active_ref_layer_flag[i] is 1, the decoding apparatus according to an embodiment of the present invention determines that at most one picture is used for inter-layer prediction about each picture of the ith layer in the CVS. When the max_one_active_ref_layer_flag is 0, the decoding apparatus according to an embodiment of the present invention determines that two or more pictures may be used for inter-layer prediction about each picture of the ith layer in the CVS.

FIG. 4C is a diagram illustrating a pseudo code for obtaining single layer use information and reference layer activation information from a bitstream corresponding to a slice segment header. Referring to FIG. 4C, the identifier value of the layer including the current slice segment is greater than 0, the value of the reference layer activation information of the current slice segment is 1, and there are one or more direct reference layers of the current layer (421), the decoding apparatus according to an embodiment of the present invention obtains the inter-layer prediction allowance information from the bitstream (422).

Next, when the inter-layer prediction allowance information is 1 and there are one or more direct reference layers of the current layer (423), the decoding apparatus according to an embodiment of the present invention obtains the inter-layer reference picture number information according to the single layer use information (424) from the bitstream (425). In addition, when the inter-layer prediction allowance information is 1 and there are one or more direct reference layers of the current layer (423), the decoding apparatus according to an embodiment of the present invention obtains the inter-layer prediction layer index (428) from the bitstream by the activation reference layer picture number information (427) according to the activation reference layer picture number information and the direct reference layer number information of the current layer (426).

Figure 5A:
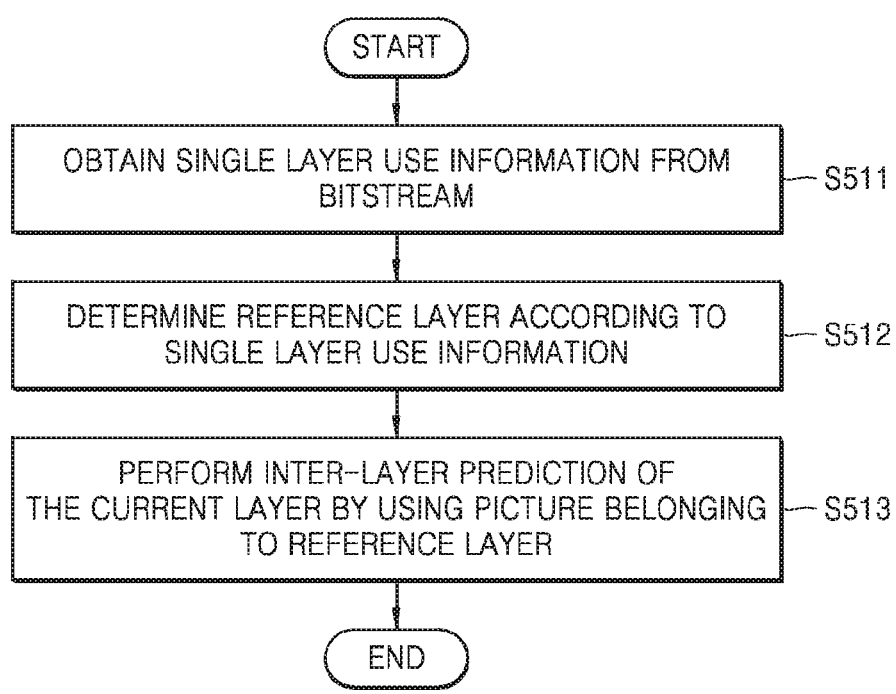
FIG. 5A is a flowchart illustrating a decoding method using single layer use information according to an embodiment of the present invention.

FIG. 5A is a flowchart illustrating a decoding method according to an embodiment of the present invention. According to an embodiment of the present invention, the decoding apparatus may decode an image by performing inter prediction and inter-layer prediction by using the single layer use information.

The decoding apparatus according to an embodiment of the present invention may obtain the single layer use information (max_one_active_ref_layer_flag) indicating that at most one picture is used for inter-layer prediction, from the bitstream (S511).

Next, the decoding apparatus according to an embodiment of the present invention determines the reference layer according to the single layer use information (S512). When the max_one_active_ref_layer_flag is 1, the decoding apparatus according to an embodiment of the present invention may determine that at most one picture is used for inter-layer prediction about each picture in the CVS.

In addition, the decoding apparatus may determine that the picture included in the inter-layer reference set is the picture having the maximum nuh_layer_d value among the direct dependent layers of the current picture. The decoding apparatus may determine the layer having the maximum layer identifier value among the direct dependent layers of the current picture, as the reference layer.

For example, in general, the max_one_active_ref_layer_flag is 1 when the bitstream is encoded with respect to the scalability extension. In the scalability extension, in most cases, only the direct dependent layer having the highest nuh_layer_id is included in the reference picture set of the pictures as the reference picture. When the value of the max_one_active_ref_layer_flag is 1, the decoding apparatus according to an embodiment of the present invention may determine that only the dependent layer having the highest nuh_layer_id value is included in the inter-layer reference picture set, rather than any dependent layer may be included in the inter-layer reference picture set.

By having a value of 0, the max_one_active_ref_layer_flag may indicate that two or more pictures may be used for inter-layer prediction about each picture in the CVS. Thus, when the max_one_active_ref_layer_flag is 0, the decoding apparatus according to an embodiment of the present invention may determine that two or more layers may be used for inter-layer prediction about each picture in the CVS.

Next, the decoding apparatus according to an embodiment of the present invention performs inter-layer prediction of the current picture by using the picture belonging to the reference layer (S513).

FIG. 5B is a diagram illustrating a pseudo code for obtaining a syntax element for performance of inter-layer prediction from a bitstream by obtaining a single layer use flag by a decoding apparatus according to an embodiment of the present invention.

Referring to FIG. 5B, by having a value of 1, the max_one_active_ref_layer_flag may indicate that at most one picture is used for inter-layer prediction about each picture in the CVS and the picture included in the inter-layer reference set should have the maximum nuh_layer_d value among the direct dependent layers of the picture. In this case, when the max_one_active_ref_layer_flag is 1, the decoding apparatus according to an embodiment of the present invention may determine that at most one picture is used for inter-layer prediction about each picture in the CVS and the picture included in the inter-layer reference set should have the maximum nuh_layer_d value among the direct dependent layers of the picture.

By having a value of 0, the max_one_active_ref_layer_flag may indicate that two or more pictures may be used for inter-layer prediction about each picture in the CVS. Thus, when the max_one_active_ref_layer_flag is 0, the decoding apparatus according to an embodiment of the present invention may determine that two or more pictures may be used for inter-layer prediction about each picture in the CVS.

The inter_layer_pred_layer_idc[i] is the inter-layer prediction layer index information indicating that the variable RefPicLayerId[i] representing the nuh_layer_id of the ith picture may be used for inter-layer prediction by the current picture. The length of the inter_layer_pred_layer_idc[i] may be Ceil(Log2(NumDirectRefLayers[nuh_layer_id])) bits. The value of the inter_layer_pred_layer_idc[i] may have a value of 0 to NumDirectRefLayers[nuh_layer_id]−1. When the value of the inter_layer_pred_layer_idc[i] is not provided, the value of the inter_layer_pred_layer_idc[i] may be inferred to be equal to i.

When the max_one_active_ref_layer_flag is 1 and the inter_layer_pred_enabled_flag is 1, the decoding apparatus according to an embodiment of the present invention may determine the inter_layer_pred_layer_idc[0] as the value of the NumDirectRefLayers[nuh_layer_id]−1.

Referring to FIG. 5B, when the inter-layer prediction allowance information represents the allowance of inter-layer prediction and there are two or more direct reference layers of the current layer, the decoding apparatus according to an embodiment of the present invention checks the value of the single layer use flag (511).

When the single layer use flag indicates that at most one picture is used to perform inter-layer prediction, the decoding apparatus according to an embodiment of the present invention may perform inter-layer prediction by using the dependent layer picture having the maximum layer identifier value among the direct dependent layers.

When the single layer use flag does not indicate that at most one picture is used to perform inter-layer prediction, the decoding apparatus according to an embodiment of the present invention obtains the inter-layer reference picture number information (num_inter_layer_ref_pics_minus1) (512) and obtains the inter-layer prediction layer index (inter_layer_pred_layer_idc) (515) from the bitstream by the activation reference layer picture number information (514) according to the activation reference layer picture number information (NumActiveRefLayerPics) and the direct reference layer number information (NumDirectRefLayers) of the current layer (513).

The value obtained by adding 1 to the num_inter_layer_ref_pics_minus1 represents the number of pictures that may be used for decoding the current picture by performing inter-layer prediction.

The NumActiveRefLayerPics may be derived by the following equation. The numRefLayerPics is a variable representing the number of reference layer pictures.

TABLE 4

```
if( nuh_layer_id = = 0 | | numRefLayerPics = = 0 )
    NumActiveRefLayerPics = 0
else if(all_ref_layers_active_flag)
    NumActiveRefLayerPics = numRefLayerPics
else if( !inter_layer_pred_enabled_flag )
    NumActiveRefLayerPics = 0
else if( max_one_active_ref_layer_flag | |
NumDirectRefLayers[ nuh_layer_id ] = = 1 )
    NumActiveRefLayerPics = 1
else
    NumActiveRefLayerPics = num_inter_layer_ref_pics_minus1 + 1
```

Figure 6A:
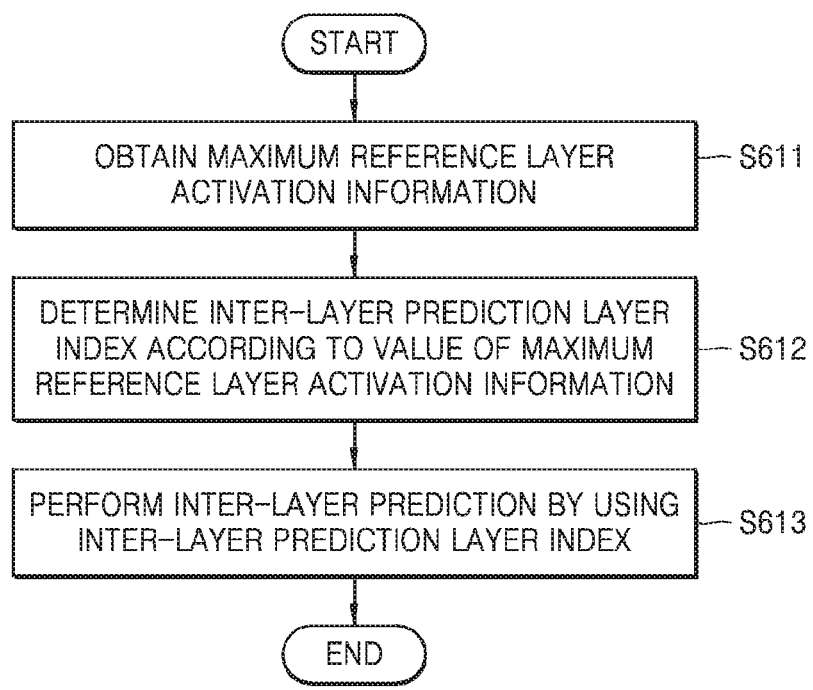
FIG. 6A is a diagram illustrating a decoding method according to an embodiment of the present invention.

FIG. 6A is a diagram illustrating a decoding method according to an embodiment of the present invention.

The decoding apparatus according to an embodiment of the present invention obtains the maximum reference layer activation information (high_ref_layers_active_flag) from the bitstream (S611).

Next, the decoding apparatus determines the inter-layer prediction layer index according to the value of the maximum reference layer activation information (S612). When the value of the high_ref_layers_active_flag is 1, the decoding apparatus infers that the ith inter-layer prediction layer index (inter_layer_pred_layer_idc[i]) is equal to the NumDirectRefLayers[nuh_layer_id]−1−i. Here, "i" has a value of 0 to NumActiveRefLayerPics−1.

Next, the decoding apparatus performs inter-layer prediction by using the inter-layer prediction layer index (S613).

FIG. 6B illustrates a pseudo code for performing a decoding method according to an embodiment of the present invention.

The high_ref_layers_active_flag is obtained from the bitstream for the segment header. When the high_ref_layers_active_flag is 0, the inter_layer_pred_layer_idc[i] is explicitly transmitted. When the high_ref_layers_active_flag is 1, the inter_layer_pred_layer_idc[i] represents the inference as the NumDirectRefLayers[nuh_layer_id]−1−i, where "i" has a value of 0 to NumActiveRefLayerPics−1.

Figure 7A:
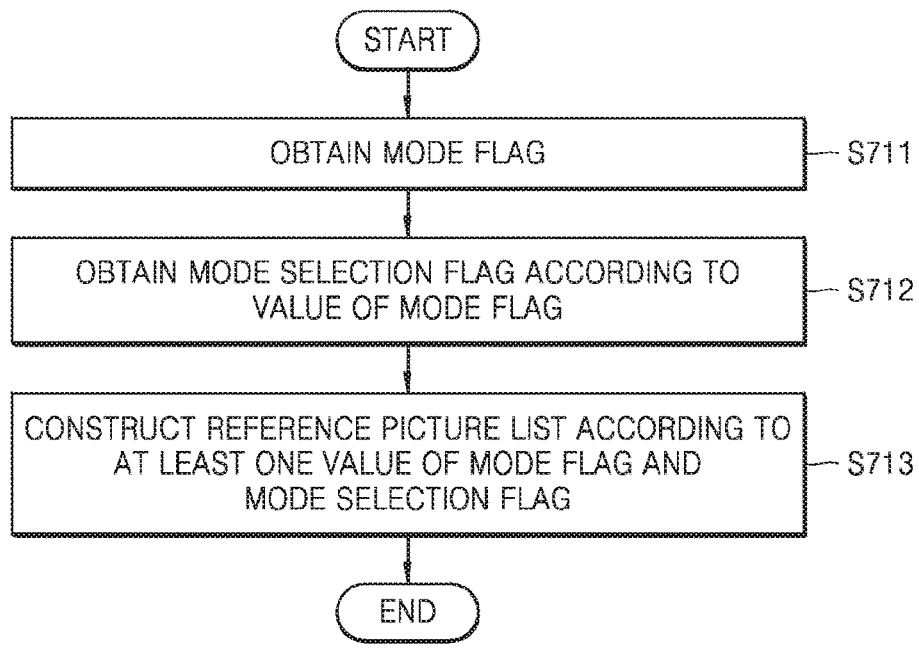

FIG. 7A is a diagram illustrating a reference picture set obtaining method according to an embodiment of the present invention. First, the decoding apparatus according to an embodiment of the present invention obtains the mode flag from the bitstream (S711). The mode flag indicating whether any one of the two basic modes is used may be added to the VPS. When the value of the mode flag is 1, a mode selection flag may be added. Next, the decoding apparatus according to an embodiment of the present invention obtains the mode selection flag from the bitstream according to the value of the mode flag (S712).

Next, the decoding apparatus according to an embodiment of the present invention constructs a reference picture list according to at least one of the mode flag value and the mode selection flag value (S713).

By having a value of 1, the mode selection flag may indicate that all direct reference layers are provided and a first mode, in which all direct reference layers are included in the inter-layer RPS subset of each picture referring to the VPS, is used. Also, by having a value of 0, the mode selection flag may indicate that the highest direct reference layer picture is provided for each picture referring to the VPS and a second mode, in which only the highest direct reference layer picture is included in the inter-layer RPS, is used. The first mode may be used in MV_HEVC. The second mode may be mainly used in SHVC.

When all of the first mode and the second mode are not used, a list of inter-layer RPS candidates may be signaled for each layer and an index may be signaled to indicate the use of one of the inter-layer RPS candidates for induction of the inter-layer RPS in the slice header. By having a value of 0, the mode flag may indicate that all of the first mode and the second mode are not used.

Figure 7B:
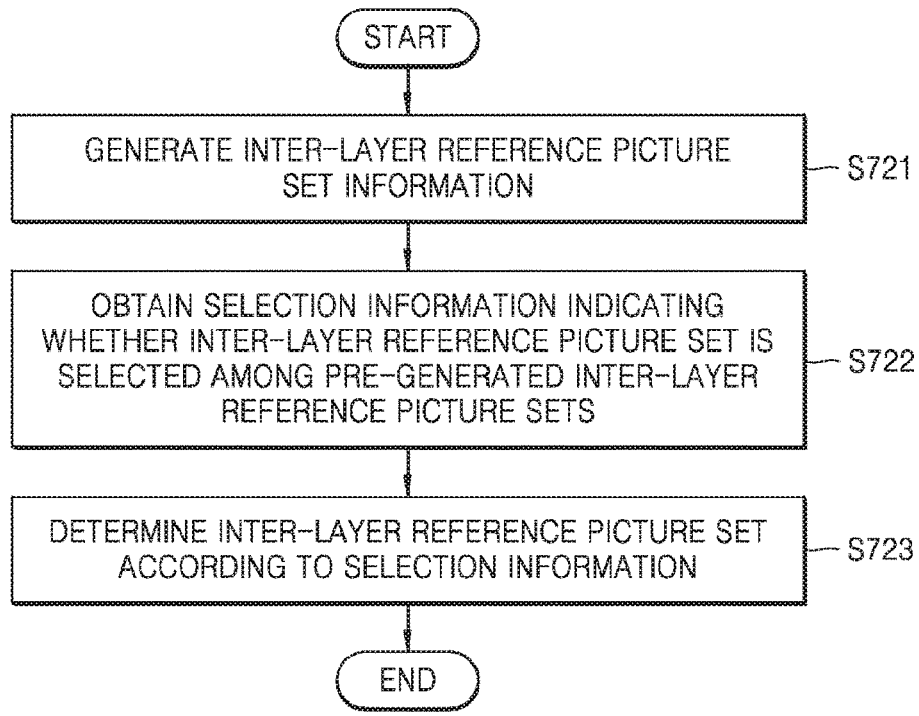

FIG. 7B is a diagram illustrating a decoding method according to an embodiment of the present invention.

First, the decoding apparatus according to an embodiment of the present invention generates the inter-layer reference picture set information (S721). The decoding apparatus may obtain at least one inter-layer reference picture set from the bitstream for the VPS. The inter-layer reference picture set is information representing the reference picture that is used for inter-layer prediction together with the reference picture list.

Next, the decoding apparatus according to an embodiment of the present invention obtains selection information indicating whether the inter-layer reference picture set is selected among the pre-generated inter-layer reference picture set (S722).

Next, the decoding apparatus according to an embodiment of the present invention determines the inter-layer reference picture set according to the selection information (S723). When the selection information indicates that the inter-layer reference picture set is to be selected from the pre-generated inter-layer reference picture sets, the decoding apparatus obtains an index for selecting the inter-layer reference picture set information from the bitstream. Next, the decoding apparatus performs inter-layer prediction by using the inter-layer reference picture set that is indicated in the pre-generated inter-layer reference picture set by the index.

When the selection information does not indicate that the inter-layer reference picture set is to be selected from the pre-generated inter-layer reference picture sets, the decoding apparatus obtains the inter-layer reference picture set information from the bitstream and performs inter-layer prediction by using the obtained inter-layer reference picture set information.

FIG. 7C illustrates a pseudo code for generating an inter-layer prediction reference picture set for each layer.

When the all_ref_layers_active_flag is 1, the pictures of all direct reference layers specified by the VPS are provided by the same access unit and are included in the inter-layer reference picture set, with respect to each picture referring to the VPS. When the all_dep_layer_used_flag is 0, the above limitation may be or may not be applied.

The value obtained by adding 1 to the num_ilp_ref_pic_sets_minus1[i] represents the number of ilp_ref_pic_set( ) syntax structures included in the VPS for the ith layer. The value of the num_ilp_ref_pic_sets_minus1[i] has a value of 0 to 63.

When the num_ilp_ref_pic_sets_minus1[i] is provided, the variable NumIlpRefPicSets[nuh_layer_id[i]] is set to a value of num_ilp_ref_pic_sets_minus1[i]+1. The NumIlpRefPicSets[nuh_layer_id[i]] is the variable representing the number of inter-layer reference picture sets of the ith layer. Otherwise, the NumIlpRefPicSets[layer_id_in_nuh[i]] is set to "use_default_il_rps_only_flag? (NumDirectRefLayers[layer_id_in_nuh[i]]?1:0): 0".

The use_default_il_rps_only_flag is the flag indicating that only the basically-set inter-layer reference picture is used.

Referring to the pseudo code of FIG. 7C, when the value of the all_ref_layers_active_flag (711) is 0, the inter-layer reference picture set is generated for all layers (712).

In more detail, when the number of direct reference layers of each layer is 1 or more (713), the number of inter-layer reference picture sets included in each layer is obtained (714), and the inter-layer reference picture set is generated according to the obtained number of inter-layer reference picture sets (716).

FIG. 7D illustrates a pseudo code for generating an inter-layer reference picture set according to an embodiment of the present invention.

When the present_in_il_rps_flag[i] is 1, it indicates that the ith layer may be the direct reference layer of the picture in the layer "layerIdx" and is included in the (ilpRpsIdx)th inter-layer RPS candidate of the layer having the layer index "layerIdx".

When the all_ref_layers_active_flag is 1, the present_in_il_rps_flag[i] for the syntax structure "ilp_ref_pic_set (layerIdx,0)" is inferred to be equal to the value of the direct_dependency_flag[layerIdx][i], the layerIdx has a value of 1 to vps_max_layer_minus1, and "i" has a value of 0 to layerIdx−1. When the All_ref_layers_active_flag is 0 and the present_in_il_rps_flag[i] is not provided, the present_in_il_rps_flag[i] is inferred to be equal to 0.

When the variable "nuhLayerId" is "layer_id_in_nuh[i]", the arrays "NumInterLayerPics" and "InterLayerPredLayerIdx" are derived as follows.

TABLE 5

NumInterLayerPics[ nuhLayerId ][ ilpRpsIdx ] = 0
for( i = 0, j = 0; i < layerIdx; i++ )
   if( present_in_il_rps_flag[ i ] )
      InterLayerPredLayerIdx[ nuhLayerId ][ ilpRpsIdx ][ j++ ] = i
NumInterLayerPics[ nuhLayerId ][ ilpRpsIdx ] = j FIG. 7E illustrates a pseudo code for performing a decoding method according to an embodiment of the present invention.

By having a value of 1, the inter_layer_pred_enabled_flag indicates that inter-layer prediction may be used for decoding the current picture. By having a value of 0, the inter_layer_pred_enabled_flag indicates that inter-layer prediction is not used for decoding the current picture. When the value of the all_ref_layers_active_flag is 1 and the value of the NumIlpRefPicSets[nuh_layer_id] is greater than 0, the inter_layer_pred_enabled_flag is inferred to have a value of 1. Otherwise, the inter_layer_pred_enabled_flag is inferred to have a value of 0.

When the value of the ilp_ref_pic_set_vps_flag (721) is 1, it indicates that the ILP RPS of the current picture is derived based on at least one of the ilp_ref_pic_set( ) syntax structures of the activation VPS identified by the syntax element "ilp_ref_pic_set_idx" in the slice header (722).

When the Ilp_ref_pic_set_vps_flag is 0, it indicates that the ILP RPS of the current picture is derived based on the ilp_ref_pic_set( ) syntax structure directly included in the slice headers of the current picture (723).

When the value of the ilp_ref_pic_set_vps_flag is not provided, the ilp_ref_pic_set_vps_flag is inferred to be equal to 1. The 0th to (NumIlpRefPicSets[nuh_layer_id]−1)th syntax structures are provided in the activation VPS, while the Ilp_ref_pic_set( ) syntax structure for the current slice is considered as the (NumIlpRefPicSets[nuh_layer_id])th ilp_ref_pic_set( ) syntax structure.

The ilp_ref_pic_set_idx specifies an index of the syntax structure "ilp_ref_pic_set( )" used for induction of the ILP RPS of the current picture. The index is an index specifying a particular ilp_ref_pic_set( ) syntax of the syntax structure ilp_ref_pic_set( ) list included in the activation VPS.

The syntax element "ilp_ref_pic_set_idx" is represented by Ceil(Log2(NumIlpRefPicSets[nuh_layer_id]−1)) bits.

When not provided, the value of the ilp_ref_pic_set_idx is inferred to be 0. The ilp_ref_pic_set_idx has a value of 0 to NumIlpRefPicSets[nuh_layer_id]−1. When not provided, the ilp_ref_pic_set_idx is inferred to have a value of 0.

The current reference picture set index (CurrRpsIdx) is derived as follows. When the ilp_ref_pic_set_vps_flag is 1, the current inter-layer prediction reference picture set index (CurrIlpRpsIdx) is set to be equal to the ilp_ref_pic_set_idx. Otherwise, the current inter-layer prediction reference picture set index (CurrIlpRpsIdx) is set to be equal to the NumIlpRefPicSets[nuh_layer_id].

The number of activation reference layer pictures (NumActiveRefLayerPics) is set to be equal to the NumInterLayerPics[nuh_layer_id][CurrIlpRpsIdx].

All slices of the picture have the same NumActiveRefLayerPics value and have the same inter_layer_pred_layer_idc[i] value. Here, "i" has a value of 0 to NumActiveRefLayerPics−1.

The variables RefPicLayerId[i] and NumActiveMotionPredRefLayers for each value of "i" ranging from 0 to NumActiveRefLayerPics−1 and the variable ActiveMotionPredRefLayerId[j] for each value of "j" ranging from 0 to NumActiveMotionPredRefLayers−1 are derived as follows.

For bitstream adaptability, it may be required that the value of max_tid_il_ref_pics_plus1[LayerIdxInVps[RefPicLayerId[i]]] is greater than the value of TemporalId with respect to each i having a value of 0 to NumActiveRefLayerPics−1, or that the value of max_tid_il_ref_pics_plus1 [LayerIdxInVps[RefPicLayerId[i]]] and the value of TemporalId are all 0 and the picture in the current access unit having the RefPicLayerId[i] value as the nuh_layer_id is an IRAP picture.

In addition, for bitstream adaptability, it may be further required that the value of SamplePredEnabledFlag[nuh_layer_id][RefPicLayerId[i]] or MotionPredEnabledFlag [nuh_layer_id][RefPicLayerId[i]] is 1 for each value of "i" ranging from 0 to NumActiveRefLayerPics−1.

The multilayer video encoding apparatus 10 of FIG. 1A may generate samples by performing intra prediction, inter prediction, inter-layer prediction, transformation, and quantization with respect to each image block, and may output a bitstream by performing entropy encoding on the samples. According to an embodiment, in order to output the video encoding result of the multilayer video encoding apparatus 10, that is, the base layer video stream and the enhancement layer video stream, the multilayer video encoding apparatus 10 may perform a video encoding operation including transformation and quantization by operating in conjunction with an external video encoding processor or an internal video encoding processor thereof. The internal video encoding processor of the multilayer video encoding apparatus 10 according to an embodiment may be a separate processor. However, in some cases, the video encoding apparatus, the central operation apparatus, or the graphic operation apparatus may include a video encoding processing module to implement a basic video encoding operation.

Also, the multilayer video decoding apparatus 20 of FIG. 2A performs encoding on each of the received base layer video stream and the enhancement layer video stream. That is, by performing inverse quantization, inverse transformation, intra prediction, and motion compensation (inter-image motion compensation and/or inter-layer variation compensation) on each of the base layer video stream and the enhancement layer video stream with respect to each image block, the multilayer video decoding apparatus 20 may reconstruct the samples of the base layer images from the base layer video stream and reconstruct the samples of the enhancement layer images from the enhancement layer video stream. According to an embodiment, in order to output the reconstruction image generated by the decoding result, the multilayer video decoding apparatus 20 may perform a video reconstruction operation including inverse quantization, inverse transformation, and prediction/compensation by operating in conjunction with an external video decoding processor or an internal video decoding processor thereof. The internal video decoding processor of the mul-

TABLE 6

```
    for( i = 0, j = 0; i < NumActiveRefLayerPics; i++){
        RefPicLayerId[ i ] =
RefLayerId[ nuh_layer_id ][ InterLayerPredLayerIdx[ nuh_layer_id ][ CurrIlpRp
sIdx ][ i ] ]
        if( MotionPredEnabledFlag[ nuh_layer_id ][ InterLayerPredLayerIdx[ nuh_
layer_id ][ CurrIlpRpsIdx ][ i ] ] )
            ActiveMotionPredRefLayerId[ j++ ] =
RefLayerId[ nuh_layer_id ][ InterLayerPredLayerIdx[ nuh_layer_id ][ CurrIlpRp
sIdx ][ i ] ]
    }
    NumActiveMotionPredRefLayers = j
``` tilayer video decoding apparatus 20 according to an embodiment may be a separate processor. However, in some cases, the video decoding apparatus, the central operation apparatus, or the graphic operation apparatus may include a video decoding processing module to implement a basic video reconstruction operation.

As described above, the multilayer video encoding apparatus 10 and the multilayer video decoding apparatus 20 according to the embodiments split blocks of divided video data into coding units of a tree structure, and coding units, prediction units, and transformation units are used for inter-layer prediction or inter prediction of the coding unit. Hereinafter, with reference to FIGS. 8 through 20, a video encoding method and apparatus therefor and a video decoding method and apparatus therefor based on coding units and transformation units of a tree structure according to embodiments, are described.

Basically, in an encoding/decoding procedure for a multilayer video, an encoding/decoding procedure for base layer images, and an encoding/decoding procedure for enhancement layer images are separately performed. That is, when inter-layer prediction occurs in the multilayer video, encoding/decoding results with respect to a single layer video may be mutually referred to, but an encoding/decoding procedure is performed for each of single layer videos.

Therefore, for convenience of description, a video encoding procedure and a video decoding procedure based on coding units of a tree structure that are described later with reference to FIGS. 8 through 20 are a video encoding procedure and a video decoding procedure for a single layer video, thus, inter prediction and motion compensation are described in detail. However, as described above with reference to FIGS. 1A through 7, for encoding/decoding a video stream, inter-layer prediction and compensation between base layer images and enhancement layer images are performed.

Figure 8:
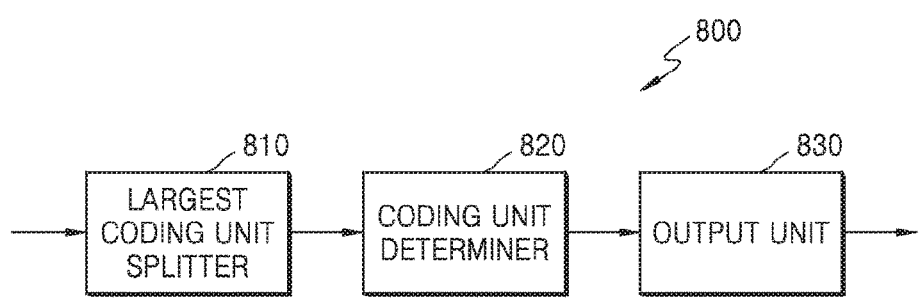
FIG. 8 is a block diagram of a video encoding apparatus based on coding units of a tree structure, according to various embodiments.

Therefore, in order for an image encoder 12 of the multilayer video encoding apparatus 10 according to the embodiment to encode a multilayer video, based on coding units of a tree structure, the image encoder 12 may include video encoding apparatuses 800 of FIG. 8 corresponding to the number of layers of a multilayer video so as to perform video encoding on each of single layer videos, and may control the video encoding apparatuses 800 to encode the single layer videos, respectively. Also, the multilayer video encoding apparatus 10 may perform inter-view prediction by using encoding results with respect to discrete single views obtained by the video encoding apparatuses 800. Accordingly, the image encoder 12 of the multilayer video encoding apparatus 10 may generate a base layer video stream and an enhancement layer video stream that include an encoding result of each layer.

Figure 9:
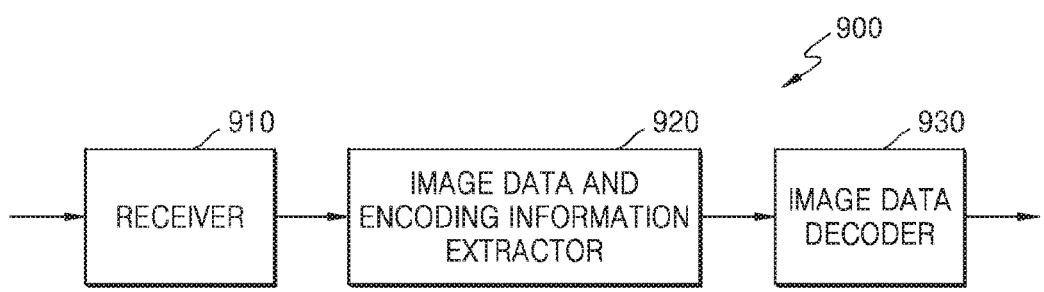
FIG. 9 is a block diagram of a video decoding apparatus based on coding units of a tree structure, according to various embodiments.

Similarly, in order for an image decoder 24 of the multilayer video decoding apparatus 20 to decode a multilayer video, based on coding units of a tree structure, the enhancement layer decoder 23 may include video decoding apparatuses 900 of FIG. 9 corresponding to the number of layers of a multilayer video so as to perform video decoding on each of layers of a received base layer video stream and a received enhancement layer video stream, and may control the video decoding apparatuses 900 to decode single layer videos, respectively. Then, the multilayer video decoding apparatus 20 may perform inter-layer compensation by using decoding results with respect to discrete single layers obtained by the video decoding apparatuses 900. Accordingly, the image decoder 24 of the multilayer video decoding apparatus 20 may generate base layer images and enhancement layer images that are reconstructed for each of the layers.

FIG. 8 is a block diagram of a video encoding apparatus based on coding units of a tree structure 800, according to an embodiment.

The video encoding apparatus involving video prediction based on coding units of the tree structure 800 includes a coding unit determiner 820 and an output unit 830. Hereinafter, for convenience of description, the video encoding apparatus involving video prediction based on coding units of the tree structure 800 is referred to as the 'video encoding apparatus 800'.

The coding unit determiner 820 may split a current picture based on a largest coding unit that is a coding unit having a maximum size for a current picture of an image. If the current picture is larger than the largest coding unit, image data of the current picture may be split into the at least one largest coding unit. The largest coding unit according to an embodiment may be a data unit having a size of 32×32, 64×64, 128×128, 256×256, etc., wherein a shape of the data unit is a square having a width and length in squares of 2.

A coding unit according to an embodiment may be characterized by a maximum size and a depth. The depth denotes the number of times the coding unit is spatially split from the largest coding unit, and as the depth deepens, deeper coding units according to depths may be split from the largest coding unit to a smallest coding unit. A depth of the largest coding unit may be defined as an uppermost depth and a depth of the smallest coding unit may be defined as a lowermost depth. Since a size of a coding unit corresponding to each depth decreases as the depth of the largest coding unit deepens, a coding unit corresponding to an upper depth may include a plurality of coding units corresponding to lower depths.

As described above, the image data of the current picture is split into the largest coding units according to a maximum size of the coding unit, and each of the largest coding units may include deeper coding units that are split according to depths. Since the largest coding unit according to an embodiment is split according to depths, the image data of a spatial domain included in the largest coding unit may be hierarchically classified according to depths.

A maximum depth and a maximum size of a coding unit, which limit the total number of times a height and a width of the largest coding unit are hierarchically split, may be predetermined.

The coding unit determiner 820 encodes at least one split region obtained by splitting a region of the largest coding unit according to depths, and determines a depth to output a finally encoded image data according to the at least one split region. In other words, the coding unit determiner 820 determines a final depth by encoding the image data in the deeper coding units according to depths, according to the largest coding unit of the current picture, and selecting a depth having the least encoding error. The determined final depth and image data according to largest coding units are output to the output unit 830.

The image data in the largest coding unit is encoded based on the deeper coding units corresponding to at least one depth equal to or below the maximum depth, and results of encoding the image data are compared based on each of the deeper coding units. A depth having the least encoding error may be selected after comparing encoding errors of the deeper coding units. At least one final depth may be selected for each largest coding unit.

The size of the largest coding unit is split as a coding unit is hierarchically split according to depths, and as the number of coding units increases. Also, even if coding units correspond to the same depth in one largest coding unit, it is determined whether to split each of the coding units corresponding to the same depth to a lower depth by measuring an encoding error of the image data of the each coding unit, separately. Accordingly, even when image data is included in one largest coding unit, the encoding errors may differ according to regions in the one largest coding unit, and thus the final depths may differ according to regions in the image data. Thus, one or more final depths may be determined in one largest coding unit, and the image data of the largest coding unit may be divided according to coding units of at least one final depth.

Accordingly, the coding unit determiner 820 according to the embodiment may determine coding units having a tree structure included in the largest coding unit. The 'coding units having a tree structure' according to an embodiment include coding units corresponding to a depth determined to be the final depth, from among all deeper coding units included in the largest coding unit. A coding unit of a final depth may be hierarchically determined according to depths in the same region of the largest coding unit, and may be determined independently in different regions. Likewise, a final depth in a current region may be determined independently from a final depth in another region.

A maximum depth according to an embodiment is an index related to the number of splitting times from a largest coding unit to a smallest coding unit. A first maximum depth according to an embodiment may denote the total number of splitting times from the largest coding unit to the smallest coding unit. A second maximum depth according to an embodiment may denote the total number of depth levels from the largest coding unit to the smallest coding unit. For example, when a depth of the largest coding unit is 0, a depth of a coding unit, in which the largest coding unit is split once, may be set to 1, and a depth of a coding unit, in which the largest coding unit is split twice, may be set to 2. Here, if the smallest coding unit is a coding unit in which the largest coding unit is split four times, 5 depth levels of depths 0, 1, 2, 3, and 4 exist, and thus the first maximum depth may be set to 4, and the second maximum depth may be set to 5.

Prediction encoding and transformation may be performed according to the largest coding unit. The prediction encoding and the transformation are also performed based on the deeper coding units according to a depth equal to or depths less than the maximum depth, according to the largest coding unit.

Since the number of deeper coding units increases whenever the largest coding unit is split according to depths, encoding, including the prediction encoding and the transformation, is performed on all of the deeper coding units generated as the depth deepens. For convenience of description, the prediction encoding and the transformation will now be described based on a coding unit of a current depth, in a largest coding unit.

The video encoding apparatus 800 may variously select a size or shape of a data unit for encoding the image data. In order to encode the image data, operations, such as prediction encoding, transformation, and entropy encoding, are performed, and at this time, the same data unit may be used for all operations or different data units may be used for each operation.

For example, the video encoding apparatus 800 may select not only a coding unit for encoding the image data, but may also select a data unit different from the coding unit so as to perform the prediction encoding on the image data in the coding unit.

In order to perform prediction encoding in the largest coding unit, the prediction encoding may be performed based on a coding unit corresponding to a final depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one selected from a height and a width of the prediction unit. A partition is a data unit where a prediction unit of a coding unit is split, and a prediction unit may be a partition having the same size as a coding unit.

For example, when a coding unit of 2N×2N (where N is a positive integer) is no longer split and becomes a prediction unit of 2N×2N, and a size of a partition may be 2N×2N, 2N×N, N×2N, or N×N. Examples of a partition mode may selectively include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one selected from an intra mode, an inter mode, and a skip mode. For example, the intra mode or the inter mode may be performed on the partition of 2N×2N, 2N×N, N×2N, or N×N. Also, the skip mode may be performed only on the partition of 2N×2N. The encoding is independently performed on one prediction unit in a coding unit, thereby selecting a prediction mode having a least encoding error.

The video encoding apparatus 800 according to the embodiment may also perform the transformation on the image data in a coding unit based not only on the coding unit for encoding the image data, but also based on a data unit that is different from the coding unit. In order to perform the transformation in the coding unit, the transformation may be performed based on a data unit having a size smaller than or equal to the coding unit. For example, the transformation unit may include a data unit for an intra mode and a transformation unit for an inter mode.

The transformation unit in the coding unit may be recursively split into smaller sized regions in the similar manner as the coding unit according to the tree structure. Thus, residual data in the coding unit may be divided according to the transformation unit having the tree structure according to transformation depths.

A transformation depth indicating the number of splitting times to reach the transformation unit by splitting the height and width of the coding unit may also be set in the transformation unit. For example, in a current coding unit of 2N×2N, a transformation depth may be 0 when the size of a transformation unit is 2N×2N, may be 1 when the size of the transformation unit is N×N, and may be 2 when the size of the transformation unit is N/2×N/2. In other words, transformation unit having the tree structure may be set according to the transformation depths.

Split information according to depths requires not only information about a depth but also requires information related to prediction and transformation. Accordingly, the coding unit determiner 820 not only determines a depth having a least encoding error but also determines a partition mode in which a prediction unit is split to partitions, a prediction mode according to prediction units, and a size of a transformation unit for transformation.

Coding units according to a tree structure in a largest coding unit and methods of determining a prediction unit/partition, and a transformation unit, according to embodiments, will be described in detail later with reference to FIGS. 9 through 19.

The coding unit determiner 820 may measure an encoding error of deeper coding units according to depths by using Rate-Distortion Optimization based on Lagrangian multipliers.

The output unit 830 outputs, in bitstreams, the image data of the largest coding unit, which is encoded based on the at least one depth determined by the coding unit determiner 820, and information according to depths.

The encoded image data may be obtained by encoding residual data of an image.

The information according to depths may include information about the depth, about the partition mode in the prediction unit, the prediction mode, and the split information of the transformation unit.

Information about a final depth may be defined by using split information according to depths, which indicates whether encoding is performed on coding units of a lower depth instead of a current depth. If the current depth of the current coding unit is a depth, image data in the current coding unit is encoded and output, and thus the split information may be defined not to split the current coding unit to a lower depth. Alternatively, if the current depth of the current coding unit is not the depth, the encoding has to be performed on the coding unit of the lower depth, and thus the split information may be defined to split the current coding unit to obtain the coding units of the lower depth.

If the current depth is not the depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one largest coding unit, and at least one piece of split information has to be determined for a coding unit of a depth, at least one piece of split information may be determined for one largest coding unit. Also, a depth of data of the largest coding unit may vary according to locations since the data is hierarchically split according to depths, and thus a depth and split information may be set for the data.

Accordingly, the output unit 830 according to the embodiment may assign encoding information about a corresponding depth and an encoding mode to at least one of the coding unit, the prediction unit, and a minimum unit included in the largest coding unit.

The minimum unit according to an embodiment is a square data unit obtained by splitting the smallest coding unit constituting the lowermost depth by 4. Alternatively, the minimum unit according to an embodiment may be a maximum square data unit that may be included in all of the coding units, prediction units, partition units, and transformation units included in the largest coding unit.

For example, the encoding information output by the output unit 830 may be classified into encoding information according to deeper coding units, and encoding information according to prediction units. The encoding information according to the deeper coding units may include the information about the prediction mode and about the size of the partitions. The encoding information according to the prediction units may include information about an estimated direction in an inter mode, about a reference image index of the inter mode, about a motion vector, about a chroma component of an intra mode, and about an interpolation method in the intra mode.

Information about a maximum size of the coding unit defined according to pictures, slices, or GOPs, and information about a maximum depth may be inserted into a header of a bitstream, a sequence parameter set, or a picture parameter set.

Information about a maximum size of the transformation unit permitted with respect to a current video, and information about a minimum size of the transformation unit may also be output through a header of a bitstream, a sequence parameter set, or a picture parameter set. The output unit 830 may encode and output reference information, prediction information, and slice type information that are related to prediction.

According to the simplest embodiment for the video encoding apparatus 800, the deeper coding unit may be a coding unit obtained by dividing a height or width of a coding unit of an upper depth, which is one layer above, by two. In other words, when the size of the coding unit of the current depth is 2N×2N, the size of the coding unit of the lower depth is N×N. Also, a current coding unit having a size of 2N×2N may maximally include four lower-depth coding units having a size of N×N.

Accordingly, the video encoding apparatus 800 may form the coding units having the tree structure by determining coding units having an optimum shape and an optimum size for each largest coding unit, based on the size of the largest coding unit and the maximum depth determined considering characteristics of the current picture. Also, since encoding may be performed on each largest coding unit by using any one of various prediction modes and transformations, an optimal encoding mode may be determined by taking into account characteristics of the coding unit of various image sizes.

Thus, if an image having a high resolution or a large data amount is encoded in a conventional macroblock, the number of macroblocks per picture excessively increases. Accordingly, the number of pieces of compressed information generated for each macroblock increases, and thus it is difficult to transmit the compressed information and data compression efficiency decreases. However, by using the video encoding apparatus according to the embodiment, image compression efficiency may be increased since a coding unit is adjusted while considering characteristics of an image while increasing a maximum size of a coding unit while considering a size of the image.

The inter-layer video encoding apparatus including configuration described above with reference to FIG. 1A may include the video encoding apparatuses 800 corresponding to the number of layers so as to encode single layer images in each of the layers of a multilayer video. For example, a first layer encoder may include one video encoding apparatus 800, and a second layer encoder may include the video encoding apparatuses 800 corresponding to the number of second layers.

When the video encoding apparatuses 800 encode first layer images, the coding unit determiner 820 may determine a prediction unit for inter-image prediction for each of coding units of a tree structure according to each largest coding unit, and may perform the inter-image prediction on each prediction unit.

When the video encoding apparatuses 800 encode the second layer images, the coding unit determiner 820 may determine prediction units and coding units of a tree structure according to each largest coding unit, and may perform inter-prediction on each of the prediction units.

The video encoding apparatuses 800 may encode a luminance difference so as to compensate for the luminance difference between the first layer image and the second layer image. However, whether to perform luminance compensation may be determined according to an encoding mode of a coding unit. For example, the luminance compensation may be performed only on a prediction unit having a size of 2N×2N.

FIG. 9 is a block diagram of a video decoding apparatus based on coding units of a tree structure 900, according to various embodiments.

The video decoding apparatus involving video prediction based on coding units of the tree structure 900 according to the embodiment includes a receiver 910, an image data and encoding information extractor 920, and an image data decoder 930. Hereinafter, for convenience of description, the video decoding apparatus involving video prediction based on coding units of the tree structure 900 according to the embodiment is referred to as the 'video decoding apparatus 900'.

Definitions of various terms, such as a coding unit, a depth, a prediction unit, a transformation unit, and various types of split information for decoding operations of the video decoding apparatus 900 according to the embodiment are identical to those described with reference to FIG. 8 and the video encoding apparatus 800.

The receiver 910 receives and parses a bitstream of an encoded video. The image data and encoding information extractor 920 extracts encoded image data for each coding unit from the parsed bitstream, wherein the coding units have a tree structure according to each largest coding unit, and outputs the extracted image data to the image data decoder 930. The image data and encoding information extractor 920 may extract information about a maximum size of a coding unit of a current picture, from a header about the current picture, a sequence parameter set, or a picture parameter set.

Also, the image data and encoding information extractor 920 extracts a final depth and split information about the coding units having a tree structure according to each largest coding unit, from the parsed bitstream. The extracted final depth and the extracted split information are output to the image data decoder 930. That is, the image data in a bitstream is split into the largest coding unit so that the image data decoder 930 decodes the image data for each largest coding unit.

A depth and split information according to each of the largest coding units may be set for one or more pieces of depth information, and split information according to depths may include partition mode information of a corresponding coding unit, prediction mode information, and split information of a transformation unit. Also, as the depth information, the split information according to depths may be extracted.

The depth and the split information according to each of the largest coding units extracted by the image data and encoding information extractor 920 are a depth and split information determined to generate a minimum encoding error when an encoder, such as the video encoding apparatus 800, repeatedly performs encoding for each deeper coding unit according to depths according to each largest coding unit. Accordingly, the video decoding apparatus 900 may reconstruct an image by decoding data according to an encoding method that generates the minimum encoding error.

Since encoding information about the depth and the encoding mode may be assigned to a predetermined data unit from among a corresponding coding unit, a prediction unit, and a minimum unit, the image data and encoding information extractor 920 may extract the depth and the split information according to the predetermined data units. If a depth and split information of a corresponding largest coding unit are recorded according to each of the predetermined data units, predetermined data units having the same depth and the split information may be inferred to be the data units included in the same largest coding unit.

The image data decoder 930 reconstructs the current picture by decoding the image data in each largest coding unit based on the depth and the split information according to each of the largest coding units. That is, the image data decoder 930 may decode the encoded image data based on the read information about the partition mode, the prediction mode, and the transformation unit for each coding unit from among the coding units having the tree structure included in each largest coding unit. A decoding process may include prediction including intra prediction and motion compensation, and inverse transformation.

The image data decoder 930 may perform intra prediction or motion compensation according to a partition and a prediction mode of each coding unit, based on the information about the partition type and the prediction mode of the prediction unit of the coding unit according to depths.

In addition, the image data decoder 930 may read information about a transformation unit according to a tree structure for each coding unit so as to perform inverse transformation based on transformation units for each coding unit, for inverse transformation for each largest coding unit. Due to the inverse transformation, a pixel value of a spatial domain of the coding unit may be reconstructed.

The image data decoder 930 may determine a depth of a current largest coding unit by using split information according to depths. If the split information indicates that image data is no longer split in the current depth, the current depth is a depth. Accordingly, the image data decoder 930 may decode the image data of the current largest coding unit by using the information about the partition mode of the prediction unit, the prediction mode, and the size of the transformation unit for each coding unit corresponding to the current depth.

That is, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 930 in the same encoding mode. As such, the current coding unit may be decoded by obtaining the information about the encoding mode for each coding unit.

The inter-layer video decoding apparatus including configuration described above with reference to FIG. 2A may include the video decoding apparatuses 900 corresponding to the number of views, so as to reconstruct first layer images and second layer images by decoding a received first layer image stream and a received second layer image stream.

When the first layer image stream is received, the image data decoder 930 of the video decoding apparatus 900 may split samples of the first layer images, which are extracted from the first layer image stream by an extractor 920, into coding units according to a tree structure of a largest coding unit. The image data decoder 930 may perform motion compensation, based on prediction units for the inter-image prediction, on each of the coding units according to the tree structure of the samples of the first layer images, and may reconstruct the first layer images.

When the second layer image stream is received, the image data decoder 930 of the video decoding apparatus 900 may split samples of the second layer images, which are extracted from the second layer image stream by the extractor 920, into coding units according to a tree structure of a largest coding unit. The image data decoder 930 may perform motion compensation, based on prediction units for the inter-image prediction, on each of the coding units of the samples of the second layer images, and may reconstruct the second layer images.

The extractor 920 may obtain, from a bitstream, information related to a luminance error so as to compensate for a luminance difference between the first layer image and the second layer image. However, whether to perform luminance compensation may be determined according to an encoding mode of a coding unit. For example, the luminance compensation may be performed only on a prediction unit having a size of 2N×2N.

Thus, the video decoding apparatus 900 may obtain information about at least one coding unit that generates the minimum encoding error when encoding is recursively performed for each largest coding unit, and may use the information to decode the current picture. That is, the coding units having the tree structure determined to be the optimum coding units in each largest coding unit may be decoded.

Accordingly, even if an image has a high resolution or has an excessively large data amount, the image may be efficiently decoded and reconstructed by using a size of a coding unit and an encoding mode, which are adaptively determined according to characteristics of the image, by using optimal split information received from an encoding terminal.

Figure 10:
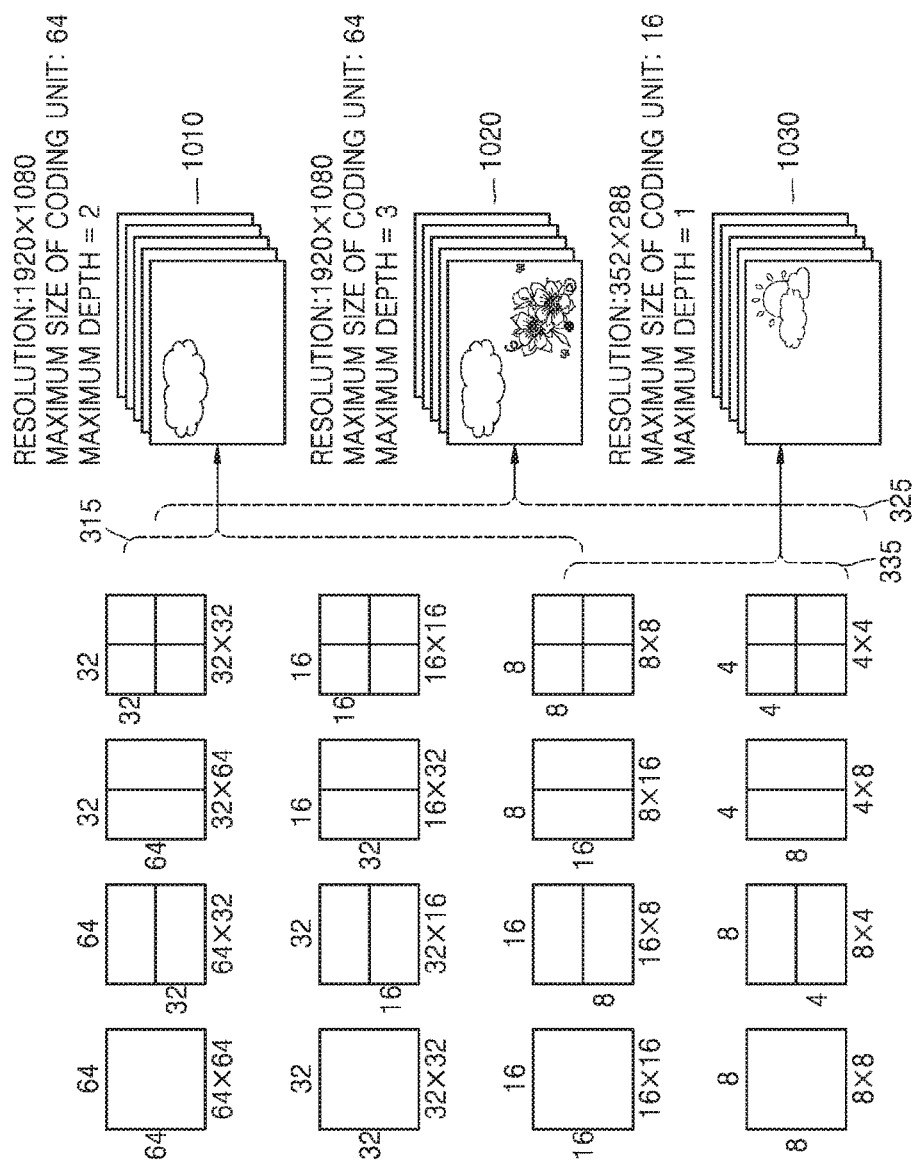
FIG. 10 illustrates a concept of coding units, according to various embodiments.

FIG. 10 illustrates a concept of coding units according to various embodiments.

A size of a coding unit may be expressed by width×height, and may be 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 1010, a resolution is 1920×1080, a maximum size of a coding unit is 64, and a maximum depth is 2. In video data 1020, a resolution is 1920×1080, a maximum size of a coding unit is 64, and a maximum depth is 3. In video data 1030, a resolution is 352×288, a maximum size of a coding unit is 16, and a maximum depth is 1. The maximum depth shown in FIG. 10 denotes the total number of splits from a largest coding unit to a smallest coding unit.

If a resolution is high or a data amount is large, a maximum size of a coding unit may be large so as to not only increase encoding efficiency but also to accurately reflect characteristics of an image. Accordingly, the maximum size of the coding unit of the video data 1010 and 1020 having a higher resolution than the video data 1030 may be 64.

Since the maximum depth of the video data 1010 is 2, coding units 1015 of the video data 1010 may include a largest coding unit having a long axis size of 64, and coding units having long axis sizes of 32 and 16 since depths are deepened to two layers by splitting the largest coding unit twice. On the other hand, since the maximum depth of the video data 1030 is 1, coding units 1035 of the video data 1030 may include a largest coding unit having a long axis size of 16, and coding units having a long axis size of 8 since depths are deepened to one layer by splitting the largest coding unit once.

Since the maximum depth of the video data 1020 is 3, coding units 1025 of the video data 1020 may include a largest coding unit having a long axis size of 64, and coding units having long axis sizes of 32, 16, and 8 since the depths are deepened to 3 layers by splitting the largest coding unit three times. As a depth deepens, an expression capability with respect to detailed information may be improved.

Figure 11:
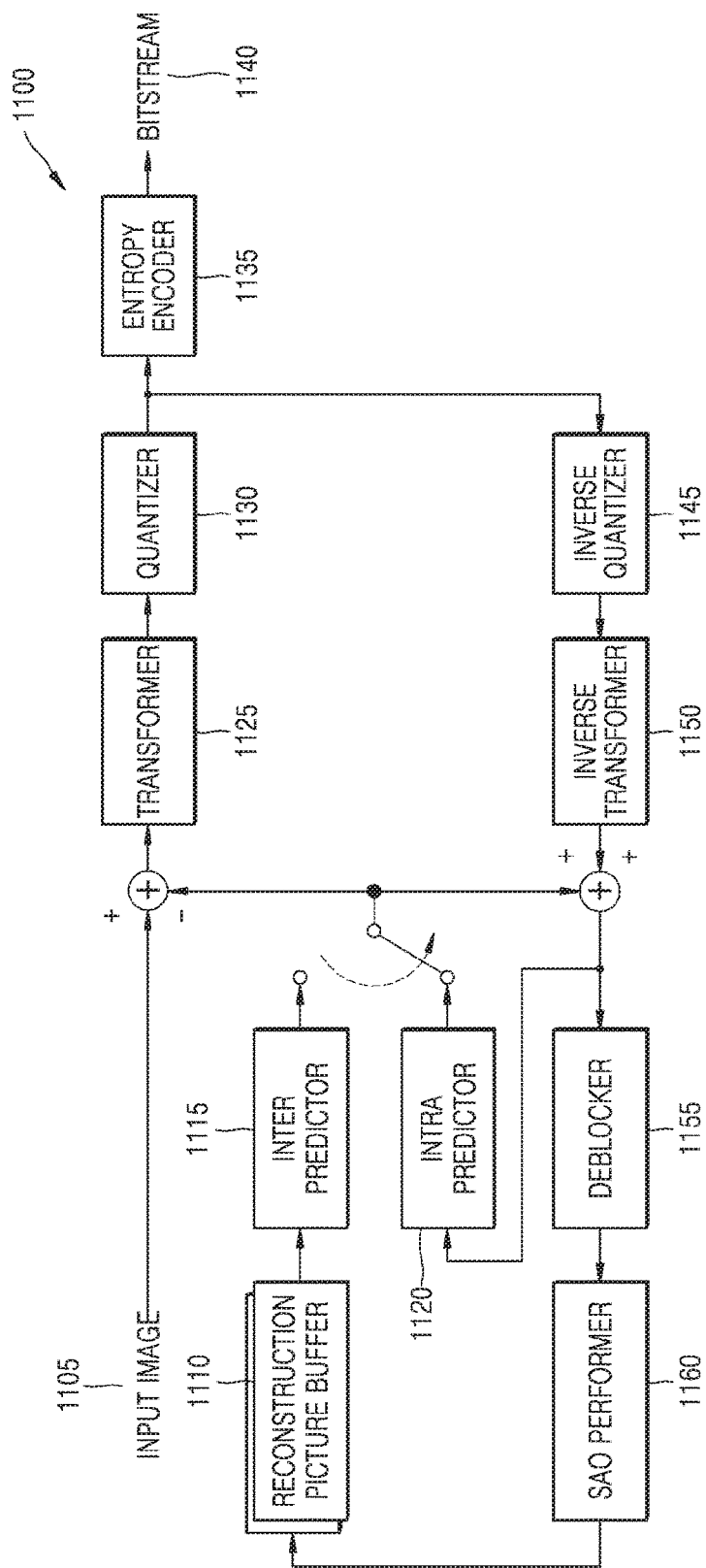
FIG. 11 is a block diagram of an image encoder based on coding units, according to various embodiments.

FIG. 11 is a block diagram of a video encoder 1100 based on coding units, according to various embodiments.

According to an embodiment, the video encoder 1100 performs operations for encoding image data in the picture encoder of the video encoding apparatus 800. That is, an intra predictor 1120 performs intra prediction for each prediction unit on the coding units of an intra mode among a current image 1105, and an inter predictor 1115 performs inter prediction for each prediction unit on the coding units of an inter mode by using the current image 1105 and a reference image obtained from a reconstruction picture buffer 1110. The current image 1105 may be split into the largest coding units and then sequentially encoded. In this case, the encoding may be performed on the coding units into which the largest coding unit is to be split in the form of a tree structure.

Residue data may be generated by subtracting the prediction data for the coding unit of each mode, which is output from the intra predictor 1120 or the inter predictor 1115, from the data for the encoded coding unit of the current image 1105, and the residue data may be output as a transformation coefficient quantized by each transformation unit through a transformer 1125 and a quantizer 1130. The quantized transformation coefficient is reconstructed as the residue data of a spatial region through an inverse quantizer 1145 and an inverse transformer 1150. The reconstructed residue data of the spatial region may be added to the prediction data for the coding unit of each mode, which is output from the intra predictor 1120 or the inter predictor 1115, to be reconstructed as the data of the spatial region for the coding unit of the current image 1105. The reconstructed data of the spatial region may be generated as a reconstruction image through a deblocker 1155 and an SAO performer 1160. The generated reconstruction image is stored in the reconstruction picture buffer 1110. The reconstruction images stored in the reconstruction picture buffer 1110 may be used as the reference image for inter prediction of another image. The transformation coefficient quantized by the quantizer 1130 and the transformer 1125 may be output as a bitstream 1140 through an entropy encoder 1135.

According to an embodiment, in order for the video encoder 1100 to be applied to the video encoding apparatus 800, the elements of the video encoder 1100, that is, the inter predictor 1115, the intra predictor 1120, the transformer 1125, the quantizer 1130, the entropy encoder 1135, the inverse quantizer 1145, the inverse transformer 1150, the deblocker 1155, and the SAO performer 1160 may perform the operations based on each coding unit among the coding units according to the tree structure with respect to each of the largest coding units.

In particular, the intra predictor 1120 and the inter predictor 1115 may determine the prediction mode and the partition mode of each coding unit among the coding units according to the tree structure in consideration of the maximum depth and the maximum size of the current largest coding unit, and the transformer 1125 may determine whether to split the transformation unit according to the quad tree in each coding unit among the coding units according to the tree structure.

Figure 12:
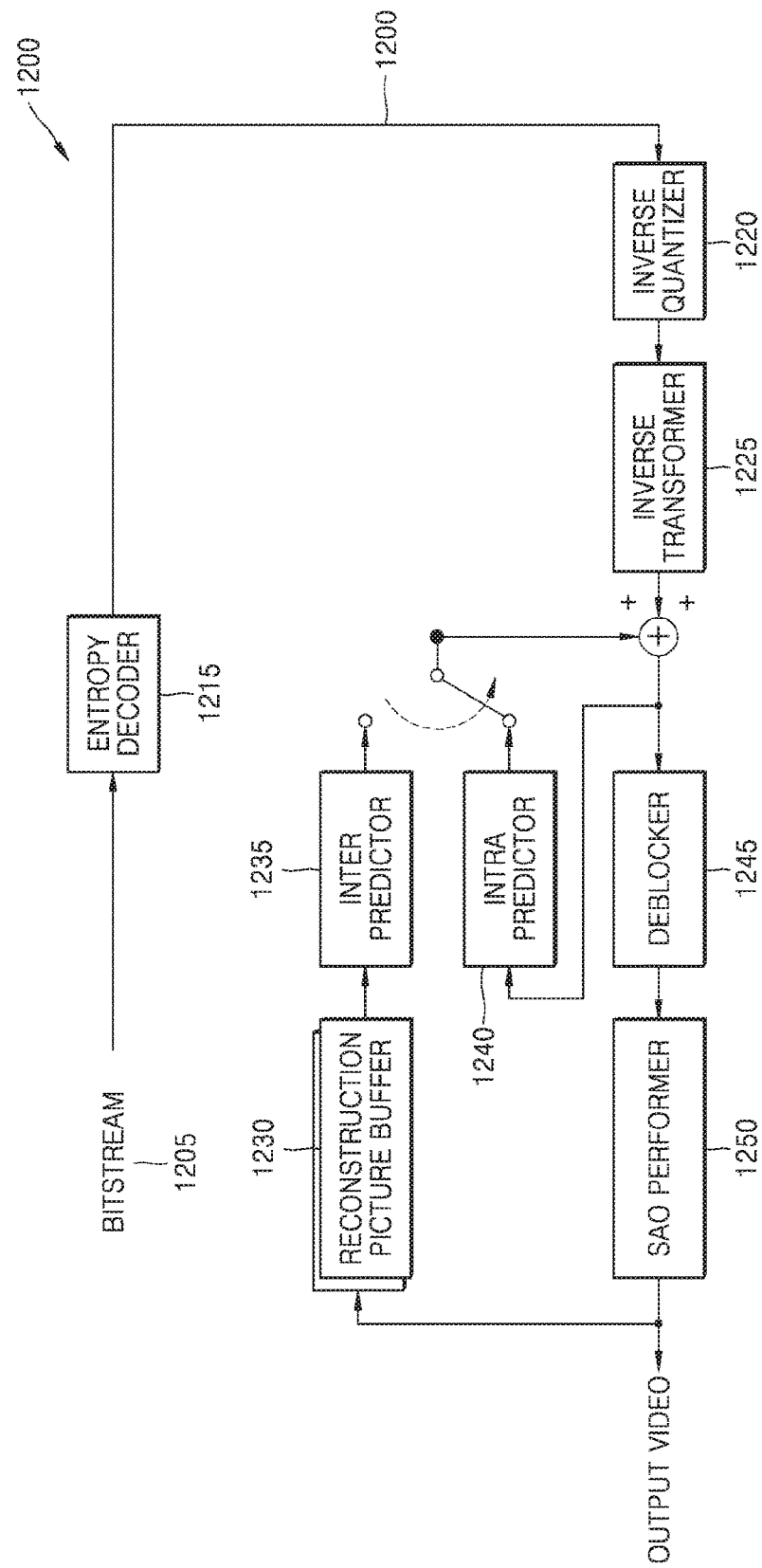
FIG. 12 is a block diagram of an image decoder based on coding units, according to various embodiments.

FIG. 12 is a block diagram of a video encoder 1200 based on coding units according to various embodiments.

An entropy decoder 1215 parses, from a bitstream 1205, encoded image data to be decoded and encoding information necessary for decoding. The encoded image data may be a quantized transformation coefficient, and an inverse quantizer 1220 and an inverse transformer 1225 may reconstruct residue data from the quantized transformation coefficient.

An intra predictor 1240 performs intra prediction for each prediction unit on the coding unit of the intra mode. An inter predictor 1235 performs inter prediction for each prediction unit on the coding unit of the inter mode among the current image by using the reference image obtained from a reconstruction picture buffer 1230.

The data of the spatial region for the coding unit of the current image 1105 may be constructed by adding the residue data and the prediction data for the coding unit of each mode obtained through the intra predictor 1240 or the inter predictor 1235, and the reconstructed data of the spatial region may be output as a reconstruction image 1260 through a deblocker 1245 and an SAO performer 1250. Also, the reconstruction images stored in the reconstruction picture buffer 1230 may be output as a reference image.

In order to decode the image data by the image data decoder 930 of the video decoding apparatus 900, the step-by-step operations after the entropy decoder 1215 of the video decoder 1200 according to an embodiment may be performed.

According to an embodiment, in order for the video decoder 1200 to be applied to the video decoding apparatus 900, the elements of the video decoder 1200, that is, the entropy decoder 1215, the inverse quantizer 1220, the inverse transformer 1225, the intra predictor 1240, the inter predictor 1235, the deblocker 1245, and the SAO performer 1250 may perform the operations based on each coding unit among the coding units according to the tree structure with respect to each of the largest coding units.

In particular, the intra predictor 1240 and the inter predictor 1235 may determine the prediction mode and the partition mode for each coding unit among the coding units according to the tree structure, and the inverse transformer 1225 may determine whether to split the transformation unit according to the quad-tree structure with respect to each coding unit.

The encoding operation of FIG. 10 and the decoding operation of FIG. 11 may respectively include a video stream encoding operation and a decoding operation in a single layer. Thus, when the encoder of FIG. 1A encodes a video stream of two or more layers, it may include the video encoder 1100 for each layer. Likewise, when the decoder 24 of FIG. 2A decodes a video stream of two or more layers, it may include the video decoder 1200 for each layer.

Figure 13:
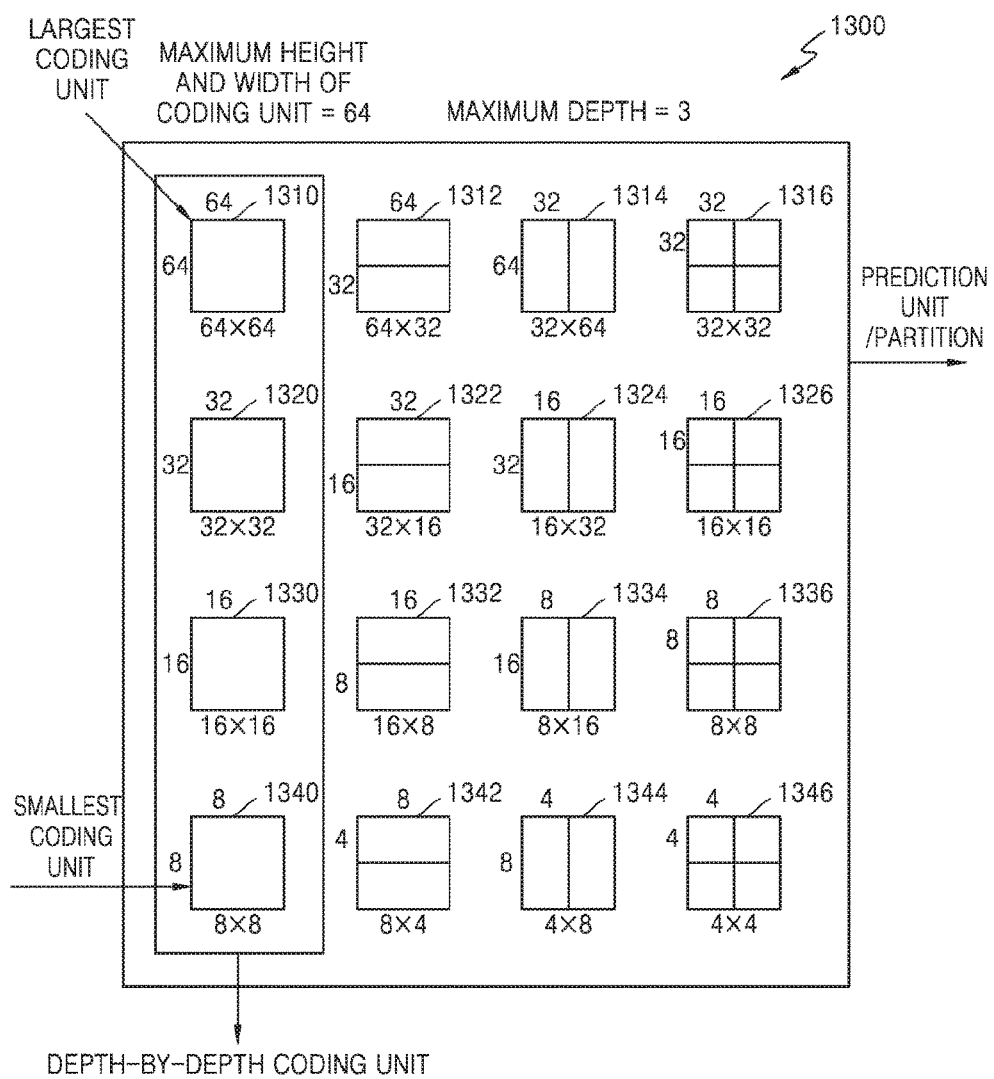
FIG. 13 illustrates deeper coding units according to depths, and partitions, according to various embodiments.

FIG. 13 illustrates deeper coding units according to depths, and partitions, according to various embodiments.

The video encoding apparatus 800 and the video decoding apparatus 900 use hierarchical coding units so as to consider characteristics of an image. A maximum height, a maximum width, and a maximum depth of coding units may be adaptively determined according to the characteristics of the image, or may be variously set according to user requirements. Sizes of deeper coding units according to depths may be determined according to the predetermined maximum size of the coding unit.

In a hierarchical structure of coding units 1300 according to an embodiment, the maximum height and the maximum width of the coding units are each 64, and the maximum depth is 3. In this case, the maximum depth refers to a total number of times the coding unit is split from the largest coding unit to the smallest coding unit. Since a depth deepens along a vertical axis of the hierarchical structure of coding units 1300, a height and a width of the deeper coding unit are each split. Also, a prediction unit and partitions, which are bases for prediction encoding of each deeper coding unit, are shown along a horizontal axis of the hierarchical structure of coding units 1300.

That is, a coding unit 1310 is a largest coding unit in the hierarchical structure of coding units 1300, wherein a depth is 0 and a size, i.e., a height by width, is 64×64. The depth deepens along the vertical axis, and a coding unit 1320 having a size of 32×32 and a depth of 1, a coding unit 1330 having a size of 16×16 and a depth of 2, and a coding unit 1340 having a size of 8×8 and a depth of 3. The coding unit 1340 having a size of 8×8 and a depth of 3 is a smallest coding unit.

The prediction unit and the partitions of a coding unit are arranged along the horizontal axis according to each depth. In other words, if the coding unit 1310 having a size of 64×64 and a depth of 0 is a prediction unit, the prediction unit may be split into partitions included in the coding unit 1310 having the size of 64×64, i.e., a partition 1310 having a size of 64×64, partitions 1312 having a size of 64×32, partitions 1314 having a size of 32×64, or partitions 1316 having a size of 32×32.

Likewise, a prediction unit of the coding unit 1320 having a size of 32×32 and a depth of 1 may be split into partitions included in the coding unit 1320 having the size of 32×32, i.e. a partition 1320 having a size of 32×32, partitions 1322 having a size of 32×16, partitions 1324 having a size of 16×32, and partitions 1326 having a size of 16×16.

Likewise, a prediction unit of the coding unit 1330 having a size of 16×16 and a depth of 2 may be split into partitions included in the coding unit 1330 having the size of 16×16, i.e. a partition 1330 having a size of 16×16, partitions 1332 having a size of 16×8, partitions 1334 having a size of 8×16, and partitions 1336 having a size of 8×8.

Likewise, a prediction unit of the coding unit 1340 having a size of 8×8 and a depth of 3 may be split into partitions included in the coding unit 1340 having the size of 8×8, i.e. a partition 1340 having a size of 8×8, partitions 1342 having a size of 8×4, partitions 1344 having a size of 4×8, and partitions 1346 having a size of 4×4.

In order to determine a depth of the largest coding unit 1310, the coding unit determiner 820 of the video encoding apparatus 800 has to perform encoding on coding units respectively corresponding to depths included in the largest coding unit 1310.

The number of deeper coding units according to depths including data in the same range and the same size increases as the depth deepens. For example, four coding units corresponding to a depth of 2 are required to cover data that is included in one coding unit corresponding to a depth of 1. Accordingly, in order to compare encoding results of the same data according to depths, the coding unit corresponding to a depth of 1 and four coding units corresponding to a depth of 2 are each encoded.

In order to perform encoding according to each of the depths, a least encoding error that is a representative encoding error of a corresponding depth may be selected by performing encoding on each of prediction units of the coding units according to depths, along the horizontal axis of the hierarchical structure of coding units 1300. Alternatively, the minimum encoding error may be searched for by comparing representative encoding errors according to depths, by performing encoding for each depth as the depth deepens along the vertical axis of the hierarchical structure of coding units 1300. A depth and a partition generating the minimum encoding error in the largest coding unit 1310 may be selected as a depth and a partition mode of the largest coding unit 1310.

Figure 14:
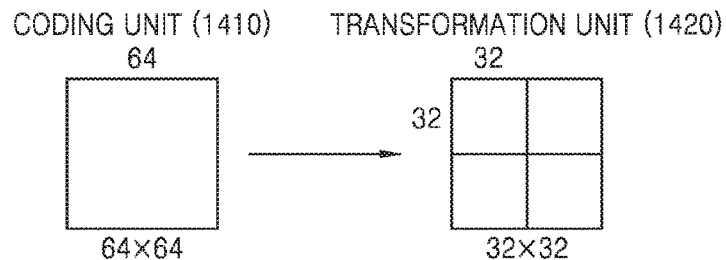
FIG. 14 illustrates a relationship between a coding unit and transformation units, according to various embodiments.

FIG. 14 illustrates a relationship between a coding unit and transformation units, according to various embodiments.

The video encoding apparatus 800 or the video decoding apparatus 900 encodes or decodes an image according to coding units having sizes smaller than or equal to a largest coding unit for each largest coding unit. Sizes of transformation units for transformation during encoding may be selected based on data units that are not larger than a corresponding coding unit.

For example, in the video encoding apparatus 800 or the video decoding apparatus 900, when a size of the coding unit 1410 is 64×64, transformation may be performed by using the transformation units 1420 having a size of 32×32.

Also, data of the coding unit 1410 having a size of 64×64 may be encoded by performing the transformation on each of the transformation units having a size of 32×32, 16×16, 8×8, and 4×4, which are smaller than 64×64, and then a transformation unit having the least coding error with respect to an original image may be selected.

Figure 15:
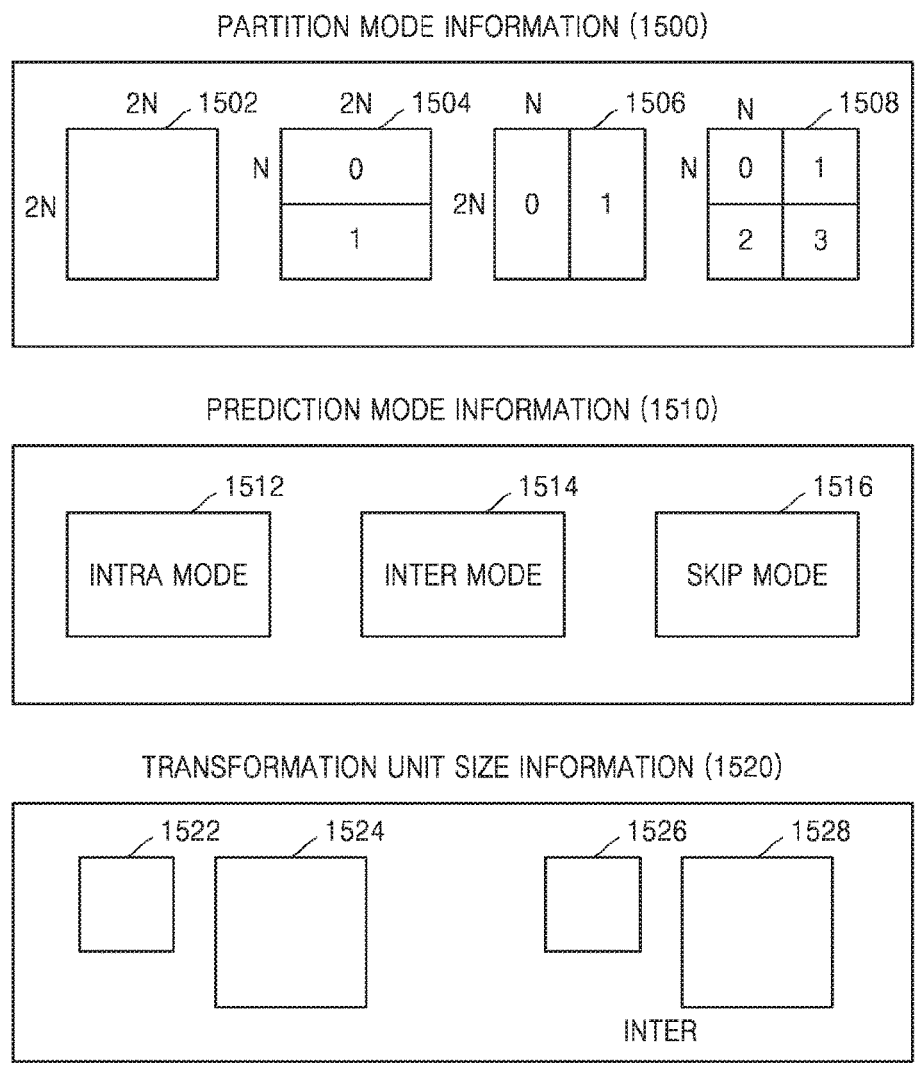
FIG. 15 illustrates a plurality of pieces of encoding information according to depths, according to various embodiments.

FIG. 15 illustrates a plurality of pieces of encoding information, according to various embodiments.

The output unit 830 of the video encoding apparatus 800 may encode and transmit, as split information, partition mode information 1500, prediction mode information 1510, and transformation unit size information 1520 for each coding unit corresponding to a depth.

The partition mode information 1500 indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 1502 having a size of 2N×2N, a partition 1504 having a size of 2N×N, a partition 1506 having a size of N×2N, and a partition 1508 having a size of N×N. Here, the partition mode information 1500 about a current coding unit is set to indicate one of the partition 1504 having a size of 2N×N, the partition 1506 having a size of N×2N, and the partition 1508 having a size of N×N.

The prediction mode information 1510 indicates a prediction mode of each partition. For example, the prediction mode information 1510 may indicate a mode of prediction encoding performed on a partition indicated by the partition mode information 1500, i.e., an intra mode 1512, an inter mode 1514, or a skip mode 1516.

The transformation unit size information 1520 indicates a transformation unit to be based on when transformation is performed on a current coding unit. For example, the transformation unit may be a first intra transformation unit 1522, a second intra transformation unit 1524, a first inter transformation unit 1526, or a second inter transformation unit 1528.

The image data and encoding information extractor 920 of the video decoding apparatus 900 may extract and use the partition mode information 1500, the prediction mode information 1510, and the transformation unit size information 1520 for decoding, according to each deeper coding unit.

Figure 16:
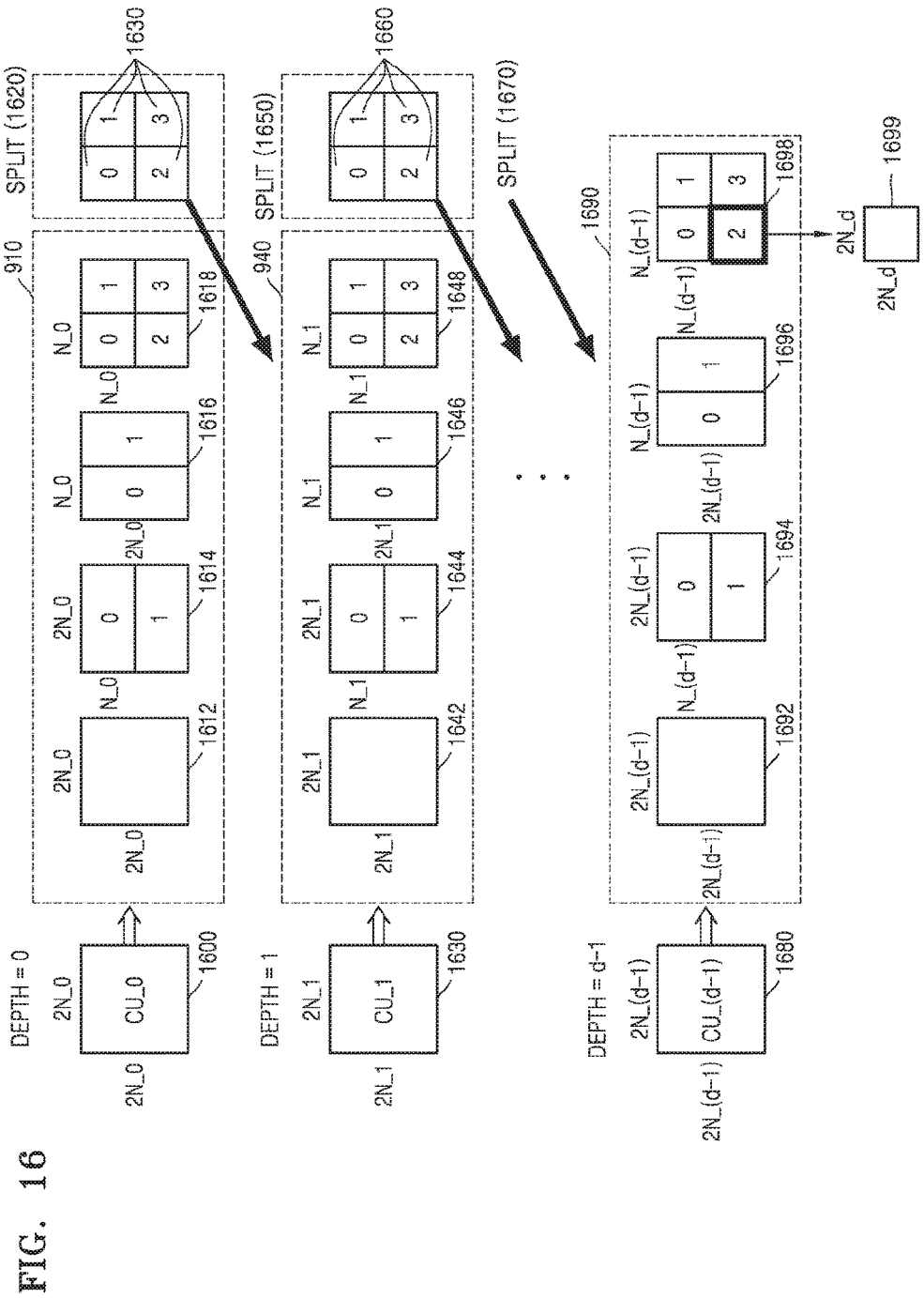
FIG. 16 illustrates deeper coding units according to depths, according to various embodiments.

FIG. 16 illustrates deeper coding units according to depths, according to various embodiments.

Split information may be used to indicate a change in a depth. The spilt information indicates whether a coding unit of a current depth is split into coding units of a lower depth.

A prediction unit 1610 for prediction-encoding a coding unit 1600 having a depth of 0 and a size of 2N_0×2N_0 may include partitions of a partition mode 1612 having a size of 2N_0×2N_0, a partition mode 1614 having a size of 2N_0×N_0, a partition mode 1616 having a size of N_0×2N_0, and a partition mode 1618 having a size of N_0×N_0. Only the partition modes 1612 through 1618 which are obtained by symmetrically splitting the prediction unit are illustrated, but as described above, a partition mode is not limited thereto and may include asymmetrical partitions, partitions having a predetermined shape, and partitions having a geometrical shape.

According to each partition mode, prediction encoding has to be repeatedly performed on one partition having a size of 2N_0×2N_0, two partitions having a size of 2N_0×N_0, two partitions having a size of N_0×2N_0, and four partitions having a size of N_0×N_0. The prediction encoding in an intra mode and an inter mode may be performed on the partitions having sizes of 2N_0×2N_0, N_0×2N_0, 2N_0×N_0, and N_0×N_0. The prediction encoding in a skip mode is performed only on the partition having a size of 2N_0×2N_0.

If an encoding error is smallest in one of the partition modes 1612, 1614, and 1616 having sizes of 2N_0×2N_0, 2N_0×N_0 and N_0×2N_0, the prediction unit 1610 may not be split into a lower depth.

If the encoding error is the smallest in the partition mode 1618 having a size of N_0×N_0, a depth is changed from 0 to 1 and split is performed (operation 1620), and encoding may be repeatedly performed on coding units 1630 of a partition mode having a depth of 2 and a size of N_0×N_0 so as to search for a minimum encoding error.

A prediction unit 1640 for prediction-encoding the coding unit 1630 having a depth of 1 and a size of 2N_1×2N_1 (=N_0×N_0) may include a partition mode 1642 having a size of 2N_1×2N_1, a partition mode 1644 having a size of 2N_1×N_1, a partition mode 1646 having a size of N_1×2N_1, and a partition mode 1648 having a size of N_1×N_1.

If an encoding error is the smallest in the partition mode 1648 having a size of N_1×N_1, a depth is changed from 1 to 2 and split is performed (in operation 1650), and encoding may be repeatedly performed on coding units 1660 having a depth of 2 and a size of N_2×N_2 so as to search for a minimum encoding error.

When a maximum depth is d, deeper coding units according to depths may be set until when a depth corresponds to d−1, and split information may be set until when a depth corresponds to d−2. In other words, when encoding is performed up to when the depth is d−1 after a coding unit corresponding to a depth of d−2 is split (in operation 1670), a prediction unit 1690 for prediction-encoding a coding unit 1680 having a depth of d−1 and a size of 2N_(d−1)×2N_(d−1) may include partitions of a partition mode 1692 having a size of 2N_(d−1)×2N_(d−1), a partition mode 1694 having a size of 2N_(d−1)×N_(d−1), a partition mode 1696 having a size of N_(d−1)×2N_(d−1), and a partition mode 1698 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition modes so as to search for a partition mode having a minimum encoding error.

Even when the partition mode 1698 having a size of N_(d−1)×N_(d−1) has the minimum encoding error, since a maximum depth is d, a coding unit CU_(d−1) having a depth of d−1 is no longer split into a lower depth, and a depth for the coding units constituting a current largest coding unit 1600 is determined to be d−1 and a partition mode of the current largest coding unit 1600 may be determined to be N_(d−1)×N_(d−1). Also, since the maximum depth is d, split information for the coding unit 1652 corresponding to a depth of d−1 is not set.

A data unit 1699 may be a 'minimum unit' for the current largest coding unit. A minimum unit according to the embodiment may be a square data unit obtained by splitting a smallest coding unit having a lowermost depth by 4. By performing the encoding repeatedly, the video encoding apparatus 800 according to the embodiment may select a depth having the least encoding error by comparing encoding errors according to depths of the coding unit 1600 to determine a depth, and set a corresponding partition type and a prediction mode as an encoding mode of the depth.

As such, the minimum encoding errors according to depths are compared in all of the depths of 0, 1, . . . , d−1, d, and a depth having the least encoding error may be determined as a depth. The depth, the partition mode of the prediction unit, and the prediction mode may be encoded and transmitted as split information. Also, since a coding unit has to be split from a depth of 0 to a depth, only split information of the depth is set to '0', and split information of depths excluding the depth is set to '1'.

The image data and encoding information extractor 920 of the video decoding apparatus 900 according to the embodiment may extract and use a depth and prediction unit information about the coding unit 1600 so as to decode the coding unit 1600. The video decoding apparatus 900 according to the embodiment may determine a depth, in which split information is '0', as a depth by using split information according to depths, and may use, for decoding, split information about the corresponding depth.

Figure 17:
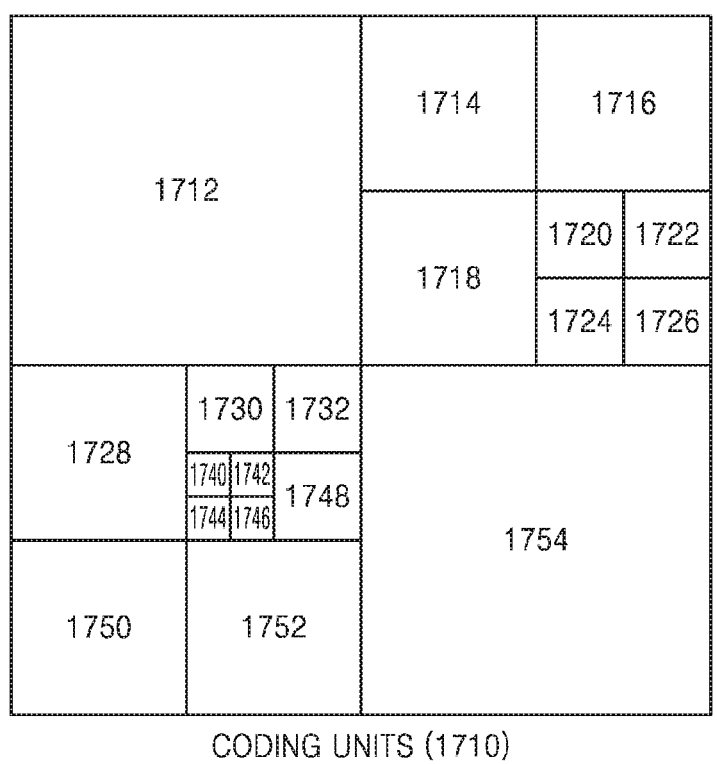
FIGS. 17, 18, and 19 illustrate a relationship between coding units, prediction units, and transformation units, according to various embodiments.
Figure 18:
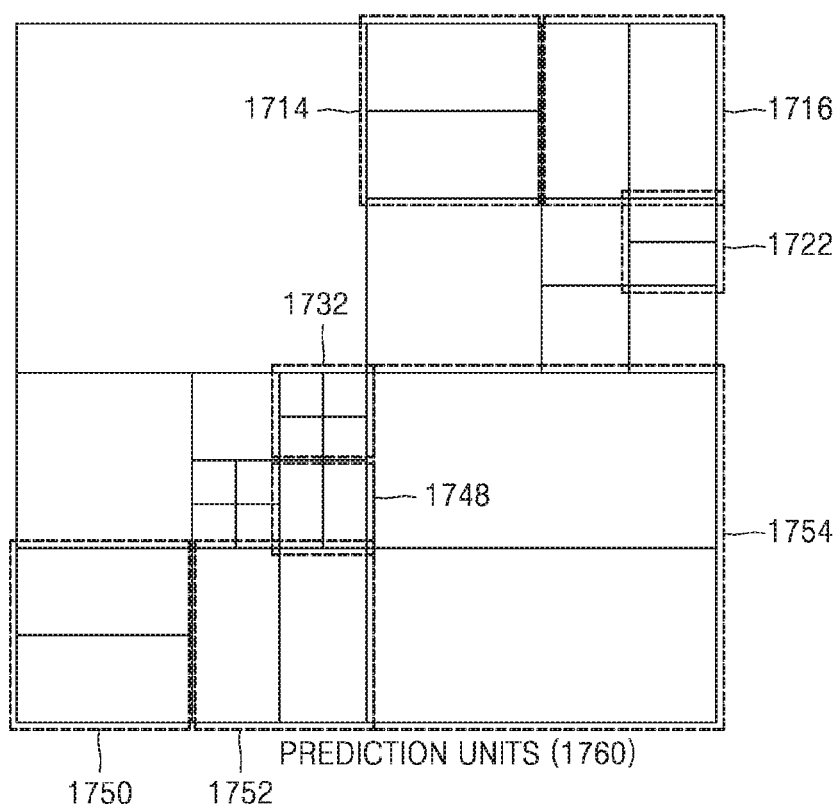
Figure 19:
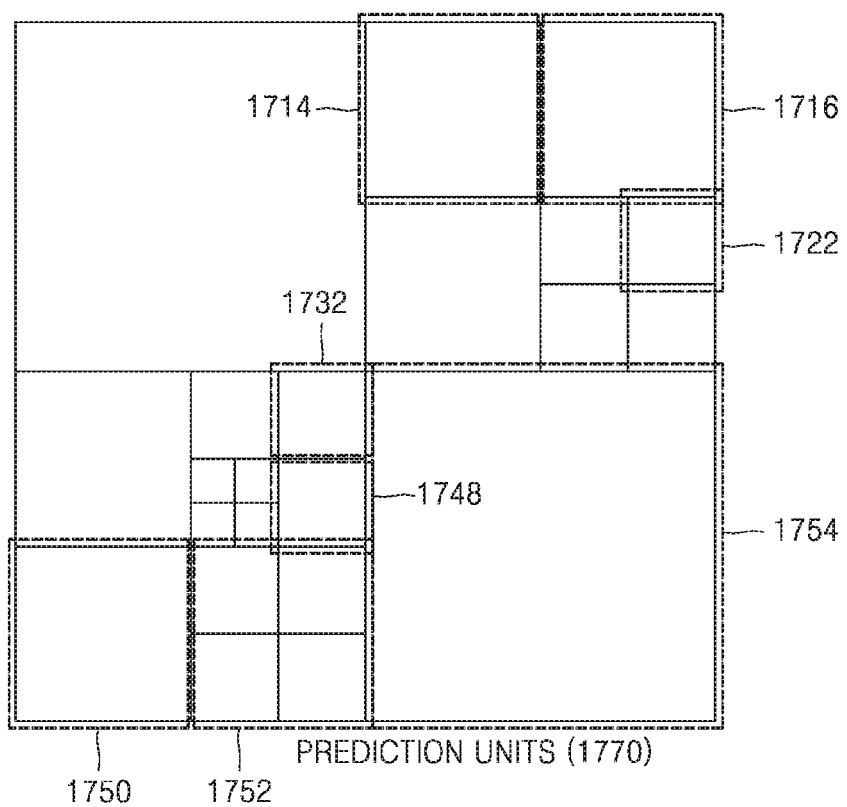

FIGS. 17, 18, and 19 illustrate a relationship between coding units, prediction units, and transformation units, according to various embodiments.

Coding units 1710 are deeper coding units according to depths determined by the video encoding apparatus 800, in a largest coding unit. Prediction units 1760 are partitions of prediction units of each of the coding units according to depths, and transformation units 1770 are transformation units of each of the coding units 1710 according to depths.

When a depth of a largest coding unit is 0 in the deeper coding units 1710, depths of coding units 1712 and 1754 are 1, depths of coding units 1714, 1716, 1718, 1728, 1750, and 1752 are 2, depths of coding units 1720, 1722, 1724, 1726, 1730, 1732, and 1748 are 3, and depths of coding units 1740, 1742, 1744, and 1746 are 4.

Some partitions 1714, 1716, 1722, 1732, 1748, 1750, 1752, and 1754 from among the prediction units 1760 are obtained by splitting the coding unit. That is, partitions 1714, 1722, 1750, and 1754 are a partition mode having a size of 2N×N, partitions 1716, 1748, and 1752 are a partition mode having a size of N×2N, and a partition 1732 is a partition mode having a size of N×N. Prediction units and partitions of the deeper coding units 1710 are smaller than or equal to each coding unit.

Transformation or inverse transformation is performed on image data of the coding unit 1752 in the transformation units 1770 in a data unit that is smaller than the coding unit 1752. Also, the coding units 1714, 1716, 1722, 1732, 1748, 1750, 1752, and 1754 in the transformation units 1770 are data units different from those in the prediction units 1760 in terms of sizes and shapes. That is, the video encoding apparatus 800 and the video decoding apparatus 900 according to the embodiments may perform intra prediction/motion estimation/motion compensation/and transformation/inverse transformation on an individual data unit in the same coding unit.

Accordingly, encoding is recursively performed on each of coding units having a hierarchical structure in each region of a largest coding unit to determine an optimum coding unit, and thus coding units having a recursive tree structure may be obtained. Encoding information may include split information about a coding unit, partition mode information, prediction mode information, and transformation unit size information. Table 7 below shows the encoding information that may be set by the video encoding apparatus 800 and the video decoding apparatus 900 according to the embodiments.

TABLE 7

| | Split Information 0 (Encoding on Coding Unit having Size of 2N×2N and Current Depth of d) | | | | Split Information 1 |
|---|---|---|---|---|---|
| | | Partition Type | | Size of Transformation Unit | |
| Prediction Mode | Symmetrical Partition Type | Asymmetrical Partition Type | Split Information 0 of Transformation Unit | Split Information 1 of Transformation Unit | |
| Intra Inter Skip (Only 2N×2N) | 2N×2N 2N×N N×2N N×N | 2N×nU 2N×nD nL×2N nR×2N | 2N×2N | N×N (Symmetrical Partition Type) N/2×N/2 (Asymmetrical Partition Type) | Repeatedly Encode Coding Units having Lower Depth of d + 1 |

The output unit 830 of the video encoding apparatus 800 according to the embodiment may output the encoding information about the coding units having a tree structure, and the image data and encoding information extractor 920 of the video decoding apparatus 900 according to the embodiment may extract the encoding information about the coding units having a tree structure from a received bitstream.

Split information specifies whether a current coding unit is split into coding units of a lower depth. If split information of a current depth d is 0, a depth, in which a current coding unit is no longer split into a lower depth, is a depth, and thus partition mode information, prediction mode information, and transformation unit size information may be defined for the depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition modes, and the skip mode is defined only in a partition mode having a size of 2N×2N.

The partition mode information may indicate symmetrical partition modes having sizes of 2N×2N, 2N×N, N×2N, and N×N, which are obtained by symmetrically splitting a height or a width of a prediction unit, and asymmetrical partition modes having sizes of 2N×nU, 2N×nD, nL×2N, and nR×2N, which are obtained by asymmetrically splitting the height or width of the prediction unit. The asymmetrical partition modes having sizes of 2N×nU and 2N×nD may be respectively obtained by splitting the height of the prediction unit in 1:3 and 3:1, and the asymmetrical partition modes having sizes of nL×2N and nR×2N may be respectively obtained by splitting the width of the prediction unit in 1:3 and 3:1.

The size of the transformation unit may be set to be two types in the intra mode and two types in the inter mode. That is, if split information of the transformation unit is 0, the size of the transformation unit may be 2N×2N, which is the size of the current coding unit. If split information of the transformation unit is 1, the transformation units may be obtained by splitting the current coding unit. Also, if a partition mode of the current coding unit having a size of 2N×2N is a symmetrical partition mode, a size of a transformation unit may be N×N, and if the partition mode of the current coding unit is an asymmetrical partition mode, the size of the transformation unit may be N/2×N/2.

The encoding information about coding units having a tree structure according to the embodiment may be assigned to at least one of a coding unit corresponding to a depth, a prediction unit, and a minimum unit. The coding unit corresponding to the depth may include at least one of a prediction unit and a minimum unit containing the same encoding information.

Accordingly, it is determined whether adjacent data units are included in the same coding unit corresponding to the depth by comparing encoding information of the adjacent data units. Also, a corresponding coding unit corresponding to a depth is determined by using encoding information of a data unit, and thus a distribution of depths in a largest coding unit may be inferred.

Accordingly, if a current coding unit is predicted based on encoding information of adjacent data units, encoding information of data units in deeper coding units adjacent to the current coding unit may be directly referred to and used.

In another embodiment, if a current coding unit is predicted based on encoding information of adjacent data units, data units adjacent to the current coding unit may be searched by using encoded information of the data units, and the searched adjacent coding units may be referred for predicting the current coding unit.

Figure 20:
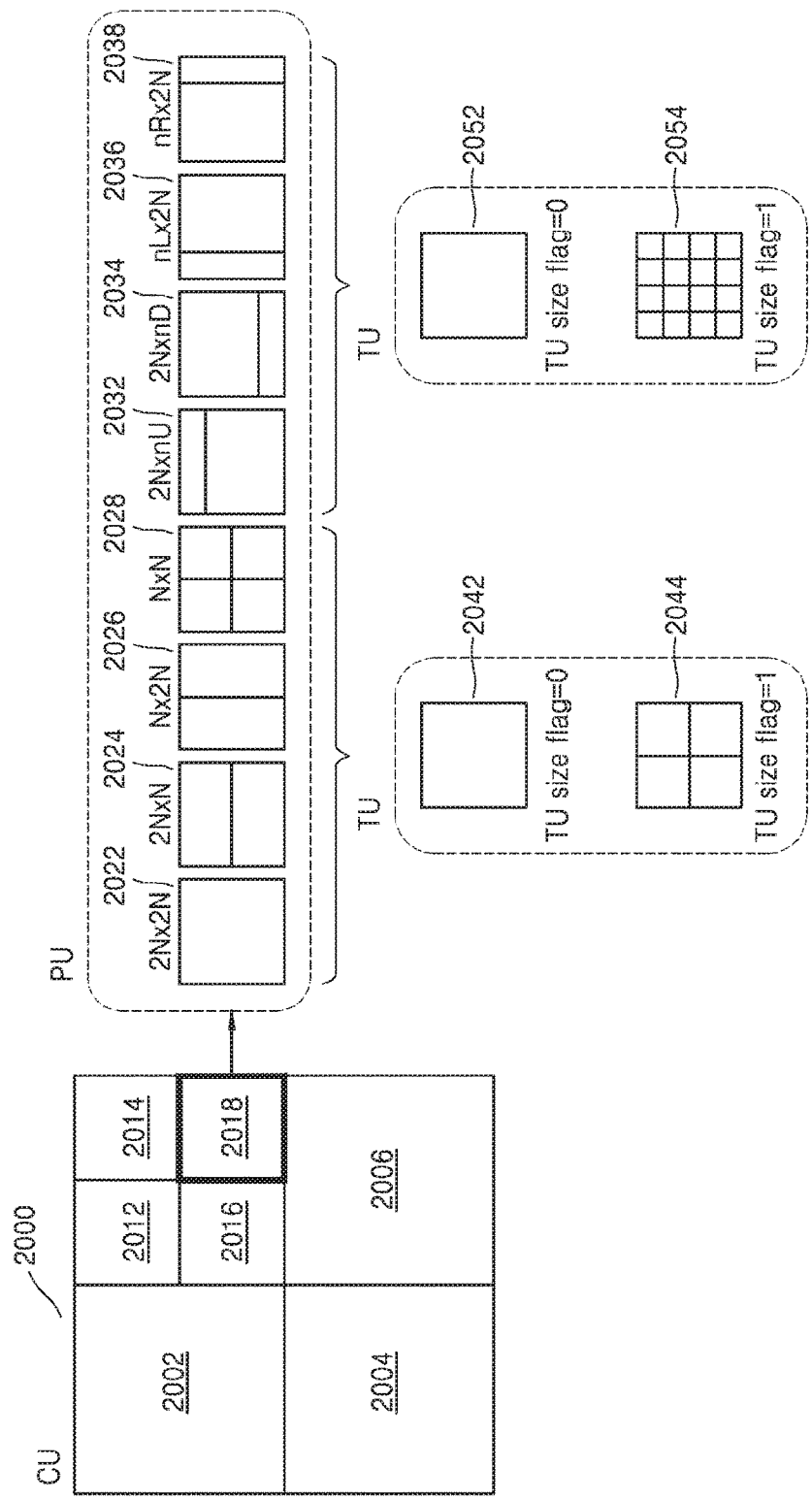
FIG. 20 illustrates a relationship between a coding unit, a prediction unit, and a transformation unit, according to encoding mode information of Table 7.

FIG. 20 illustrates a relationship between a coding unit, a prediction unit, and a transformation unit, according to encoding mode information of Table 7.

A largest coding unit 2000 includes coding units 2002, 2004, 2006, 2012, 2014, 2016, and 2018 of depths. Here, since the coding unit 2018 is a coding unit of a depth, split information may be set to 0. Partition mode information of the coding unit 2018 having a size of 2N×2N may be set to be one of partition modes including 2N×2N 2022, 2N×N 2024, N×2N 2026, N×N 2028, 2N×nU 2032, 2N×nD 2034, nL×2N 2036, and nR×2N 2038.

Transformation unit split information (TU size flag) is a type of a transformation index, and a size of a transformation unit corresponding to the transformation index may be changed according to a prediction unit type or partition mode of the coding unit.

For example, when the partition mode information is set to be one of symmetrical partition modes 2N×2N 2022, 2N×N 2024, N×2N 2026, and N×N 2028, if the transformation unit split information is 0, a transformation unit 2042 having a size of 2N×2N is set, and if the transformation unit split information is 1, a transformation unit 2044 having a size of N×N may be set.

When the partition mode information is set to be one of asymmetrical partition modes 2N×nU 2032, 2N×nD 2034, nL×2N 2036, and nR×2N 2038, if the transformation unit split information (TU size flag) is 0, a transformation unit 2052 having a size of 2N×2N may be set, and if the transformation unit split information is 1, a transformation unit 2054 having a size of N/2×N/2 may be set.

The transformation unit split information (TU size flag) described above with reference to FIG. 19 is a flag having a value or 0 or 1, but the transformation unit split information according to an embodiment is not limited to a flag having 1 bit, and the transformation unit may be hierarchically split while the transformation unit split information increases in a manner of 0, 1, 2, 3 . . . etc., according to setting. The transformation unit split information may be an example of the transformation index.

In this case, the size of a transformation unit that has been actually used may be expressed by using the transformation unit split information according to the embodiment, together with a maximum size of the transformation unit and a minimum size of the transformation unit. The video encoding apparatus 800 according to the embodiment may encode maximum transformation unit size information, minimum transformation unit size information, and maximum transformation unit split information. The result of encoding the maximum transformation unit size information, the minimum transformation unit size information, and the maximum transformation unit split information may be inserted into an SPS. The video decoding apparatus 900 according to the embodiment may decode video by using the maximum transformation unit size information, the minimum transformation unit size information, and the maximum transformation unit split information.

For example, (a) if the size of a current coding unit is 64×64 and a maximum transformation unit size is 32×32, (a-1) then the size of a transformation unit may be 32×32 when a TU size flag is 0, (a-2) may be 16×16 when the TU size flag is 1, and (a-3) may be 8×8 when the TU size flag is 2.

As another example, (b) if the size of the current coding unit is 32×32 and a minimum transformation unit size is 32×32, (b-1) then the size of the transformation unit may be 32×32 when the TU size flag is 0. Here, the TU size flag may not be set to a value other than 0, since the size of the transformation unit may not be less than 32×32.

As another example, (c) if the size of the current coding unit is 64×64 and a maximum TU size flag is 1, then the TU size flag may be 0 or 1. Here, the TU size flag may not be set to a value other than 0 or 1.

Thus, if it is defined that the maximum TU size flag is 'MaxTransformSizeIndex', a minimum transformation unit size is 'MinTransformSize', and a transformation unit size is 'RootTuSize' when the TU size flag is 0, then a current minimum transformation unit size 'CurrMinTuSize' that may be determined in a current coding unit may be defined by Equation (1):

$$\text{CurrMinTuSize} = \max(\text{MinTransformSize}, \text{RootTuSize}/(2^{\wedge}\text{MaxTransformSizeIndex})) \quad (1)$$

Compared to the current minimum transformation unit size 'CurrMinTuSize' that may be determined in the current coding unit, a transformation unit size 'RootTuSize' when the TU size flag is 0 may denote a maximum transformation unit size that may be selected in the system. That is, in Equation (1), 'RootTuSize/(2^MaxTransformSizeIndex)' denotes a transformation unit size when the transformation unit size 'RootTuSize', when the TU size flag is 0, is split by the number of times corresponding to the maximum TU size flag, and 'MinTransformSize' denotes a minimum transformation size. Thus, a smaller value from among 'RootTuSize/(2^MaxTransformSizeIndex)' and 'MinTransformSize' may be the current minimum transformation unit size 'CurrMinTuSize' that may be determined in the current coding unit.

According to an embodiment, the maximum transformation unit size RootTuSize may vary according to the type of a prediction mode.

For example, if a current prediction mode is an inter mode, then 'RootTuSize' may be determined by using Equation (2) below. In Equation (2), 'MaxTransformSize' denotes a maximum transformation unit size, and 'PUSize' denotes a current prediction unit size.

$$\text{RootTuSize} = \min(\text{MaxTransformSize}, \text{PUSize}) \quad (2)$$

That is, if the current prediction mode is the inter mode, the transformation unit size 'RootTuSize', when the TU size flag is 0, may be a smaller value from among the maximum transformation unit size and the current prediction unit size.

If a prediction mode of a current partition unit is an intra mode, 'RootTuSize' may be determined by using Equation (3) below. In Equation (3), 'PartitionSize' denotes the size of the current partition unit.

$$\text{RootTuSize} = \min(\text{MaxTransformSize}, \text{PartitionSize}) \quad (3)$$

That is, if the current prediction mode is the intra mode, the transformation unit size 'RootTuSize' when the TU size flag is 0 may be a smaller value from among the maximum transformation unit size and the size of the current partition unit.

However, the current maximum transformation unit size 'RootTuSize' that varies according to the type of a prediction mode in a partition unit is just an embodiment, and a factor for determining the current maximum transformation unit size is not limited thereto.

According to the video encoding method based on coding units of a tree structure described above with reference to FIGS. 8 through 20, image data of a spatial domain is encoded in each of the coding units of the tree structure, and the image data of the spatial domain is reconstructed in a manner that decoding is performed on each largest coding unit according to the video decoding method based on the coding units of the tree structure, so that a video that is formed of pictures and picture sequences may be reconstructed. The reconstructed video may be reproduced by a reproducing apparatus, may be stored in a storage medium, or may be transmitted via a network.

The one or more embodiments may be written as computer programs and may be implemented in general-purpose digital computers that execute the programs by using a computer-readable recording medium. Examples of the computer-readable recording medium include magnetic storage media (e.g., ROM, floppy disks, hard disks, etc.), optical recording media (e.g., CD-ROMs, or DVDs), etc.

For convenience of description, the video encoding methods and/or the video encoding method, which are described with reference to FIGS. 1A through 20, will be collectively referred to as 'the video encoding method'. Also, the video decoding methods and/or the video decoding method, which are described with reference to FIGS. 1A through 20, will be collectively referred to as 'the video decoding method'.

Also, a video encoding apparatus including the video encoding apparatus, the video encoding apparatus 800, or the video encoder 1100 which are described with reference to FIGS. 1A through 20 will be collectively referred as a 'video encoding apparatus'. Also, a video decoding apparatus including the inter-layer video decoding apparatus, the video decoding apparatus 900, or the video decoder 1200 which are described with reference to FIGS. 1A through 20 will be collectively referred to as a 'video decoding apparatus'.

A computer-readable recording medium storing a program, e.g., a disk 26000, according to an embodiment will now be described in detail.

Figure 21:
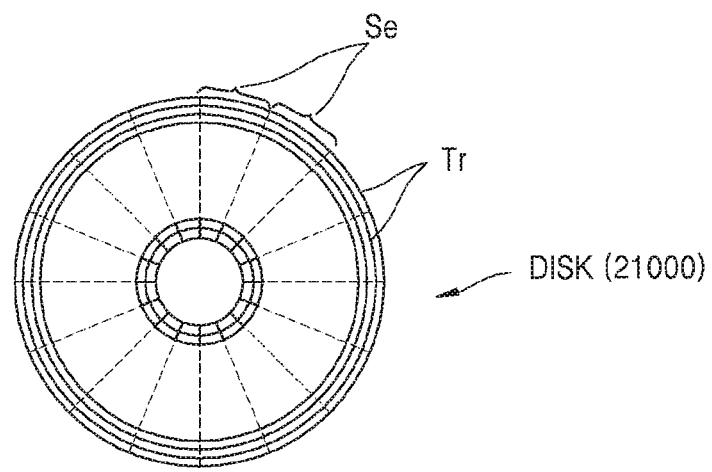
FIG. 21 illustrates a physical structure of a disk in which a program is stored, according to various embodiments.

FIG. 21 illustrates a physical structure of the disk 26000 in which a program is stored, according to various embodiments. The disk 26000, which is a storage medium, may be a hard drive, a compact disk read-only memory (CD-ROM) disk, a Blu-ray disk, or a digital versatile disk (DVD). The disk 26000 includes a plurality of concentric tracks Tr that are each divided into a specific number of sectors Se in a circumferential direction of the disk 26000. In a specific region of the disk 26000, a program that executes the quantized parameter determining method, the video encoding method, and the video decoding method described above may be assigned and stored.

A computer system embodied using a storage medium that stores a program for executing the video encoding method and the video decoding method as described above will now be described with reference to FIG. 22.

Figure 22:
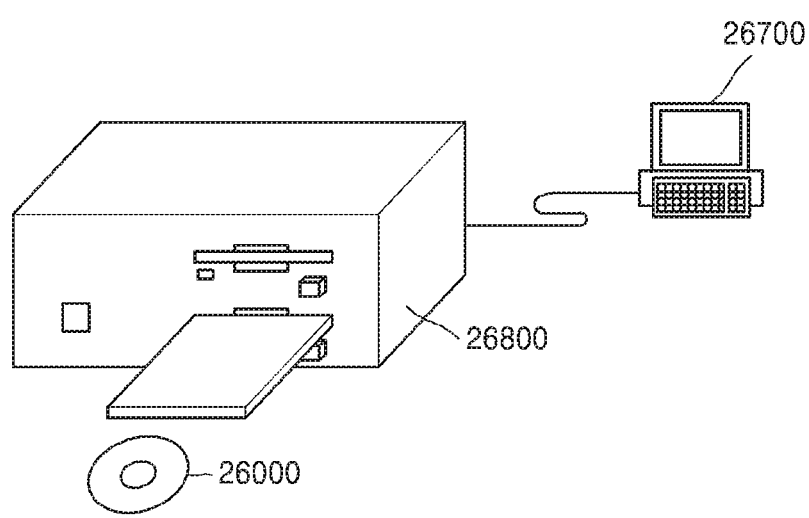
FIG. 22 illustrates a disk drive for recording and reading a program by using the disk.

FIG. 22 illustrates a disk drive 26800 for recording and reading a program by using the disk 26000. A computer system 26700 may store a program that executes at least one selected from a video encoding method and a video decoding method according to an embodiment, in the disk 26000 via the disk drive 26800. In order to run the program stored in the disk 26000 in the computer system 26700, the program may be read from the disk 26000 and be transmitted to the computer system 26700 by using the disk drive 26800.

The program that executes at least one of a video encoding method and a video decoding method according to an embodiment may be stored not only in the disk 26000 illustrated in FIGS. 21 and 22 but also may be stored in a memory card, a ROM cassette, or a solid state drive (SSD).

A system to which the video encoding method and the video decoding method described above are applied will be described below.

Figure 23:
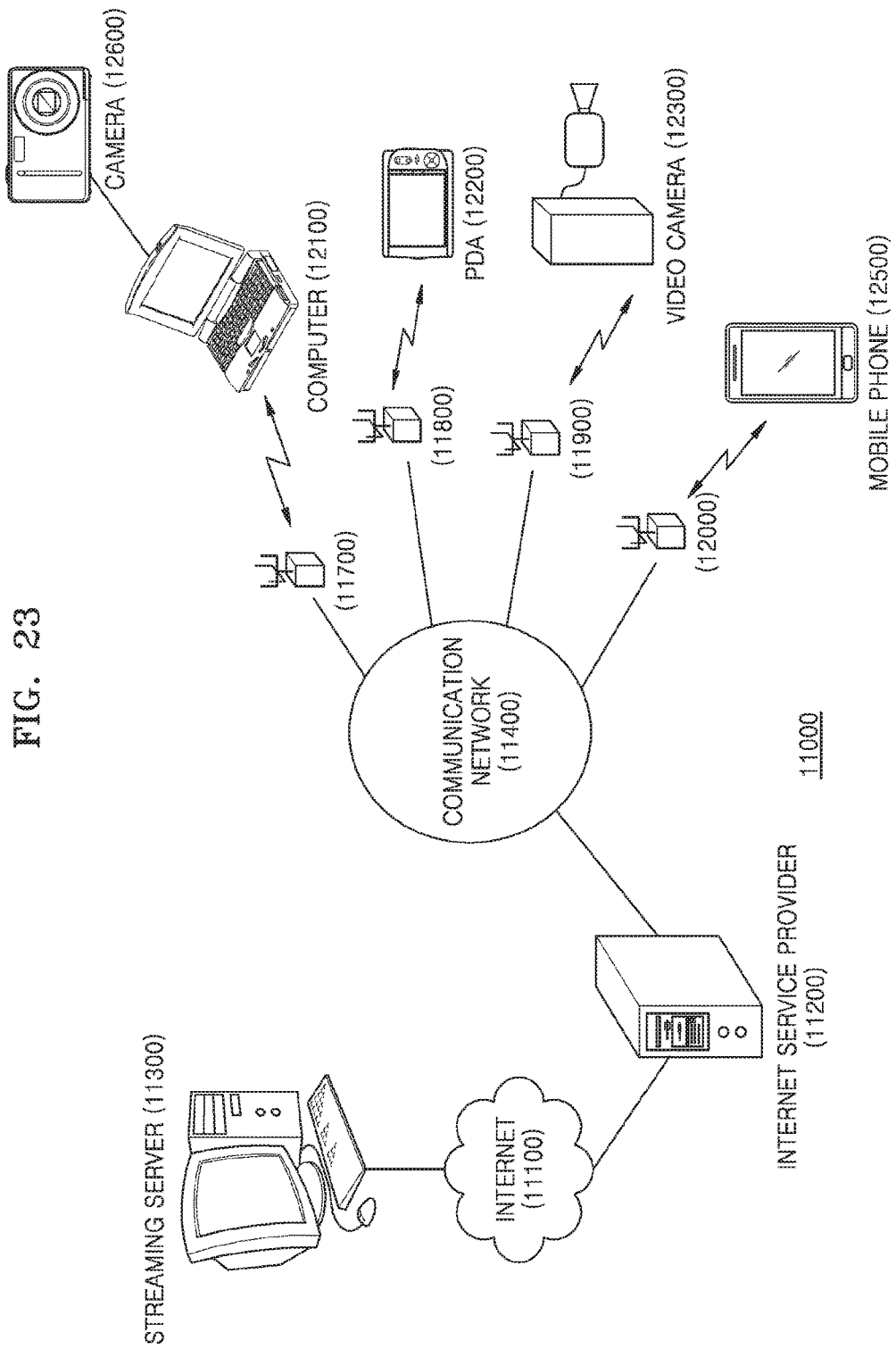
FIG. 23 illustrates an overall structure of a content supply system for providing a content distribution service.

FIG. 23 illustrates an overall structure of a content supply system 11000 for providing a content distribution service. A service area of a communication system is divided into predetermined-sized cells, and wireless base stations 11700, 11800, 11900, and 12000 are installed in these cells, respectively.

The content supply system 11000 includes a plurality of independent devices. For example, the plurality of independent devices, such as a computer 12100, a personal digital assistant (PDA) 12200, a video camera 12300, and a mobile phone 12500, are connected to the Internet 11100 via an internet service provider 11200, a communication network 11400, and the wireless base stations 11700, 11800, 11900, and 12000.

However, the content supply system 11000 is not limited to as illustrated in FIG. 23, and devices may be selectively connected thereto. The plurality of independent devices may be directly connected to the communication network 11400, not via the wireless base stations 11700, 11800, 11900, and 12000.

The video camera 12300 is an imaging device, e.g., a digital video camera, which is capable of capturing video images. The mobile phone 12500 may employ at least one communication method from among various protocols, e.g., Personal Digital Communications (PDC), Code Division Multiple Access (CDMA), Wideband-Code Division Multiple Access (W-CDMA), Global System for Mobile Communications (GSM), and Personal Handyphone System (PHS).

The video camera 12300 may be connected to a streaming server 11300 via the wireless base station 11900 and the communication network 11400. The streaming server 11300 allows content received from a user via the video camera 12300 to be streamed via a real-time broadcast. The content received from the video camera 12300 may be encoded by the video camera 12300 or the streaming server 11300. Video data captured by the video camera 12300 may be transmitted to the streaming server 11300 via the computer 12100.

Video data captured by a camera 12600 may also be transmitted to the streaming server 11300 via the computer 12100. The camera 12600 is an imaging device capable of capturing both still images and video images, similar to a digital camera. The video data captured by the camera 12600 may be encoded using the camera 12600 or the computer 12100. Software that performs encoding and decoding video may be stored in a computer-readable recording medium, e.g., a CD-ROM disk, a floppy disk, a hard disk drive, an SSD, or a memory card, which may be accessible by the computer 12100.

If video data is captured by a camera built in the mobile phone 12500, the video data may be received from the mobile phone 12500.

The video data may also be encoded by a large scale integrated circuit (LSI) system installed in the video camera 12300, the mobile phone 12500, or the camera 12600.

The content supply system 11000 may encode content data recorded by a user using the video camera 12300, the camera 12600, the mobile phone 12500, or another imaging device, e.g., content recorded during a concert, and transmit the encoded content data to the streaming server 11300. The streaming server 11300 may transmit the encoded content data in a type of a streaming content to other clients that request the content data.

The clients are devices capable of decoding the encoded content data, e.g., the computer 12100, the PDA 12200, the video camera 12300, or the mobile phone 12500. Thus, the content supply system 11000 allows the clients to receive and reproduce the encoded content data. Also, the content supply system 11000 allows the clients to receive the encoded content data and decode and reproduce the encoded content data in real time, thereby enabling personal broadcasting.

Encoding and decoding operations of the plurality of independent devices included in the content supply system 11000 may be similar to those of a video encoding apparatus and a video decoding apparatus according to embodiments.

Figure 24:
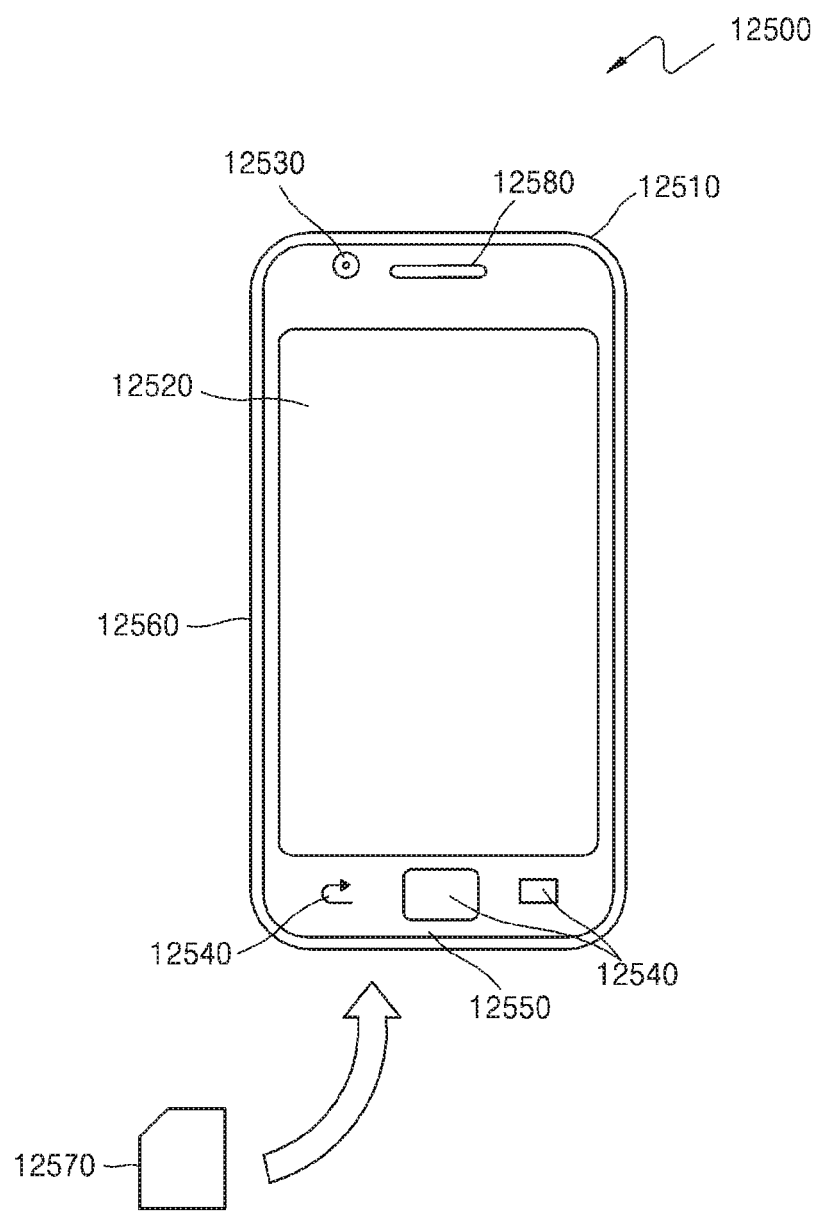
FIGS. 24 and 25 illustrate external and internal structures of a mobile phone to which a video encoding method and a video decoding method are applied, according various embodiments.
Figure 25:
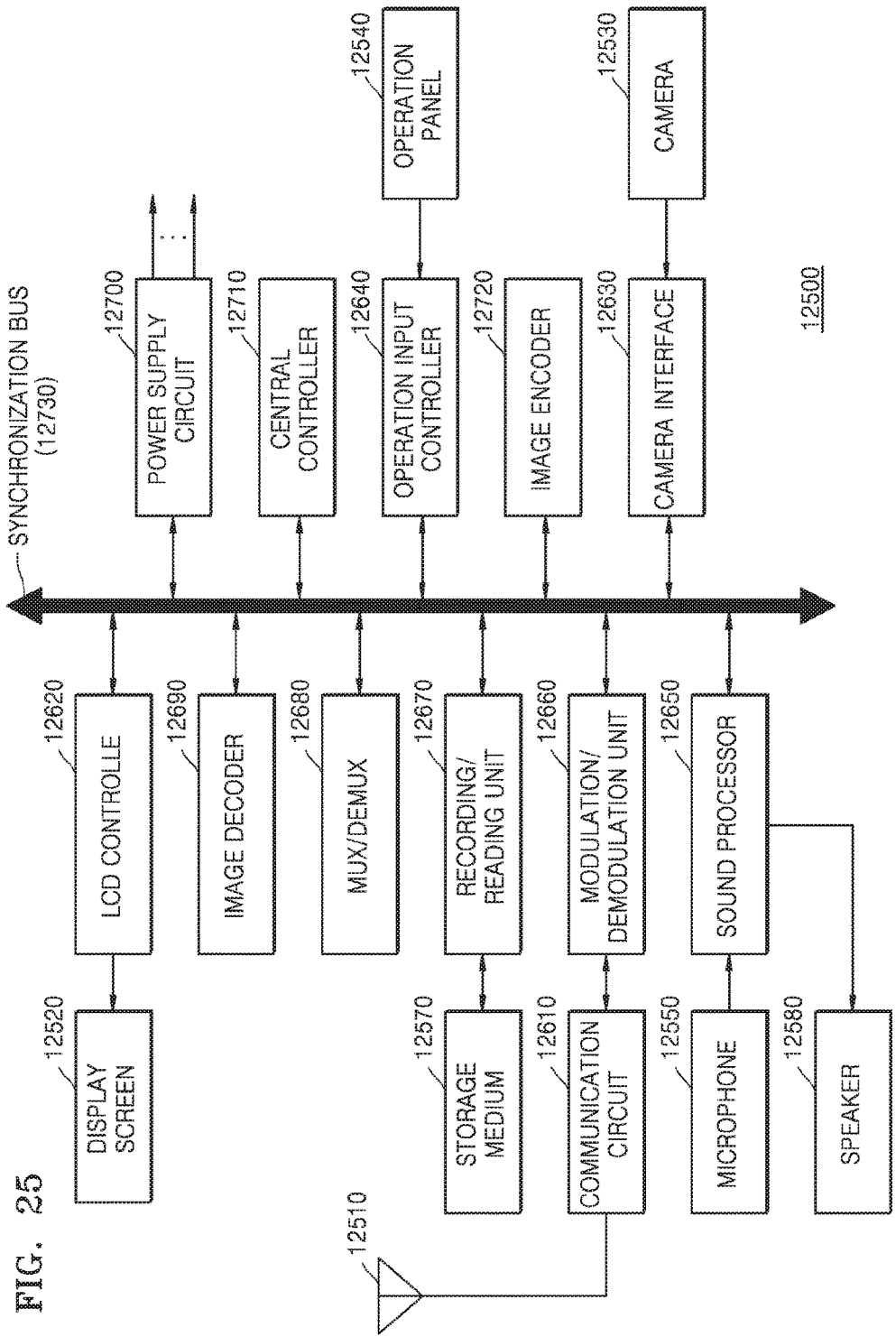

With reference to FIGS. 24 and 25, the mobile phone 12500 included in the content supply system 11000 according to an embodiment will now be described in detail.

FIG. 24 illustrates an external structure of the mobile phone 12500 to which a video encoding method and a video decoding method are applied, according to various embodiments. The mobile phone 12500 may be a smart phone, the functions of which are not limited and a large number of the functions of which may be changed or expanded.

The mobile phone 12500 includes an internal antenna 12510 via which a radio-frequency (RF) signal may be exchanged with the wireless base station 12000, and includes a display screen 12520 for displaying images captured by a camera 12530 or images that are received via the antenna 12510 and decoded, e.g., a liquid crystal display (LCD) or an organic light-emitting diode (OLED) screen. The mobile phone 12500 includes an operation panel 12540 including a control button and a touch panel. If the display screen 12520 is a touch screen, the operation panel 12540 further includes a touch sensing panel of the display screen 12520. The mobile phone 12500 includes a speaker 12580 for outputting voice and sound or another type of a sound output unit, and a microphone 12550 for inputting voice and sound or another type of a sound input unit. The mobile phone 12500 further includes the camera 12530, such as a charge-coupled device (CCD) camera, to capture video and still images. The mobile phone 12500 may further include a storage medium 12570 for storing encoded/decoded data, e.g., video or still images captured by the camera 12530, received via an e-mail, or obtained according to various ways; and a slot 12560 via which the storage medium 12570 is loaded into the mobile phone 12500. The storage medium 12570 may be a flash memory, e.g., a secure digital (SD) card or an electrically erasable and programmable read-only memory (EEPROM) included in a plastic case.

FIG. 25 illustrates an internal structure of the mobile phone 12500. In order to systemically control parts of the mobile phone 12500 including the display screen 12520 and the operation panel 12540, a power supply circuit 12700, an operation input controller 12640, an image encoder 12720, a camera interface 12630, an LCD controller 12620, an image decoder 12690, a multiplexer/demultiplexer (MUX/DEMUX) 12680, a recording/reading unit 12670, a modulation/demodulation unit 12660, and a sound processor 12650 are connected to a central controller 12710 via a synchronization bus 12730.

If a user operates a power button and sets from a 'power off' state to a 'power on' state, the power supply circuit 12700 supplies power to all the parts of the mobile phone 12500 from a battery pack, thereby setting the mobile phone 12500 to an operation mode.

The central controller 12710 includes a central processing unit (CPU), a read-only memory (ROM), and a random-access memory (RAM).

While the mobile phone 12500 transmits communication data to the outside, a digital signal is generated by the mobile phone 12500 under control of the central controller 12710. For example, the sound processor 12650 may generate a digital sound signal, the image encoder 12720 may generate a digital image signal, and text data of a message may be generated via the operation panel 12540 and the operation input controller 12640. When a digital signal is transmitted to the modulation/demodulation unit 12660 by control of the central controller 12710, the modulation/demodulation unit 12660 modulates a frequency band of the digital signal, and a communication circuit 12610 performs digital-to-analog conversion (DAC) and frequency conversion on the frequency band-modulated digital sound signal. A transmission signal output from the communication circuit 12610 may be transmitted to a voice communication base station or the wireless base station 12000 via the antenna 12510.

For example, when the mobile phone 12500 is in a call mode, a sound signal obtained via the microphone 12550 is transformed into a digital sound signal by the sound processor 12650, by control of the central controller 12710. The digital sound signal may be transformed into a transformation signal via the modulation/demodulation unit 12660 and the communication circuit 12610, and may be transmitted via the antenna 12510.

When a text message, e.g., an e-mail, is transmitted in a data communication mode, text data of the text message is input via the operation panel 12540 and is transmitted to the central controller 12710 via the operation input controller 12640. By control of the central controller 12710, the text data is transformed into a transmission signal via the modulation/demodulation unit 12660 and the communication circuit 12610 and is transmitted to the wireless base station 12000 via the antenna 12510.

In order to transmit image data in the data communication mode, image data captured by the camera 12530 is provided to the image encoder 12720 via the camera interface 12630. The captured image data may be directly displayed on the display screen 12520 via the camera interface 12630 and the LCD controller 12620.

A structure of the image encoder 12720 may correspond to that of the video encoding apparatus 100 described above. The image encoder 12720 may transform the image data received from the camera 12530 into compressed and encoded image data according to the aforementioned video encoding method, and then output the encoded image data to the multiplexer/demultiplexer 12680. During a recording operation of the camera 12530, a sound signal obtained by the microphone 12550 of the mobile phone 12500 may be transformed into digital sound data via the sound processor 12650, and the digital sound data may be transmitted to the multiplexer/demultiplexer 12680.

The multiplexer/demultiplexer 12680 multiplexes the encoded image data received from the image encoder 12720, together with the sound data received from the sound processor 12650. A result of multiplexing the data may be transformed into a transmission signal via the modulation/demodulation unit 12660 and the communication circuit 12610, and may then be transmitted via the antenna 12510.

While the mobile phone 12500 receives communication data from the outside, frequency recovery and analog-to-digital conversion (ADC) are performed on a signal received via the antenna 12510 to transform the signal into a digital signal. The modulation/demodulation unit 12660 modulates a frequency band of the digital signal. The frequency-band modulated digital signal is transmitted to the image decoder 12690, the sound processor 12650, or the LCD controller 12620, according to the type of the digital signal.

In the call mode, the mobile phone 12500 amplifies a signal received via the antenna 12510, and obtains a digital sound signal by performing frequency conversion and ADC on the amplified signal. A received digital sound signal is transformed into an analog sound signal via the modulation/demodulation unit 12660 and the sound processor 12650, and the analog sound signal is output via the speaker 12580, by control of the central controller 12710.

When in the data communication mode, data of a video file accessed at an Internet website is received, a signal received from the wireless base station 12000 via the antenna 12510 is output as multiplexed data via the modulation/demodulation unit 12660, and the multiplexed data is transmitted to the multiplexer/demultiplexer 12680.

In order to decode the multiplexed data received via the antenna 12510, the multiplexer/demultiplexer 12680 demultiplexes the multiplexed data into an encoded video data stream and an encoded audio data stream. Via the synchronization bus 12730, the encoded video data stream and the encoded audio data stream are provided to the image decoder 12690 and the sound processor 12650, respectively.

A structure of the image decoder 12690 may correspond to that of the video decoding apparatus described above. The image decoder 12690 may decode the encoded video data to obtain reconstructed video data and provide the reconstructed video data to the display screen 12520 via the LCD controller 12620, by using the aforementioned video decoding method according to the embodiment.

Thus, the data of the video file accessed at the Internet website may be displayed on the display screen 12520. At the same time, the sound processor 12650 may transform audio data into an analog sound signal, and provide the analog sound signal to the speaker 12580. Thus, audio data contained in the video file accessed at the Internet website may also be reproduced via the speaker 12580.

The mobile phone 12500 or another type of communication terminal may be a transceiving terminal including both a video encoding apparatus and a video decoding apparatus according to an exemplary embodiment, may be a transmitting terminal including only the video encoding apparatus, or may be a receiving terminal including only the video decoding apparatus.

Figure 26:
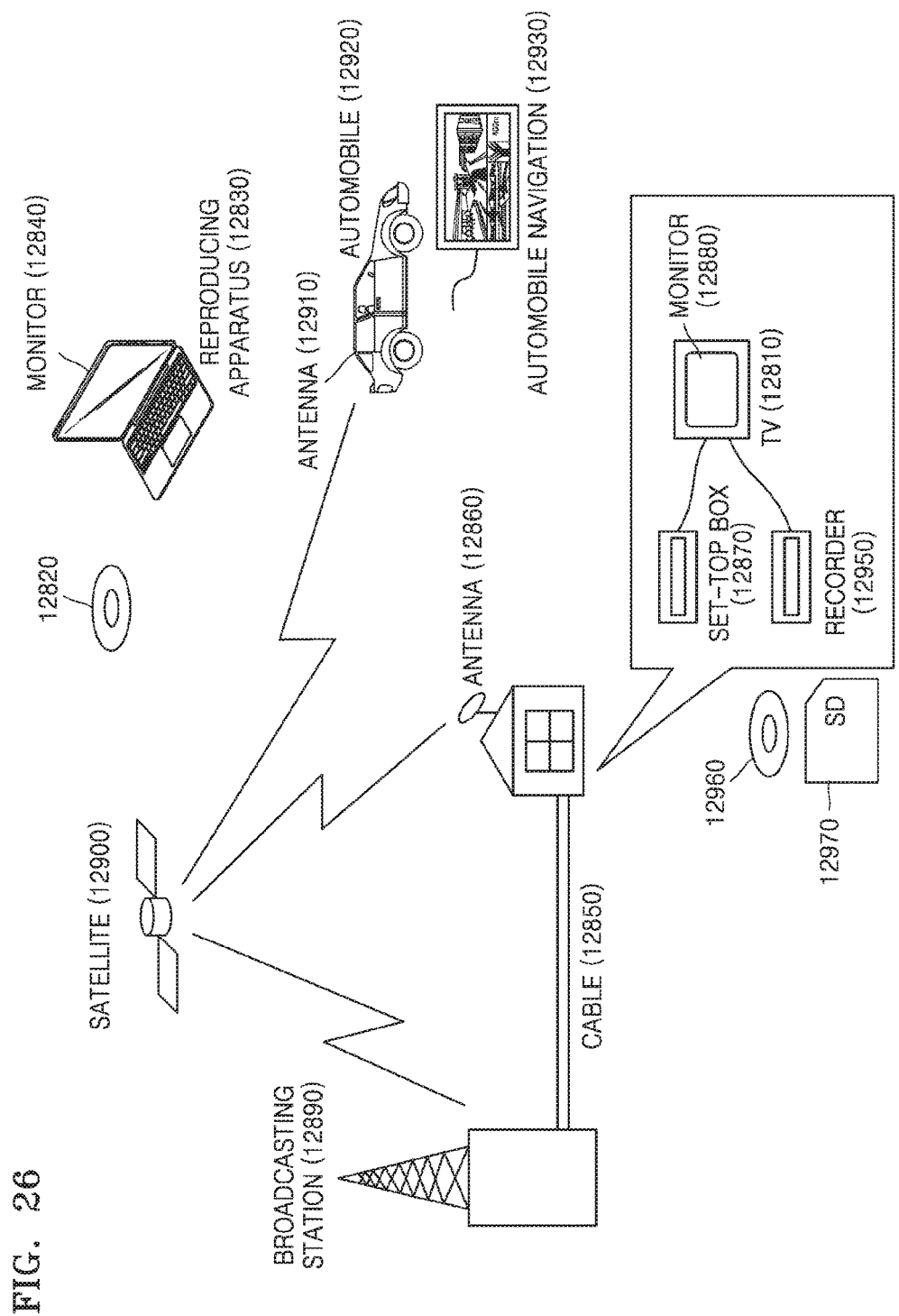
FIG. 26 illustrates a digital broadcasting system employing a communication system, according to various embodiments.

A communication system according to an embodiment is not limited to the communication system described above with reference to FIG. 24. For example, FIG. 26 illustrates a digital broadcasting system employing a communication system, according to various embodiments. The digital broadcasting system of FIG. 26 may receive a digital broadcast transmitted via a satellite or a terrestrial network by using the video encoding apparatus and the video decoding apparatus according to the embodiments.

In more detail, a broadcasting station 12890 transmits a video data stream to a communication satellite or a broadcasting satellite 12900 by using radio waves. The broadcasting satellite 12900 transmits a broadcast signal, and the broadcast signal is transmitted to a satellite broadcast receiver via a household antenna 12860. In every house, an encoded video stream may be decoded and reproduced by a TV receiver 12810, a set-top box 12870, or another device.

When the video decoding apparatus according to the exemplary embodiment is implemented in a reproducing apparatus 12830, the reproducing apparatus 12830 may parse and decode an encoded video stream recorded on a storage medium 12820, such as a disk or a memory card to reconstruct digital signals. Thus, the reconstructed video signal may be reproduced, for example, on a monitor 12840.

In the set-top box 12870 connected to the antenna 12860 for a satellite/terrestrial broadcast or a cable antenna 12850 for receiving a cable television (TV) broadcast, the video decoding apparatus according to the embodiment may be installed. Data output from the set-top box 12870 may also be reproduced on a TV monitor 12880.

As another example, the video decoding apparatus according to the embodiment may be installed in the TV receiver 12810 instead of the set-top box 12870.

An automobile 12920 that has an appropriate antenna 12910 may receive a signal transmitted from the satellite 12900 or the wireless base station 11700. A decoded video may be reproduced on a display screen of an automobile navigation system 12930 installed in the automobile 12920.

A video signal may be encoded by the video encoding apparatus according to the embodiment and may then be stored in a storage medium. In more detail, an image signal may be stored in a DVD disk 12960 by a DVD recorder or may be stored in a hard disk by a hard disk recorder 12950. As another example, the video signal may be stored in an SD card 12970. If the hard disk recorder 12950 includes the video decoding apparatus according to the exemplary embodiment, a video signal recorded on the DVD disk 12960, the SD card 12970, or another storage medium may be reproduced on the TV monitor 12880.

The automobile navigation system 12930 may not include the camera 12530, the camera interface 12630, and the image encoder 12720 of FIG. 25. For example, the computer 12100 and the TV receiver 12810 may not include the camera 12530, the camera interface 12630, and the image encoder 12720 of FIG. 25.

Figure 27:
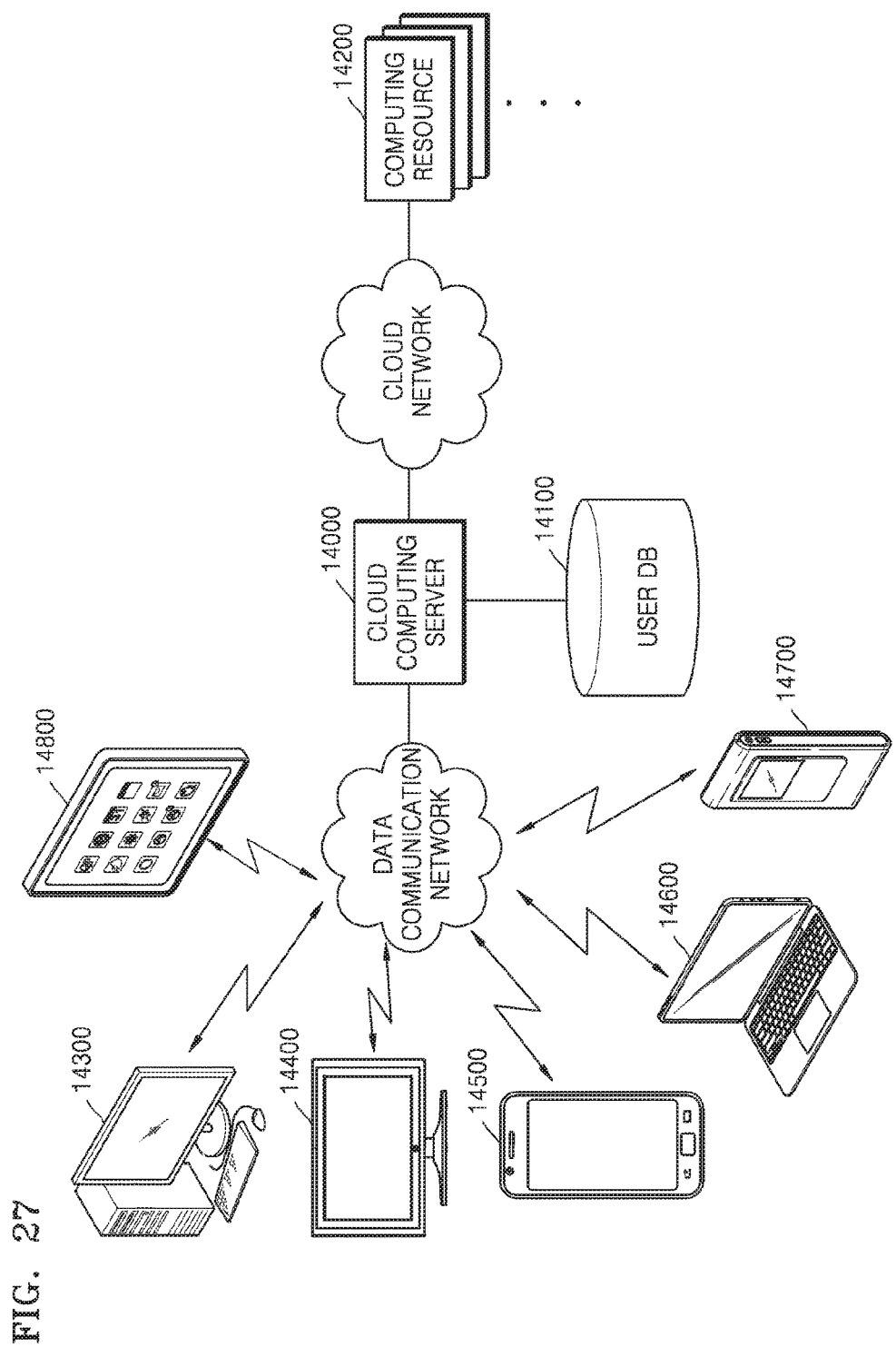
FIG. 27 illustrates a network structure of a cloud computing system using a video encoding apparatus and a video decoding apparatus, according to various embodiments.

FIG. 27 illustrates a network structure of a cloud computing system using a video encoding apparatus and a video decoding apparatus, according to various embodiments.

The cloud computing system may include a cloud computing server 14000, a user database (DB) 14100, a plurality of computing resources 14200, and a user terminal.

The cloud computing system provides an on-demand outsourcing service of the plurality of computing resources 14200 via a data communication network, e.g., the Internet, in response to a request from the user terminal. In a cloud computing environment, a service provider provides users with desired services by combining computing resources at data centers located at physically different locations by using virtualization technology. A service user does not have to install computing resources, e.g., an application, a storage, an operating system (OS), and security software, into his/her own terminal in order to use them, but may select and use desired services from among services in a virtual space generated through the virtualization technology, at a desired point in time.

A user terminal of a specified service user is connected to the cloud computing server 14100 via a data communication network including the Internet and a mobile telecommunication network. User terminals may be provided with cloud computing services, and particularly video reproduction services, from the cloud computing server 14100. The user terminals may be various types of electronic devices capable of being connected to the Internet, e.g., a desktop PC 14300, a smart TV 14400, a smart phone 14500, a notebook computer 14600, a portable multimedia player (PMP) 14700, a tablet PC 14800, and the like.

The cloud computing server 14000 may combine the plurality of computing resources 14200 distributed in a cloud network and provide user terminals with a result of combining. The plurality of computing resources 14200 may include various data services, and may include data uploaded from user terminals. As described above, the cloud computing server 14000 may provide user terminals with desired services by combining video database distributed in different regions according to the virtualization technology.

User information about users who have subscribed for a cloud computing service is stored in the user DB 14100. The user information may include logging information, addresses, names, and personal credit information of the users. The user information may further include indexes of videos. Here, the indexes may include a list of videos that have already been reproduced, a list of videos that are being reproduced, a pausing point of a video that was being reproduced, and the like.

Information about a video stored in the user DB 14100 may be shared between user devices. For example, when a video service is provided to the notebook computer 14600 in response to a request from the notebook computer 14600, a reproduction history of the video service is stored in the user DB 14100. When a request to reproduce the video service is received from the smart phone 14500, the cloud computing server 14000 searches for and reproduces the video service, based on the user DB 14100. When the smart phone 14500 receives a video data stream from the cloud computing server 14000, a process of reproducing video by decoding the video data stream is similar to an operation of the mobile phone 12500 described above with reference to FIG. 24.

The cloud computing server 14000 may refer to a reproduction history of a desired video service, stored in the user DB 14100. For example, the cloud computing server 14000 receives a request to reproduce a video stored in the user DB 14100, from a user terminal. If this video was being reproduced, then a method of streaming this video, performed by the cloud computing server 14000, may vary according to the request from the user terminal, i.e., according to whether the video will be reproduced, starting from a start thereof or a pausing point thereof. For example, if the user terminal requests to reproduce the video, starting from the start thereof, the cloud computing server 14000 transmits streaming data of the video starting from a first frame thereof to the user terminal. If the user terminal requests to reproduce the video, starting from the pausing point thereof, the cloud computing server 14000 transmits streaming data of the video starting from a frame corresponding to the pausing point, to the user terminal.

In this case, the user terminal may include the video decoding apparatus as described above with reference to FIGS. 1A through 20. As another example, the user terminal may include the video encoding apparatus as described above with reference to FIGS. 1A through 20. Alternatively, the user terminal may include both the video decoding apparatus and the video encoding apparatus as described above with reference to FIGS. 1A through 20.

Various applications of the video encoding method, the video decoding method, the video encoding apparatus, and the video decoding apparatus according to the exemplary embodiments described above with reference to FIGS. 1A through 20 are described above with reference to FIGS. 21 through 27. However, methods of storing the video encoding method and the video decoding method in a storage medium or methods of implementing the video encoding apparatus and the video decoding apparatus in a device described above with reference to FIGS. 1A through 20 are not limited to the exemplary embodiments described above with reference to FIGS. 21 through 27.

The present invention may also be embodied as computer-readable codes on a computer-readable recording medium. The computer-readable recording medium may be any data storage device that may store programs or data which may be thereafter read by a computer system. Examples of the computer-readable recording medium may include ROMs, RAMs, CD-ROMs, magnetic tapes, hard disks, floppy disks, flash memories, and optical data storage devices. The computer-readable recording medium may also be distributed over network-coupled computer systems so that the computer-readable code may be stored and executed in a distributed fashion.

While this present invention has been particularly shown and described with reference to exemplary embodiments thereof, it will be understood by those of ordinary skill in the art that various changes in form and details may be made therein without departing from the spirit and scope of the following claims. Therefore, the scope of the present invention is defined not by the detailed description of the disclosure but by the appended claims, and all differences within the scope will be construed as being included in the disclosure.

The invention claimed is:

1. An image decoding method comprising:
obtaining inter-layer prediction allowance information from a bitstream;
obtaining single layer use information from the bitstream when the inter-layer prediction allowance information indicates that inter-layer prediction is usable;
determining a layer having a maximum layer identifier value among at least one layer, to which a current picture directly refers, as a reference layer according to direct reference information obtained from the bitstream when the single layer use information indicates that at most one picture is used for inter-layer prediction; and
performing inter-layer prediction on the current picture by using a picture belonging to the reference layer,
wherein the obtaining of the single layer use information comprises:
obtaining reference layer activation information about a current layer from the bitstream; and
obtaining the single layer use information when the reference layer activation information about the current layer indicates that reference pictures of all direct reference layers of the current layer are provided by a same access unit and are included in a same inter-layer reference picture set.

2. The image decoding method of claim 1, wherein the performing of the inter-layer prediction on the current picture by using the picture belonging to the reference layer comprises determining a picture having a decoding order identical to a decoding order of the current picture, among at least one picture included in the reference layer, as a reference picture.

3. The image decoding method of claim 1, further comprising, when the single layer use information does not indicate that at most one picture is used for inter-layer prediction:
obtaining information about the number of pictures that are to be referred to for inter-layer prediction from the bitstream;
obtaining an identifier of a reference layer used for inter-layer prediction from the bitstream according to the number represented by the information about the number of pictures that are to be referred to for inter-layer prediction; and
performing inter-layer prediction of the current picture by using the identifier of the reference layer.

4. The image decoding method of claim 1, further comprising, when the single layer use information does not indicate that at most one picture is used for inter-layer prediction of the current picture:
obtaining direct reference information representing inter-layer direct reference information from the bitstream;
generating inter-layer indirect reference information by using the direct reference information;
determining layer identifier information of a picture referred to for decoding a current picture by using the direct reference information and the indirect reference information; and
decoding the current picture by performing inter-layer prediction by using the layer identifier of the referred picture.

5. The image decoding method of claim 4, wherein the generating of the inter-layer indirect reference information by using the direct reference information comprises:
determining, by using the direct reference information, whether a second layer having a higher layer index than a first layer directly refers to a third layer having a lower layer index than the first layer;
generating inter-layer indirect reference information by determining whether the first layer indirectly refers to the third layer, based on whether the second layer directly refers to the third layer,
wherein when it is determined that the second layer directly refers to the third layer, it is determined that the first layer indirectly refers to the third layer,
wherein when it is determined that the first layer indirectly refers to the third layer, a layer identifier of the third layer is inserted into a dependent layer identifier list of the first layer.

6. The image decoding method of claim 4, wherein the determining of the layer identifier information of the picture referred to for the decoding of the current picture by using the direct reference information and the indirect reference information comprises:
generating a dependent layer identifier list of a layer by using the direct reference information and the indirect reference information; and
determining a layer identifier of a picture referred to in a current picture by using the dependent layer identifier list when dependent layer identifier list reference information obtained from the bitstream represents a reference of a dependent layer identifier list.

7. The image decoding method of claim 1, wherein the single layer use information is obtained from the bitstream independently on a layer-by-layer basis.

8. An image decoding method comprising:
obtaining inter-layer prediction allowance information from a bitstream;
obtaining single layer use information from the bitstream when the inter-layer prediction allowance information indicates that inter-layer prediction is usable;
determining a layer having a maximum layer identifier value among at least one layer, to which a current picture directly refers, as a reference layer according to direct reference information obtained from the bitstream when the single layer use information indicates that at most one picture is used for inter-layer prediction;
performing inter-layer prediction on the current picture by using a picture belonging to the reference layer;
obtaining reference layer activation information from the bitstream when the single layer use information does not indicate that at most one picture is used for inter-layer prediction;
obtaining selection information of an inter-layer reference picture set from the bitstream when the reference layer activation information does not indicate that reference pictures of all direct reference layers are provided by a same access unit and are included in a same inter-layer reference picture set;

when the selection information indicates that inter-layer reference picture set information is selected from a set of pre-generated inter-layer reference picture set information, obtaining an index for selecting inter-layer reference picture set information from the bitstream and determining an inter-layer reference picture by using the inter-layer reference picture set information indicated by the index in the set of the inter-layer reference picture set information; and performing inter-layer prediction of the current picture by using the inter-layer reference picture.

9. An image decoding method comprising:

obtaining inter-layer prediction allowance information from a bitstream;

obtaining single layer use information from the bitstream when the inter-layer prediction allowance information indicates that inter-layer prediction is usable;

determining a layer having a maximum layer identifier value among at least one layer, to which a current picture directly refers, as a reference layer according to direct reference information obtained from the bitstream when the single layer use information indicates that at most one picture is used for inter-layer prediction;

performing inter-layer prediction on the current picture by using a picture belonging to the reference layer;

obtaining reference layer activation information from the bitstream when the single layer use information does not indicate that at most one picture is used for inter-layer prediction;

obtaining selection information of an inter-layer reference picture set from the bitstream when the reference layer activation information does not indicate that reference pictures of all direct reference layers are provided by a same access unit and are included in a same inter-layer reference picture set;

when the selection information indicates that inter-layer reference picture set information is not selected from a set of pre-generated inter-layer reference picture set information, obtaining inter-layer reference picture set information from the bitstream and determining an inter-layer reference picture by using the obtained inter-layer reference picture set information; and performing inter-layer prediction on the current picture by using the inter-layer reference picture.

* * * * *